United States Patent
Hervas et al.

(10) Patent No.: US 8,427,492 B2
(45) Date of Patent: Apr. 23, 2013

(54) MULTI-PLATFORM OPTIMIZATION TECHNIQUES FOR IMAGE-PROCESSING OPERATIONS

(75) Inventors: Arnaud Hervas, Culver City, CA (US); Benoit Sévigny, Montréal (CA)

(73) Assignee: Apple Inc., Cupertino, CA (US)

( * ) Notice: Subject to any disclaimer, the term of this patent is extended or adjusted under 35 U.S.C. 154(b) by 942 days.

(21) Appl. No.: 12/496,640

(22) Filed: Jul. 1, 2009

(65) Prior Publication Data

US 2010/0328327 A1    Dec. 30, 2010

Related U.S. Application Data

(60) Provisional application No. 61/222,103, filed on Jun. 30, 2009.

(51) Int. Cl.
*G06T 1/00* (2006.01)
*G06T 15/00* (2011.01)
*G09G 5/36* (2006.01)

(52) U.S. Cl.
USPC .......................................... 345/522; 345/557

(58) Field of Classification Search .................. 345/501, 345/502, 505, 530, 543, 557; 711/118
See application file for complete search history.

(56) References Cited

U.S. PATENT DOCUMENTS

| | | | |
|---|---|---|---|
| 6,578,197 B1 | 6/2003 | Peercy et al. | |
| 6,717,599 B1 | 4/2004 | Olano | |
| 6,809,735 B1 | 10/2004 | Stauffer et al. | |
| 6,809,736 B1 | 10/2004 | Stauffer et al. | |
| 6,867,779 B1 * | 3/2005 | Doyle et al. | 345/502 |
| 6,987,894 B2 * | 1/2006 | Sasaki et al. | 382/304 |
| 6,990,230 B2 | 1/2006 | Piponi | |
| 7,015,919 B1 | 3/2006 | Stauffer et al. | |
| 7,171,550 B1 | 1/2007 | Gryck et al. | |
| 7,218,291 B2 | 5/2007 | Abdalla et al. | |
| 7,231,632 B2 | 6/2007 | Harper | |
| 2004/0012596 A1 | 1/2004 | Allen et al. | |
| 2006/0152509 A1 | 7/2006 | Heirich | |
| 2006/0152518 A1 | 7/2006 | Stauffer et al. | |
| 2007/0018980 A1 | 1/2007 | Berteig et al. | |
| 2008/0012874 A1 | 1/2008 | Spangler et al. | |
| 2008/0030833 A1 | 2/2008 | Park | |
| 2008/0303835 A1 | 12/2008 | Swift et al. | |

FOREIGN PATENT DOCUMENTS

WO    WO 2008/118065    10/2008

OTHER PUBLICATIONS

U.S. Appl. No. 12/496,637, filed Jul. 1, 2009, Hervas, Arnaud, et al.
U.S. Appl. No. 12/496,638, filed Jul. 1, 2009, Sevigny, Benoit, et al.
U.S. Appl. No. 12/496,639, filed Jul. 1, 2009, Hervas, Arnaud, et al.

* cited by examiner

*Primary Examiner* — Jacinta M Crawford
(74) *Attorney, Agent, or Firm* — Adeli & Tollen LLP

(57) ABSTRACT

An automated method of rendering image data using a multithread central processing unit ("CPU") is described. The method retrieves a set of image processing instructions. The method determines an image section size to be processed by the CPU using the set of image processing instructions. The method iteratively: (i) retrieves a section of the image data that matches the image section size, and (ii) sends the section of the image data to a particular thread of the multithread CPU for processing using the processing instructions.

38 Claims, 41 Drawing Sheets

MULTI-PLATFORM OPTIMIZATION TECHNIQUES FOR IMAGE-PROCESSING OPERATIONS

CROSS REFERENCE TO RELATED APPLICATIONS

This Application is related to the following applications: U.S. patent application Ser. No. 12/496,637, filed Jul. 1, 2009, now issued as U.S. Pat. No. 8,369,564; U.S. patent application Ser. No. 12/496,638, filed on Jul. 1, 2009, now published as U.S. Patent Publication 2010/0328325; and U.S. patent application Ser. No. 12/496,639, filed on Jul. 1, 2009, now published as U.S. Patent Publication 2010/0328326.

CLAIM OF BENEFIT TO PRIOR APPLICATIONS

This Application claims benefit of an earlier-filed U.S. Provisional Patent Application entitled "Image Processing Framework," filed on Jun. 30, 2009, and having Ser. No. 61/222,103. U.S. Provisional Patent Application 61/222,103 is incorporated herein by reference.

FIELD OF THE INVENTION

The present invention relates to a framework that allows a client application to generate a library of processing functions, generate processing graphs, setup and optimize the graphs, and execute the graphs on various rendering resources.

BACKGROUND OF THE INVENTION

Digital graphic design, image editing, and video editing applications (hereafter collectively referred to as "client" applications) provide graphical designers, media artists, and other users with the necessary tools to create a variety of media content. Examples of such applications include Final Cut Pro® and iMovie®, both sold by Apple® Inc. Applications such as these give users the ability to generate 2D and 3D computer graphics and computer animations, as well as to edit, combine, transition, overlay, and piece together different media content in a variety of manners to create a resulting media project. The resulting media project specifies a combination of audio and/or video content that is used to create a media presentation.

The media presentation may be rendered using various resources in order to produce the final video output. Different systems may include different rendering hardware. In some cases, one or more graphics processing units ("GPU") may be used to render the media presentation, while in other cases one or more central processing units ("CPU") may be used to render the media composition. In addition, some applications may use a combination of one or more GPUs and one or more CPUs (and/or multi-core CPUs) to render the media presentation.

The various available GPUs and/or CPUs may each execute different formats of computer code. In addition, different CPUs and GPUs have different capabilities and limitations. For these reasons, code developers may have to spend a substantial amount of time manually translating code to run on different platforms, optimizing the code for efficient performance on the different platforms, and/or generating various support functions and parameters needed by the different platforms.

Thus, there is a need for a flexible and extendable image processing framework capable of receiving various formats of input code and producing an output that can be run on multiple platforms while delivering optimal performance on a variety of rendering resources.

SUMMARY OF THE INVENTION

Some embodiments provide a software framework used to facilitate media processing operations including rendering. Some embodiments of the software framework provide an interface between a client application or applications and a set of hardware rendering resources (e.g., a central processing unit ("CPU") or a graphics processing unit ("GPU")). Such an interface includes various software modules that are used in some embodiments to process media content (e.g., images, video, audio, etc.) and to generate and display a presentation of the media content. The media processing system of some embodiments includes three components, which are a client application component, an image processing component, and an operating system ("OS") component. In some embodiments, these three components reside on one computing device, although other embodiments might implement these components on multiple computing devices.

The client application component includes one or more client media applications that process media content. For instance, in some embodiments, the applications include media editing applications that create composite presentations from one or more media clips (video clips, audio clips, etc.). Examples of such media editing applications include Final Cut Pro®, iMovie®, Shake®, Motion®, iPhoto®, etc. One of ordinary skill in the art will understand that other specific media editing applications may be included in the client application component. In some cases, the media editing applications may be supplied by a single vendor, while in other cases the applications may be supplied by different vendors.

The image processing component of some embodiments includes an image processing framework. In some embodiments, this framework includes one or more engines for facilitating the operations of one or more media client applications. For example, in some embodiments, the image processing framework includes one or more engines (e.g., rendering engines, graph-generation engines, etc.) that are used by one or more media editing applications to render composite presentations that are produced by the client applications. In addition to these engines, the framework of some embodiments includes a graphics compiler that is used by the developers of the client applications to generate one or more media-processing toolkits for the media processing framework (alternatively referred to as an "image processing framework"). In some embodiments, these media processing toolkits include various sets of image processing instructions that are used to transform the media editing operations of the client applications into rendering commands that can be processed by the rendering engine of the media processing framework.

Various hardware rendering resources may be used in conjunction with the framework of some embodiments. These rendering resources execute various operations as specified by a client application (and processed by the framework and OS).

The media processing system allows for multiple client applications to use the media processing functions of the framework. The framework, in turn, uses the OS and assorted drivers to control the operation of various hardware resources based in the operations specified by a particular client application.

In some embodiments, the various client applications may all access the same framework. In other embodiments, each client application (or a particular set of client applications) may access a particular instantiation of the framework (e.g., a client application itself may include a particular instantiation of the framework).

In some embodiments, the media processing framework receives data, instructions, and/or commands from a client application at compile-time and uses the received data, instructions, and/or commands to generate a media-processing toolkit. In addition, the toolkit may include various standard media-processing algorithms that are included in the framework of some embodiments. Such a toolkit may be passed back to the client application, stored in memory, or otherwise preserved for future use.

The media processing framework of some embodiments also receives data from a client application at run-time. The framework, in turn, generates instructions, data, and/or commands that may be passed through the OS and assorted drivers before being sent to the appropriate hardware for execution.

The rendering resources are thus made transparent to the client applications through the use of the software framework. In other words, each client application needs only to provide data to the media processing framework without regard for the particular rendering resource that will execute the rendering operation(s).

Some embodiments of the image processing framework include a graphics compiler that is used to transform fragment programs into render graph nodes (or "processing nodes"). A fragment program may include one or more image processing algorithms that are coded in various formats. The graphics compiler creates a render graph node from each particular fragment program. Such a render graph node may be executed on a variety of rendering resources (i.e., various CPUs and/or GPUs may be used to execute the node). In some embodiments, the render graph node includes code that has been optimized for use on each of these different rendering resources.

In addition to including various code types, the render graph nodes of some embodiments include other functions used for setup, initialization, and optimization at render time. Furthermore, the render graph nodes may include various handles, tags, and pointers that facilitate efficient execution of the nodes. Once generated, these render graph nodes may be stored in a library (or "application toolkit") in some embodiments such that the nodes will be available at render time (i.e., when a render graph is generated and executed).

Some embodiments provide a graph generator that is used to generate render graphs from a document model and an application toolkit. In other embodiments, the framework may receive render graphs generated by a client application. In any case, the render graphs may be stored in a render graph queue, or some other appropriate location, until the graphs are executed.

The application toolkit of some embodiments may include render nodes corresponding to both user-generated functionality and framework-provided functionality that includes various basic and advanced image processing algorithms. The graph generator matches the operations specified by the document model to the processing nodes included in the application toolkit. In addition, the graph generator of some embodiments specifies the connections between the various processing nodes based on the document model.

In some embodiments, a graph execution engine is used by the framework to direct render graphs to particular renderers, and, in turn, their associated rendering resources. The graph execution engine of some embodiments includes a renderer selection engine and various renderers. The renderer selection engine retrieves render graphs from a graph queue and assigns the graphs to a particular renderer. The renderers then perform setup, optimization, and initialization of the render graph before passing the resulting execution render graph to the appropriate rendering resource for processing.

The selection of a particular renderer may be based on information provided by the client application, a determination made by the renderer selection engine, or some other appropriate criteria. In some cases, an entire image may be processed by a single renderer. In other cases, the renderer selection engine may dynamically allocate sections of an input frame to the various rendering resources as they become available.

After receiving a render graph, the appropriate renderer performs setup, optimization, and initialization of the render graph. The setup, optimization, and initialization may be performed using functions, data structures, etc. stored in the render graph nodes such that the render graph may be executed with greater efficiency by the selected rendering resource. For instance, these functions may include region of interest ("ROI") and domain of definition ("DOD") functions that allow a renderer to perform more efficiently by limiting a node's input(s) and/or output(s) to a particular section of image data instead of processing an entire image.

The data structures may include a "fingerprint" of the fragment program used to generate a render graph node. This fingerprint may include an estimation of resources used by the fragment program. This estimation allows the renderer to accurately predict whether multiple graph nodes may be concatenated into a single node that can be executed in one render pass (i.e., whether the resources of the combined node will exceed the resources of the available GPU). Other data structures may include various tags and pointers that allow the renderer to more efficiently access the functions or data structures in a particular node.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a software framework used to facilitate media processing operations including rendering. The media processing framework (also referred to as the "image processing" framework) of some embodiments uses a graph-based rendering architecture. The image processing framework of some embodiments includes a library of image processing algorithms (formatted as render graph nodes), a specialized compiler that can generate render graph nodes from graphics processing unit ("GPU") fragment programs (also referred to as "fragment shaders" or "shaders") provided by a developer of a client application, a graph generator that creates render graphs based on a render description provided by a client application, and/or a graph execution engine for selecting a particular renderer (e.g., a CPU-based renderer or a GPU-based renderer) and executing a render graph using the selected renderer.

Figure 1:
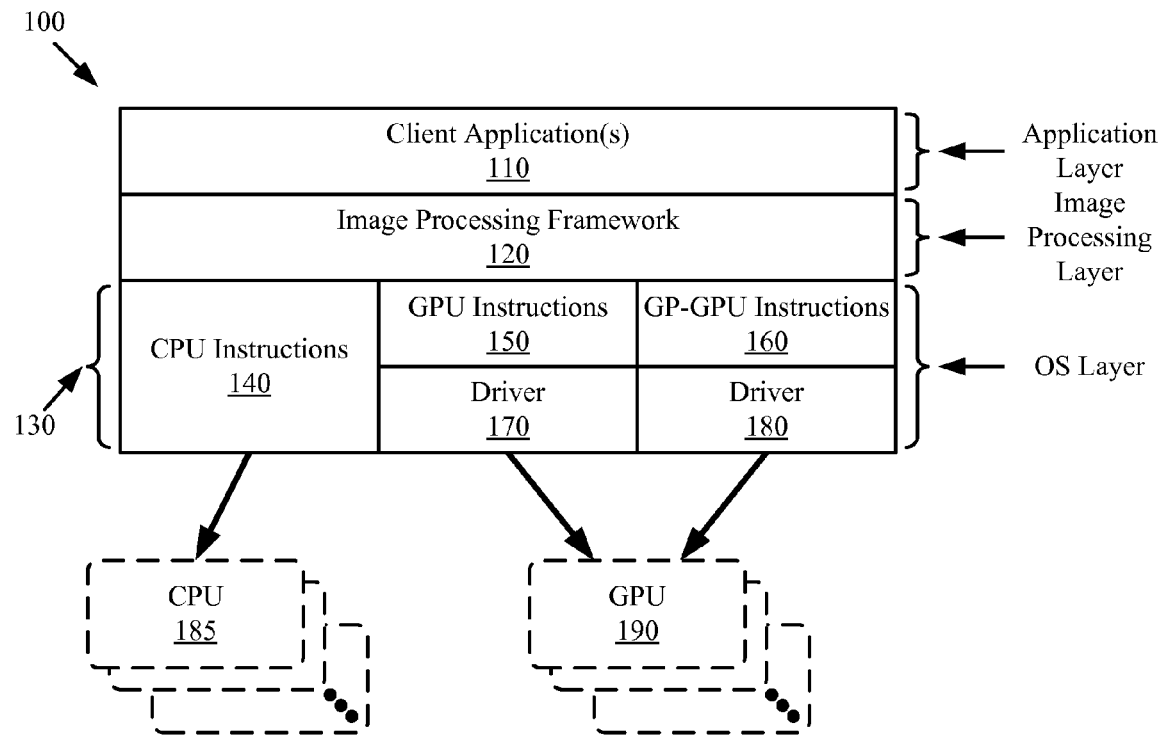
FIG. 1 illustrates the media processing stack of some embodiments.

FIG. 1 illustrates a media processing stack 100 of some embodiments. This stack represents the various different software modules that are used in some embodiments to process media content and to generate and display a presentation of the media content. As shown in FIG. 1, the media processing stack 100 includes three layers, which are a client application layer 110, an image processing layer 120, and an OS layer 130. In some embodiments, these three layers 110-130 reside on one computing device, although other embodiments might implement these layers on multiple computing devices.

The client application layer 110 includes one or more client media applications that process media content. For instance, in some embodiments, the applications include media editing applications that create composite presentations from one or more media clips (video clips, audio clips, etc.). Examples of such media editing applications include Final Cut Pro®, iMovie®, Shake®, Motion®, iPhoto®, etc. One of ordinary skill in the art will understand that other specific media editing applications may be included in the client application layer 110. In some cases, the media editing applications may be supplied by a single vendor, while in other cases the applications may be supplied by different vendors.

The image processing layer 120 includes an image processing framework. In some embodiments, this framework includes one or more engines for facilitating the operations of one or more media client applications. For example, in some embodiments, the image processing framework includes one or more engines (e.g., rendering engines, graph-generation engines, etc.) that are used by one or more media editing applications to render composite presentations that are produced by the client applications. In addition to these engines, the framework of some embodiments includes a graphics compiler that is used by the developers of the client applications to generate one or more image-processing toolkits for the image processing framework 120. In some embodiments, these image processing toolkits are used to transform the media editing operations of the client applications into rendering commands that can be processed by the rendering engine of the image processing framework.

As shown in FIG. 1, the media processing operations of the OS layer 130 can include three types of instructions, which include CPU instructions 140, GPU instructions 150, and general-purpose GPU ("GP-GPU") instructions 160. CPU instructions 140 are for directing a CPU to perform various operations. In some cases, there is a specialized driver (not shown) for enabling some specialized functions associated with a CPU. One of ordinary skill in the art will recognize that the OS layer 130 may include other components, or may perform other media processing operations than those shown.

The GPU instructions 150 are for directing a GPU to perform image processing operations. The GPU instructions are passed through a driver 170. The GP-GPU instructions 160 are for directing a GPU to perform general-purpose processing operations (i.e., using a GPU to perform computations traditionally handled by a CPU). The GP-GPU instructions are passed through a driver 180.

The drivers (the specialized CPU driver, and drivers 170 and 180) allow higher-level computer programs to interact with a hardware device (such as CPU 185 or GPU 190). A driver typically communicates with its associated device through a computer bus or communications subsystem to which the hardware is connected. When a calling program invokes a routine in the driver, the driver issues commands to the device. Once the device sends data back to the driver, the driver may invoke routines in the original calling program. Drivers are typically hardware-dependent and OS-specific.

FIG. 1 also illustrates various hardware rendering resources 185 and 190. These resources execute various operations as specified by a client application 110 (and processed by the framework 120 and OS layer 130). In many of the figures below, the rendering resources 185 and 190 are shown as receiving signals directly from the framework 120, with the OS layer 130 omitted for the purpose of simplifying the figures in order not to obscure the description with unnecessary detail.

Figure 2:
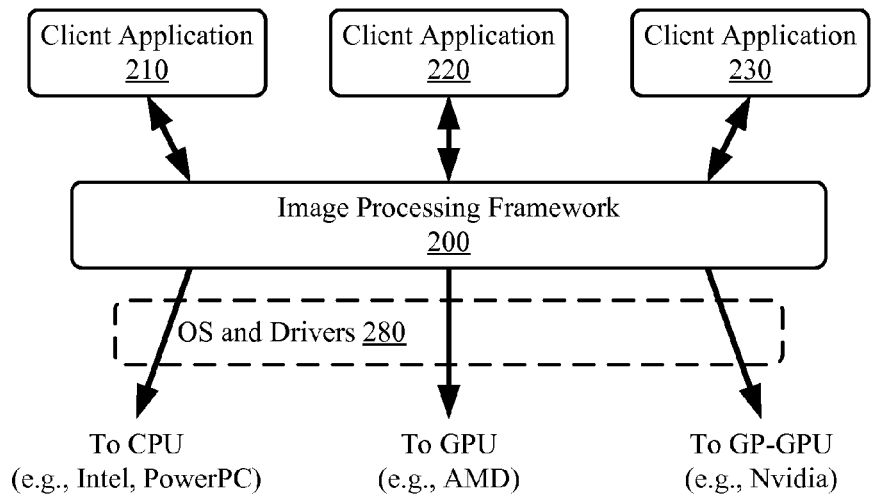
FIG. 2 illustrates various client applications using the image processing framework of some embodiments to direct the operation of various hardware resources using an OS and assorted drivers.

The media processing stack 100 allows for multiple client applications to use the image processing functions of the framework. This is shown in FIG. 2, which illustrates various client applications 210-230 interacting with the image processing framework 200 of some embodiments. This figure further illustrates the framework 200 using an OS and assorted drivers 280 to control the operation of various hardware resources. The client applications 210-230 are the same client applications represented by the client application layer 110 of the media processing stack 100. The OS and assorted drivers 280 include the elements of the OS layer 130 shown in media processing stack 100.

In some embodiments, the various client applications 210-230 may all access the same framework 200. In other embodiments, a client application 210-230 may access a particular instantiation of the framework 200 (e.g., the client application itself may include a particular instantiation of the framework).

In some embodiments, the image processing framework 200 receives data, instructions, and/or commands from a client application 210-230 at compile-time and uses the received data, instructions, and/or commands to generate an image-processing toolkit. Such a toolkit may be passed back to the client application, stored in memory (not shown), or otherwise preserved for future use.

The image processing framework 200 of some embodiments also receives data from a client application 210-230 at run-time. The framework, in turn, generates instructions, data, and/or commands that may be passed through the OS and assorted drivers 280 before being sent to the appropriate hardware for execution.

The rendering resources are thus transparent to the client applications 210-230. In other words, each client application needs only to provide data to the image processing framework 200 without regard for the particular rendering resource that will execute the rendering operation(s).

Figure 3:
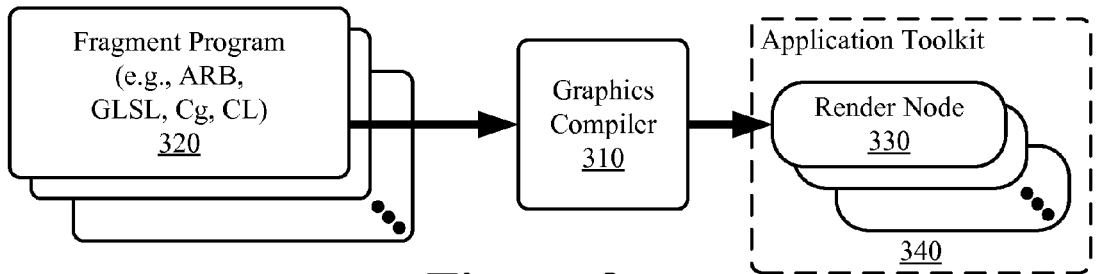
FIG. 3 illustrates the operation of a graphics compiler provided by some embodiments.
Figure 4:
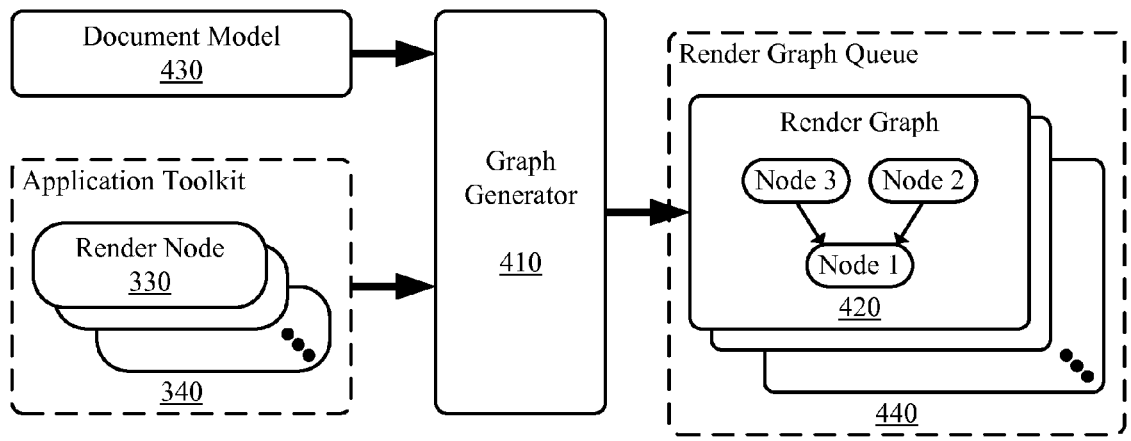
FIG. 4 illustrates the creation of a nominal render graph in some embodiments.
Figure 5:
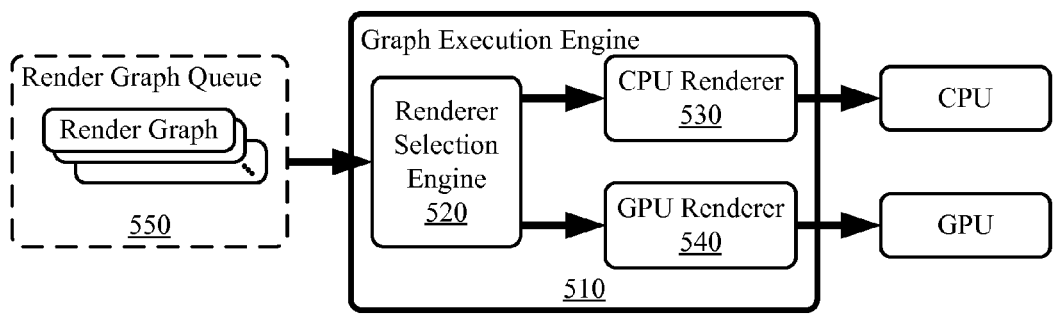
FIG. 5 illustrates the selection of a rendering resource (or resources) to execute a render graph of some embodiments.

The image processing framework has different components in different embodiments. For instance, in some embodiments described further below, the image processing framework has a graph-based node compiler, a render graph generator, and/or a graph execution engine. FIGS. 3-5 briefly introduce some of these components.

Specifically, FIG. 3 illustrates the use of a graph-based compiler 310 provided by some embodiments. This figure shows the graphics compiler 310, included in the image processing framework of some embodiments, as used to transform fragment programs 320 into render graph nodes 330 (or "processing nodes").

A fragment program 320 may include one or more image processing algorithms. These algorithms may be coded as fragment programs using various formats (e.g., Architecture Review Board ("ARB") shading language, Open Graphics Library ("OpenGL") shading language ("GLSL"), C-like programming language for graphics ("Cg"), and/or open computing language ("OpenCL" or "CL")).

The graphics compiler, in turn, creates a render graph node 330 from a particular fragment program, 320. Such a render graph node 330 may be executed on a variety of rendering resources (i.e., various CPUs and/or GPUs may be used to execute the node). In some embodiments, the render graph node includes code that has been optimized for use on each of these different rendering resources. For instance, the render graph node may include SSE-optimized and AltiVec-optimized CPU code, as well as different code variants of the fragment program 320 that take advantage of different GPU-specific capabilities.

In addition to including various code types, the render graph nodes of some embodiments include other functions used for setup, initialization, and optimization at render time. Furthermore, the render graph nodes may include various handles, tags, and pointers that facilitate efficient execution of the nodes. Once generated, these render graph nodes may be stored in a library (or image-processing "toolkit") in some embodiments such that the nodes will be available at render time (i.e., when a render graph is generated and executed). The graphics compiler of some embodiments will be described in more detail in sub-section III.A below.

FIG. 4 illustrates the use of a graph generator 410 provided by some embodiments. Specifically, this figure shows the graph generator 410 included in the image processing framework of some embodiments as used to generate render graphs 420 from a document model 430 and an application toolkit 340. In other embodiments, the framework may receive render graphs generated by a client application. In any case, the render graphs 420 may be stored in a render graph queue 440, or some other appropriate location, until the graphs are executed.

The application toolkit 340 of some embodiments may include render nodes corresponding to both user-generated functionality and framework-provided functionality that includes various basic and advanced image processing algorithms. The graph generator 410 matches the operations specified by the document model to the processing nodes included in the application toolkit 340. Thus, for example, if a document model specifies a blend operation that combines two input frames (or sections thereof) to generate a single output frame (or section thereof), the graph generator 410 may select a particular processing node, from the application toolkit 340, that corresponds to the blend operation. In some embodiments, a particular operation specified by the document model may require a set of processing nodes. Alternatively, a particular operation specified by the document model may require only a sub-set of the operations performed by a particular processing node. In addition to instantiating the nodes, the graph generator 410 of some embodiments specifies the connections between the various processing nodes based on the document model 430.

Different client applications may generate and apply graphs to different sections of a media presentation in various ways. For instance, in some cases, the client application will generate one graph for each frame of the media presentation. In other cases, the client application may generate one graph for each segment of the media presentation, where the parameters of the graph may change from frame to frame. The generation of render graphs will be described in more detail in Section IV below.

FIG. 5 illustrates the use of a graph execution engine 510 included in the framework of some embodiments. Specifically, this figure shows the graph execution engine 510 as used to direct render graphs to particular renderers 530 and 540 and, in turn, rendering resources. As shown, the graph execution engine 510 of some embodiments includes a renderer selection engine 520 and various renderers 530-540. The renderer selection engine 520 retrieves nominal render graphs from the queue 550 and assigns the graphs to a particular renderer 530 or 540. The renderers 530-540 perform setup, optimization, and initialization of the render graph before passing the resulting execution render graph to the appropriate rendering resource for processing. An execution render graph is a nominal render graph that has been setup, optimized, and initialized and is thus ready to be executed by the appropriate rendering resource.

As shown, a number of previously-generated render graphs may be stored in a render graph queue 550 before being provided to the graph execution engine 510 for execution. The render graphs may have been generated as described above in reference to FIG. 4 and/or some other appropriate way.

The renderer selection engine 520 retrieves the stored graphs from the graph queue 550 and selects a renderer 530 or 540 to execute each retrieved graph. The selection of a particular renderer may be based on information provided by the client application, a determination made by the renderer selection engine 520, or some other appropriate criteria. In some cases, this determination may be made by the renderer selection engine (or the client application) after evaluating certain resource information (e.g., availability, usage, etc.).

For instance, in some cases a particular machine (or set of machines) that is being used to perform rendering may not include a GPU at all. In such cases, the renderer selection engine 520 may receive or generate a hardware profile of the system, and determine that incoming render graph(s) should be processed using the CPU renderer 530.

In other cases, the client may determine that a particular rendering resource is favored (because of the particular image processing operations being performed, etc.) and assign the render graph to a particular rendering resource without regard for its usage (or without regard to the other resources that may be used). In still other cases, the renderer selection engine may dynamically assign render graphs to the available rendering resources by evaluating the current usage of those resources. For instance, in some cases the GPU renderer 540 (and associated GPU) may be used to render images for real-time playback, while the CPU renderer (and associated CPU(s)) may be used to render images to be stored for future use. In yet other cases, the renderer selection engine may dynamically allocate sections of an input frame to the various rendering resources as they become available. In other words, the processing of a single image may be divided among various renderers.

After receiving a render graph, the appropriate renderer 530 or 540 performs setup, optimization, and initialization of the render graph. The setup, optimization, and initialization may be performed using functions, data structures, etc. stored in the render graph nodes such that the render graph may be executed with greater efficiency by the selected rendering resource. For instance, these functions may include region of interest ("ROI") and domain of definition ("DOD") functions that allow a renderer to perform more efficiently by limiting a node's input(s) and/or output(s) to a particular section of image data instead of processing an entire image.

The data structures may include a "fingerprint" of the fragment program used to generate a render graph node. This fingerprint may include an estimation of resources used by the shader. This estimation allows the renderer to accurately predict whether multiple graph nodes may be concatenated into a single node that can be executed in one render pass (i.e., whether the resources of the combined node will exceed the resources of the available GPU). Other data structures may include various tags and pointers that allow the renderer to more efficiently access the functions or data structures in a particular node. The selection of rendering resources and setup, optimization, and initialization of the render graphs will be described in more detail in Sections V-VI below.

Figure 6:
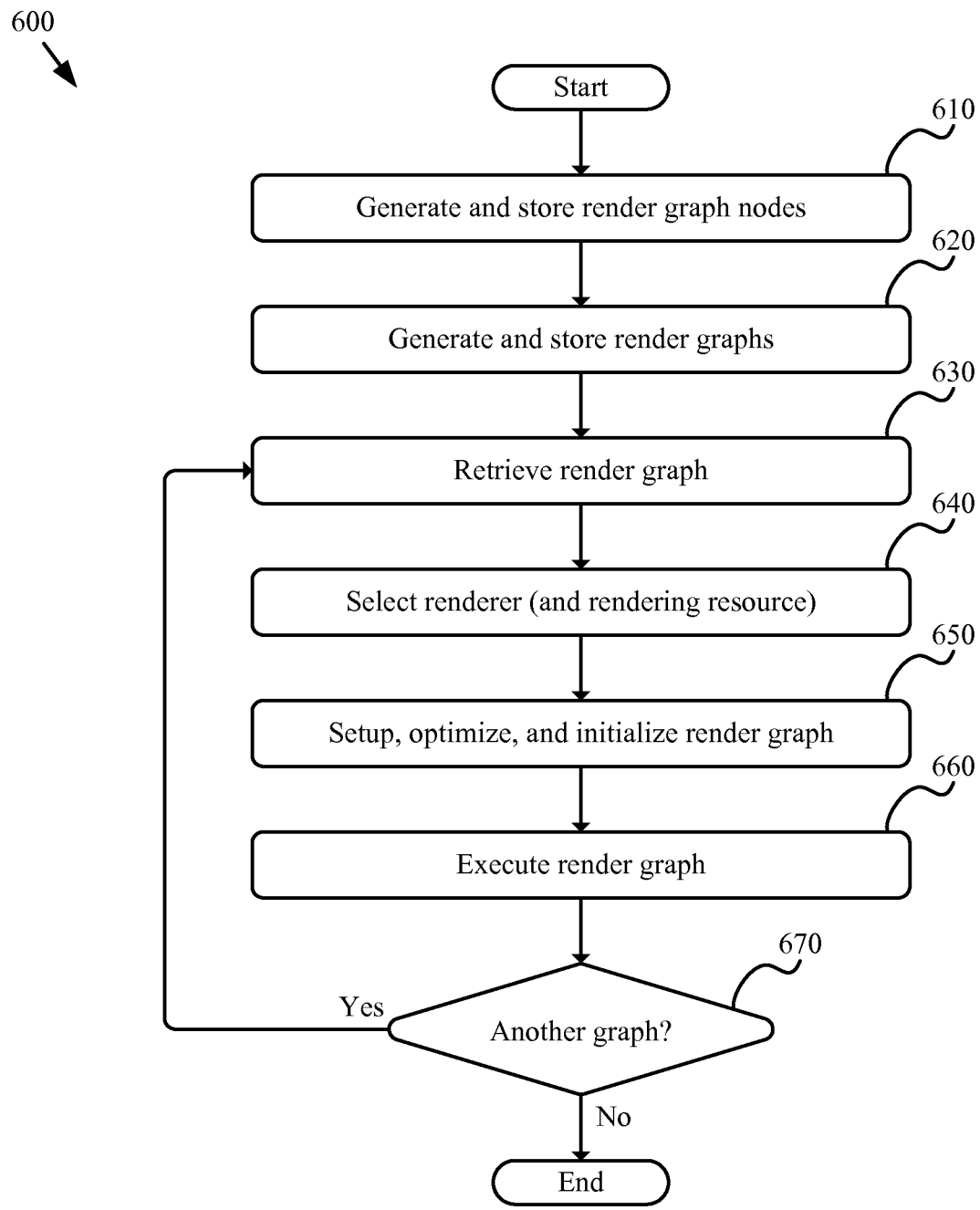
FIG. 6 illustrates a conceptual rendering process performed by the image processing framework of some embodiments.

FIG. 6 illustrates a conceptual rendering process 600 performed by the image processing framework of some embodiments. As shown, the process begins at 610 when it generates and stores render graph nodes. These render graph nodes may be generated from fragment programs as described above in reference to FIG. 3. As discussed above, the render graph nodes may include functionality provided by the image processing framework as well as functionality that is implemented by developers of various client applications.

Next, the process generates and stores (at 620) one or more render graphs. These render graphs may be generated as described above in reference to FIG. 4. After generating and storing (at 620) the render graphs, the process retrieves (at 630) a particular render graph. As described above in reference to FIG. 5, the render graphs generated and stored (at 620) may be stored in a render graph queue, or otherwise provided to the framework in order that each graph may be executed by an appropriate resource.

After retrieving (at 630) a render graph, the process selects (at 640) a renderer (and associated rendering resource). As described above in reference to FIG. 5, this selection may be based on various factors such as resource availability, usage, resource capability, etc. After selecting (at 640) a renderer, the process sets up, optimizes, and initializes (at 650) the particular render graph in order to generate the execution render graph. This set up, optimization, and initialization may be performed such that the execution render graph runs efficiently on the chosen resource. Next, the process executes (at 660) the render graph. The execution of the graph may be performed by one or more CPUs and/or one or more GPUs, depending on the available resources, and the criteria used to select among those resources. Execution may include the selected resource processing the graph by loading image data, performing the operations specified by the render graph, outputting image data, and displaying the resulting image(s) on a monitor or other viewing device.

After executing (at 660) the render graph, the process determines (at 670) whether there is another graph to execute. When there is another graph, operations 630-670 are repeated until the process determines (at 670) that there are no other graphs to be executed. When the process determines (at 670) that there are no more graphs to execute, the process ends.

One of ordinary skill in the art will recognize that process 600 is a conceptual process, and the actual implementations may vary. For example, different embodiments may perform the various operations in a different order, may omit certain operations, add operations other than those described, etc. In addition, the process 600 may be implemented as several sub-processes or combined with other operations within a macro-process.

Several more detailed embodiments of the invention are described in the sections below. Before describing these embodiments further, Section I provides definitions for various terms that will be used to describe some embodiments of the invention. Section II then provides a conceptual description of the framework architecture. Next, Section III describes the generation of render graph nodes from fragment programs. Section IV then describes graph generation using a render description and a set of render graph nodes. Section V follows that discussion with a description of the selection of a rendering resource and the execution of a render graph. Section VI follows that discussion with a description of various optimization techniques used to more efficiently execute the render graphs. Next, Section VII describes the process used to define the image processing framework of some embodiments. Lastly, Section VII describes a computer system which implements some of the embodiments of the invention.

I. Definitions

A software framework is an abstraction layer that may include support programs, code libraries, a scripting language, or other software to help develop and link together various components of a software project. Sections of the framework may be accessed through application programming interfaces ("API"). A framework provides generic functionality that may be specialized to provide functionality that is specific to a particular client application.

An API includes a set of routines, data structures, object classes and/or protocols provided by software libraries and/or operating system services that support the building of applications. An API itself is largely abstract in that it specifies an interface and controls the behavior of the objects specified in that interface. The software that provides the functionality described by an API is said to be an "implementation" of the API. An API is typically defined in terms of the programming language used to build an application. The term "API" may be used to refer to a full interface, a single function, or a set APIs provided by a framework.

Rendering is the process of combining the disparate elements of a media project into a single composite presentation. Such a composite presentation may be played as a streaming audiovisual file.

Open Computing Language ("OpenCL") is a framework for writing programs that execute across different platforms (e.g., CPUs, GPUs, and/or other processors). OpenCL allows graphics processing units to perform general-purpose computing operations ("GP-GPU", also referred to as "GPGP" or "GP$^2$").

Open Graphics Library ("OpenGL") is a standard specification that defines a cross-language, cross-platform API for writing applications that produce computer graphics. OpenGL may be used in various applications that require graphics processing.

C for Graphics ("Cg") is a high-level shading language for programming vertex and pixel shaders on GPUs. Cg is based on the C programming language, but modified to make the language more suitable for programming graphics processing operations. A Cg compiler may output OpenGL shader programs.

OpenGL Architecture Review Board ("ARB") shading language is a low-level shading language. It was created to standardize GPU instructions controlling the hardware graphics pipeline.

OpenGL Shading Language ("GLSL") is a high-level shading language based on the C programming language. It was created to give developers more direct control of the graphics pipeline without having to use low-level languages.

Streaming single instruction multiple data ("SIMD") extensions ("SSE") is a SIMD instruction set extension to the x86 architecture. AltiVec is a floating point and integer SIMD instruction set implemented on versions of the PowerPC. AltiVec is also referred to as "Velocity Engine" or "VMX".

A rendering resource may be any hardware element that is capable of executing a render operation on a set of image data. Rendering resources include, but are not limited to, GPUs and CPUs.

A render graph node is a software element that includes sets of instructions that perform a particular set of image processing operations when executed on the appropriate rendering resource. A render graph node may also include various support functions and data that are generated by analyzing the image processing operations performed by the node and that may be used when the node is executed. A "leaf" node is a render graph node that has no inputs supplied by other nodes (e.g., a node that loads image data from memory or procedurally generates image data). A "root" node is a render graph node that supplies no outputs to other nodes (e.g., a node that stores image data to memory). The root node is the last operator in a render graph, and therefore, the output of the root node is the output of the render graph.

A "shell" node is a render graph node that may include sets of instructions that perform functions other than image processing operations. A shell node typically does not include any support functions or data. Thus, a shell node is a pass-through node that allows various instruction sets to be packaged as a render graph node without regard to the actual operations performed by the various instruction sets.

A toolkit, or application toolkit, is a collection of render graph nodes that is generated at compile-time and made available to the client application and/or the image processing framework at run-time in some embodiments. Each render graph node included in the toolkit corresponds to a particular image processing operation that is supported by the client application.

A render graph is a software element that includes a number of render graph nodes. The relationships between the various render graph nodes (e.g., input connections, output connections, etc.) are defined by the render graph.

A nominal render graph is a render graph that has not been targeted for a specific rendering resource. An execution render graph is a render graph that is executable by a particular rendering resource (i.e., a nominal render graph after setup, initialization, etc.).

A renderer is a software element that performs setup, initialization, optimization, and other operations needed to transform a nominal render graph into an execution render graph.

A client application is a media editing application that uses the framework to perform certain functionality. In some embodiments, the framework (or portions of the framework) may be instantiated within the client application. In some embodiments, the client application may call functions provided by the framework.

A developer or developer-user is a developer of the client application. A developer uses the framework to access certain image processing functionality. A user or client-user is an end user of the client application, using the framework indirectly (i.e., functions performed by the framework are invoked indirectly through interactions with the client application).

A region of interest ("ROI") is the area of an input image (alternatively referred to as an "input frame") that is needed to define a particular area of an output image using a particular set of image processing operations (i.e., the set of input pixels needed to produce a particular set of output pixels).

A domain of definition ("DOD") is the area of an output image (alternatively referred to as an "output frame") that is defined by a particular area of an input image using a particular set of image processing operations (i.e., the set of output pixels produced by a particular set of input pixels).

A fragment program (also referred to as a "fragment program" or a "shader") includes a set of image processing instructions that, when executed by the appropriated rendering resource, perform a set of image processing operations.

A texture (or "input texture") is a region of pixels that is processed by a particular image processing resource. An input texture may be "sampled" by a processor such as a GPU before the GPU performs image processing operations on the texture.

II. Framework Architecture

Figure 7:
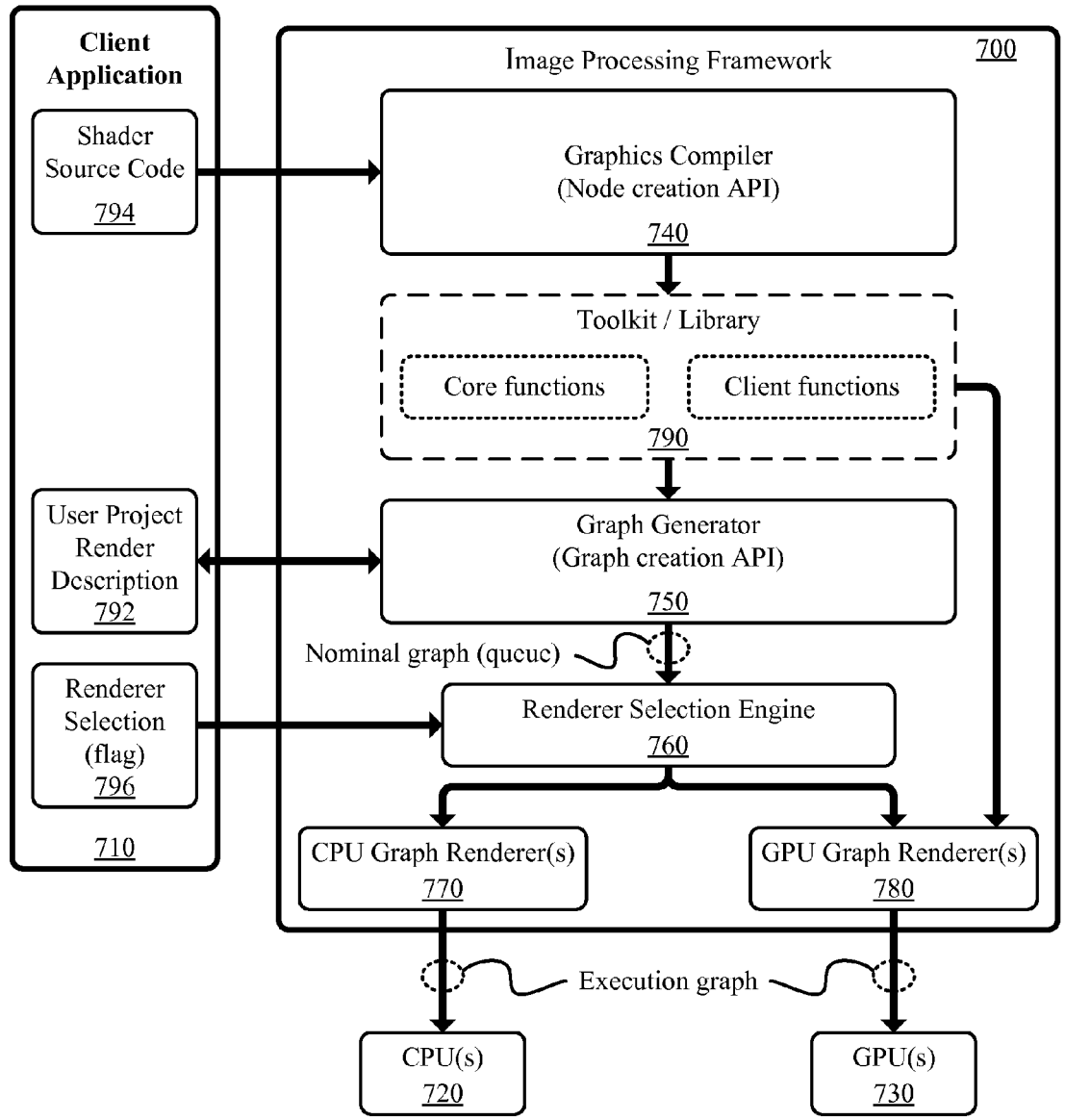
FIG. 7 illustrates a conceptual architecture of the image processing framework of some embodiments.
Figure 8:
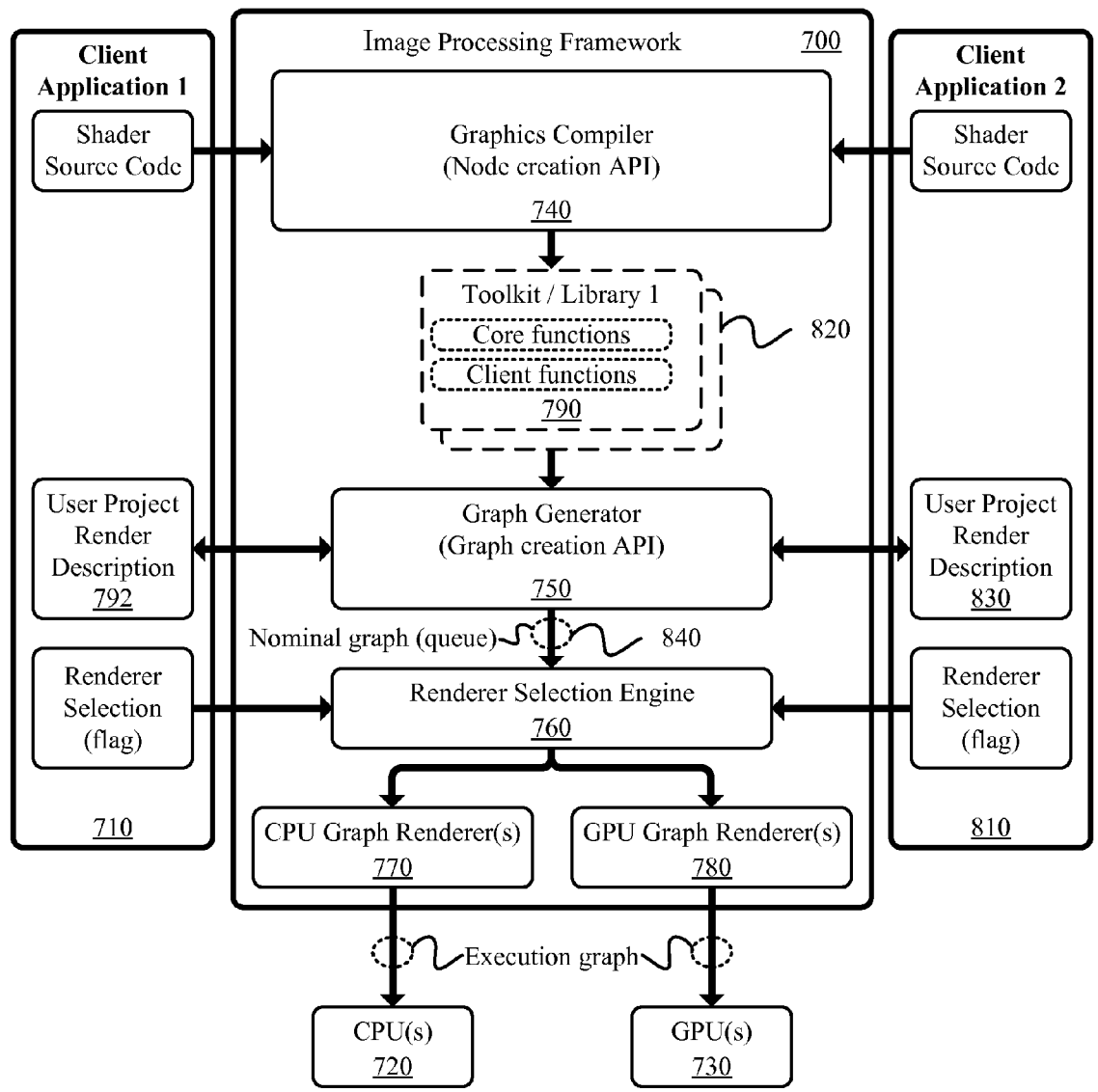
FIG. 8 illustrates the framework architecture shown in FIG. 7 as used by multiple client applications.
Figure 9:
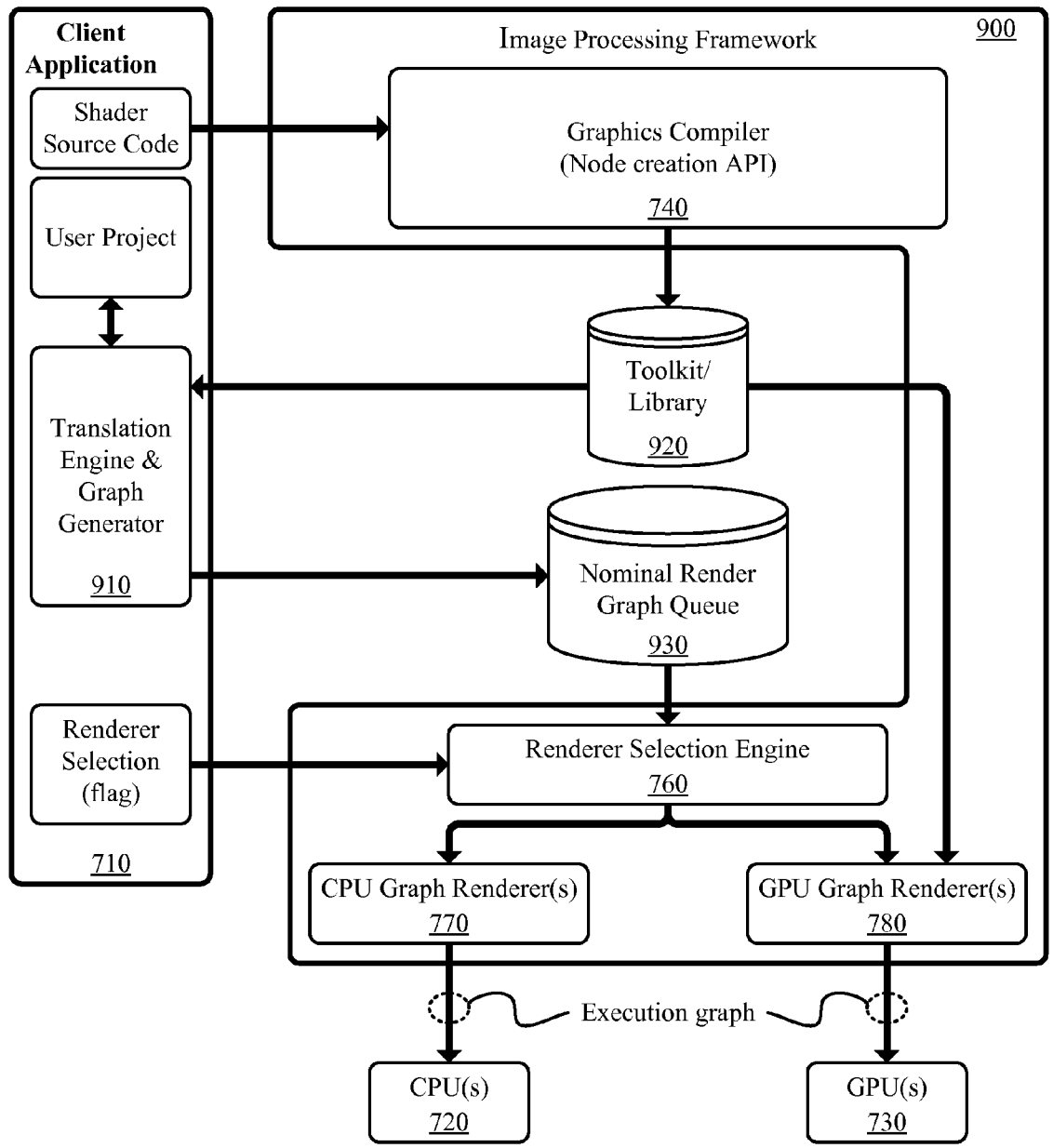
FIG. 9 illustrates an alternative conceptual architecture of the image processing framework of some embodiments.

As mentioned above, the framework is used at various stages of the rendering flow. FIGS. 7-9 illustrate two exemplary architectures used to implement the framework functionality during the various stages of the rendering flow.

FIG. 7 illustrates a conceptual architecture of the image processing framework of some embodiments. Specifically, this figure shows the various modules and components that allow the image processing framework 700 to interact with a client application 710 and various rendering resources 720-730. As shown, the image processing framework 700 includes a graphics compiler 740 for transforming shader source code into render graph nodes, a graph generator 750 for creating nominal render graphs from the render graph nodes and a user project render description 792, a renderer selection engine 760 for selecting a renderer based on some selection criteria, one or more CPU renderers 770 for generating execution render graphs to be rendered on a CPU, and one or more GPU renderers 780 for generating execution render graphs to be rendered on a GPU. In addition, the framework 700 accesses a toolkit or library 790 that includes both core functions provided by the framework and client functions generated in response to input from the client application 710. The toolkit is stored externally to the framework 700, but is represented as a component of the framework for clarity.

As shown, in some embodiments the graphics compiler 740 receives shader source code 794 from the client application 710 at compile-time (i.e., when a client application is instantiated using the framework 700). The shader source code may be provided in various formats (e.g., ARB, OpenGL, Cg, etc.). The shader source code is transformed by the graphics compiler 740 into a render graph node, which is then stored in the toolkit 790. In addition to transforming shader source code provided by a client application, various render graph nodes (i.e., core functions provided by the framework) are included in the toolkit. The render graph nodes include code for multiple variants of CPU and multiple variants of GPU in addition to various functions that are used at run-time. The generation of render graph nodes will be described in more detail in Section III below.

The render graph nodes stored in the toolkit 790 correspond to various image-processing operations that may be performed using the client application 710. Thus, the render graph nodes from the toolkit 790 are matched to different image-processing operations that are specified by the client application using a user project render description 792. This matching is performed by the graph generator 750 in some embodiments. In addition to matching the various operations to their corresponding nodes, the graph generator 750 "builds" a nominal render graph that defines the relationships between the various nodes (e.g., their input connections, output connections, etc.). The nominal render graph is not optimized for any particular processing platform, and thus includes code corresponding to the various supported CPUs and GPUs. Graph generation will be described in more detail in Section IV below.

In some embodiments, after generating the render graphs, the graphs are stored using a render graph queue (or some other appropriate storage mechanism). These stored graphs are retrieved by the renderer selection engine 760, before being passed to one of the available renderers 770-780. In some embodiments, the selection of a particular renderer is made by the client application, and this selection is passed to the renderer selection engine 760 as a flag 796. In other embodiments, the renderer selection engine may determine which renderer should be used based on various criteria (e.g., resource availability, resource usage, etc.).

Some embodiments include multiple CPU graph renderers 770 and/or multiple GPU graph renderers 780. In some cases, the framework includes one GPU renderer 780 for each GPU that is present on the rendering hardware (e.g., a PC) and one CPU graph renderer 770 for each PC (or other rendering hardware). Renderer selection is described in more detail in Section V below.

Once the selection of a renderer is made, the appropriate renderer 770 or 780 transforms the nominal render graph into an execution render graph. The execution render graph has the same functionality as the nominal render graph. The execution render graph, however, has been set up, initialized, and optimized for execution on the appropriate rendering resource. In addition to performing set up and optimization, the renderer initializes the graph such that all textures and/or other parameters are defined, thus enabling the shader code through the cache. After performing set up, initialization, and optimization of the render graph, the renderer 770 or 780 passes the render graph to the appropriate rendering resource 720 or 730. Setup and initialization of render graphs is described in more detail in Section V below, while optimization is described in more detail in Section VI below.

FIG. 8 illustrates the framework architecture 700 shown in FIG. 7 as used by multiple client applications. Specifically, this figure shows two client applications 710 and 810 using the framework 700 to generate multiple toolkits 790 and 820. Each toolkit corresponds to a particular client application 710 or 810. The elements of toolkits 790 and 820 are matched to the operations specified by the appropriate client application's render description 792 and 830 by the graph generator 750. The graph generator then generates render graphs to be stored in a render graph queue 840. In some embodiments (not shown), the graph generator 750 creates a graph queue corresponding to each client application 710 or 810. After the render graph queue(s) 840 have been generated, the renderer selection engine 760 routes the graphs to the appropriate renderer 770 or 780 for processing and execution. One of ordinary skill in the art will recognize that although the example of FIG. 8 shows two client applications, the framework may in fact interact with an arbitrary number of client applications.

FIG. 9 illustrates an alternative conceptual architecture of the image processing framework of some embodiments. Specifically, this figure shows the various modules and components that allow the framework 900 to interact with a client application 710 and various rendering resources 720-730. As shown, the image processing framework 900 includes many of the same components as the framework 700. For instance, the framework 900 includes the graphics compiler 740, the renderer selection engine 760, one or more CPU renderers 770, and one or more GPU renderers 780. In contrast, however, the framework 900 does not include the graph generator 750 of framework 700. Instead, the client application 710 includes a translation engine and graph generator 910 that is used to create nominal render graphs from the user project description using the toolkit 920. As shown, in addition to the internal components of the framework 900, the framework has access to a toolkit or library 920 and a nominal render graph queue 930.

In this alternative architecture, the client application 710 generates the nominal render graphs and stores them in the render graph queue 930 for further processing and execution by the framework 900. The generation of the toolkit and the further processing and execution of the render graphs is performed as described above in reference to FIG. 7.

One of ordinary skill in the art will recognize that although the framework has been described with reference to particular details, different embodiments may implement the framework in different ways. For instance, alternative embodiments may utilize all the functionality provided by the framework such that different sets of operations are performed by the client application than in the example of FIGS. 7-9 (e.g., the render graph nodes and render graphs may be generated without using the framework while the render graphs are executed using the framework's renderers). In addition, some potential operations and/or communication pathways have been omitted for clarity. For instance, in some cases a CPU may retrieve and pass data to a GPU (or vice-versa).

Moreover, while the examples shown illustrate many individual modules as separate blocks (e.g., the renderer selection engine 760, the graph generator 750, etc.), one of ordinary skill in the art would recognize that some embodiments may combine multiple modules into a single functional block or element. One of ordinary skill in the art would also recognize that some embodiments may divide a particular module into multiple sub-modules.

Figure 10:
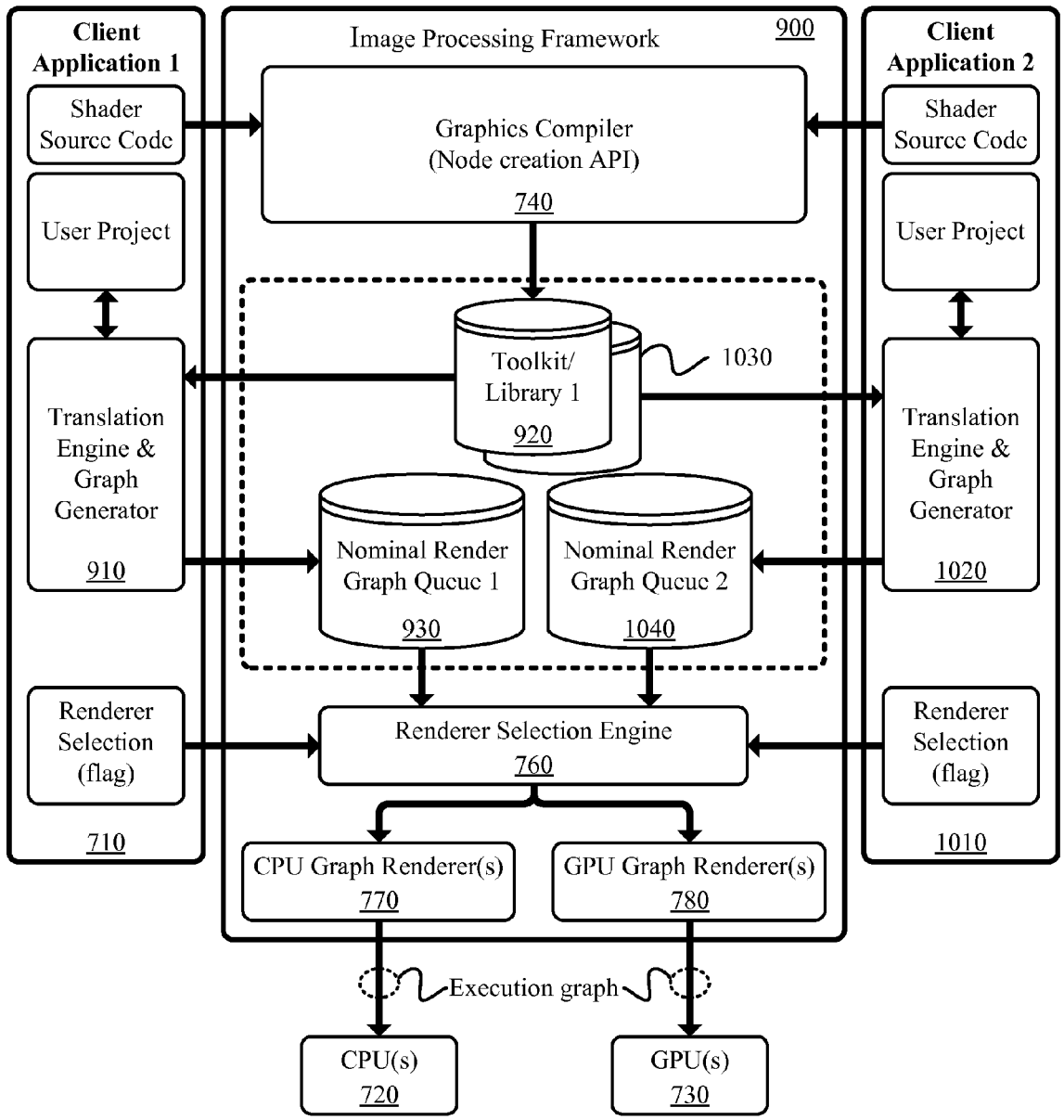
FIG. 10 illustrates the alternative framework architecture shown in FIG. 9 as used by multiple client applications.

FIG. 10 illustrates the alternative framework architecture 900 shown in FIG. 9 as used by multiple client applications. Specifically, this figure shows two client applications 710 and 1010 using the framework 900 to generate multiple toolkits 920 and 1030. Each toolkit corresponds to a particular client application 710 or 1010. The toolkits 790 and 1030 are used by the appropriate client application's translation engine and graph generator 910 or 1020. The elements of toolkits 790 and 1030 are matched to the operations specified by the appropriate client application's render description by the translation engine and graph generator 910 or 1020. The translation engine and graph generator 910 or 1020 then generates render graphs to be stored in a render graph queue 930 or 1040. After the render graph queues 930 or 1040 have been generated, the renderer selection engine 760 routes the graphs to the appropriate renderer 770 or 780 for processing and execution. One of ordinary skill in the art will recognize that although the example of FIG. 10 shows two client applications, the framework may in fact interact with an arbitrary number of client applications.

III. Node Generation

The following section describes the modules and procedures used to generate render graph nodes from fragment programs (also referred to as "shaders"). Sub-section III.A describes the architecture of the graphs compiler that is used to generate the render graph nodes. Sub-section III.B describes the transformation of the received source code included in the shader into a render graph node format. Sub-section III.C describes the translation of the source code into the various target formats to be included in the render graph node. Sub-section III.D describes the automatic generation of ROI and DOD functions that are used at render-time to optimize performance. Sub-section III.E describes fingerprinting a shader such that a GPU selected at render time may more efficiently process a render graph.

A. Graphics Compiler Architecture

Figure 11:
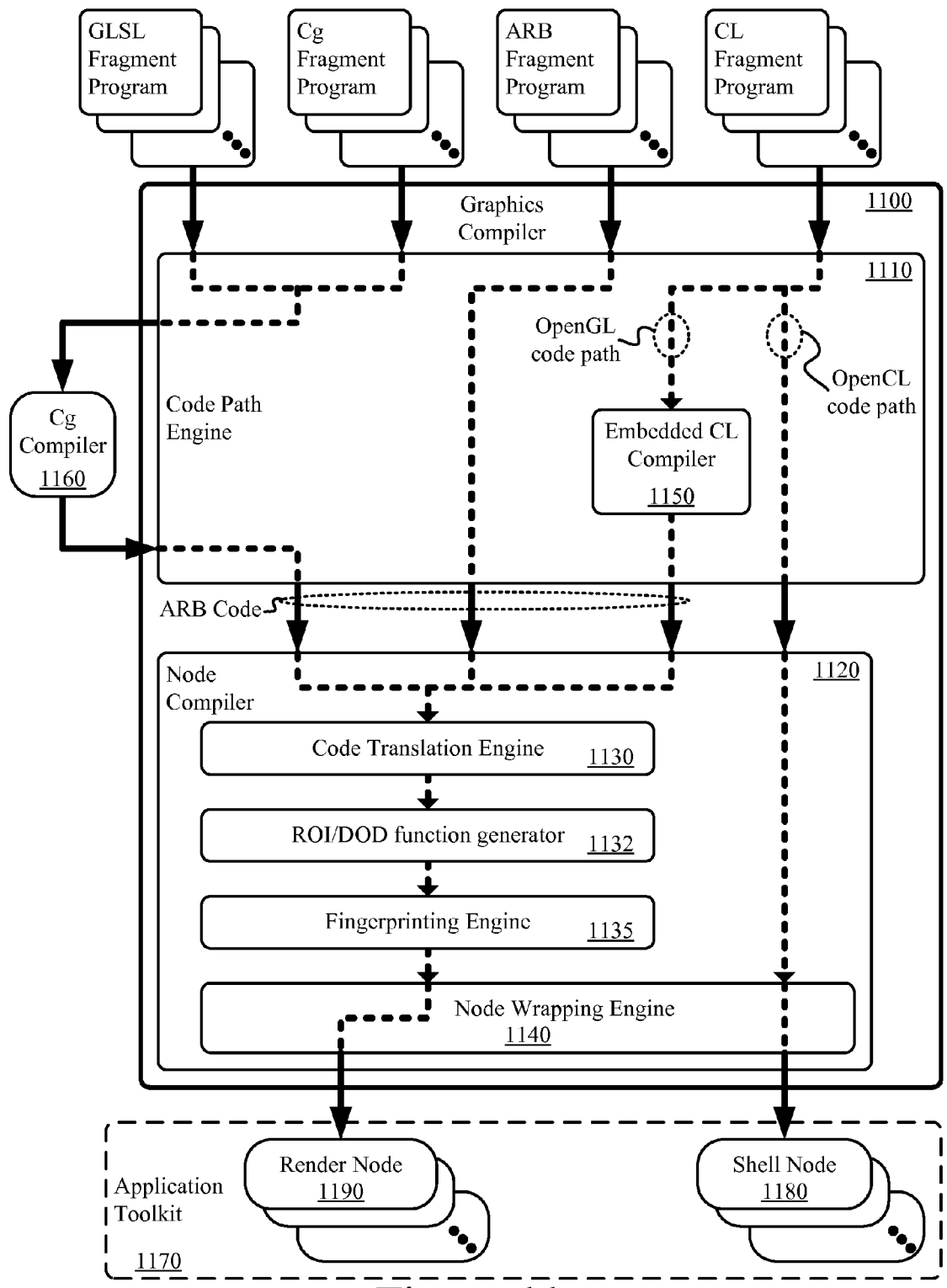
FIG. 11 illustrates the graphics compiler of some embodiments.

FIG. 11 illustrates the graphics compiler 1100 of some embodiments. Specifically, this figure shows the various processing paths used to convert fragment programs written in various languages into render graph nodes. As shown, the graphics compiler 1100 includes a code path engine 1110 and a node compiler 1120. The code path engine 1110 includes an embedded CL compiler 1150 in some embodiments. In addition, the code path engine 1110 is able to automatically call an external Cg compiler 1160 as needed. The node compiler 1120 of some embodiments includes a code translation engine 1130, an ROI/DOD function generator 1132, a fingerprinting engine 1135, and a node wrapping engine 1140.

The code path engine 1110 of some embodiments identifies the type of file provided to the graphics compiler 1100 and routes the file to the appropriate compiler resource based on the identified file type. The embedded CL compiler 1140 of some embodiments transforms a fragment program identified as CL code and determined to have an OpenGL code path into an ARB-based fragment program. The external Cg compiler 1150 of some embodiments transforms a fragment program identified as GLSL or Cg code into an ARB-based fragment program. The node compiler 1120 of some embodiments (1) receives fragment programs, (2) translates the received program into alternative formats, (3) generates various functions and other data, and (4) encapsulates the translated code in a render graph node.

As shown, the graphics compiler of some embodiments may receive various types of fragment programs (e.g., ARB, Cg, etc.) that need to be transformed into render graph nodes. These fragment programs are received from a client application at compile-time (i.e., when the client application is generated). The code path engine 1110 receives the fragment programs and identifies the type of code included in the fragment program. In some embodiments, the code path engine identifies the type of code by evaluating information included in the shader, such as header information, specific function calls, etc. Based on the type of code identified, the code path engine routes the fragment program to the node compiler 1120, the embedded CL compiler 1150, or the external Cg compiler 1160 as appropriate.

When the input file type is identified as a CL fragment program, the code path engine 1110 of some embodiments further determines whether the CL fragment program will follow an OpenGL code path or an OpenCL code path. In some cases, the OpenCL code path is selected when the CL fragment program does not require any OpenGL functionality (e.g., when no 3-D rendering is required, such as when the GPU is used for non-graphical computations or operations). When the OpenGL code path is selected by the code path engine, the CL fragment program is sent to the embedded CL compiler 1150. However, when the OpenCL code path is selected, the CL fragment program is sent to the node compiler 1120.

As shown, the embedded CL compiler 1150 receives OpenCL fragment programs identified as having an OpenCL code path by the code path engine 1110. The embedded CL compiler 1150 then compiles the received code into ARB format. After compiling the received code, the embedded CL compiler passes the ARB code to the node compiler 1120 for further processing.

The code path engine 1110 of some embodiments automatically invokes the external Cg compiler 1160 and controls the passing of data back and forth between the graphics compiler 1100 and the external Cg compiler 1160 using a communication engine (not shown). Such a communication engine may pass the fragment program to the external Cg compiler 1160. The communication engine may then receive the transformed code back from the external Cg compiler before passing the transformed code to the node compiler 1120.

The external Cg compiler 1160 receives fragment programs from the code path engine 1110. In some embodiments, the fragment program is passed from the code path engine to the external Cg compiler 1160 using the communication engine. The external Cg compiler 1160, in turn, compiles the received code into ARB format. After compiling the received code, the external Cg compiler 1160 passes the ARB code back to the code path engine 1110. In some embodiments, the ARB code is passed from the external Cg compiler 1160 to the code path engine 1110 using the communication engine.

As shown, the node compiler 1120 of some embodiments may receive CL fragment programs that were determined to be on the OpenCL code path. Such fragment programs are "wrapped" by the node wrapping engine 1140 included in the node compiler 1120 of some embodiments and stored in the application toolkit 1170 as shell nodes 1180. The generation of the shell nodes will be described in more detail in sub-section III.B below.

In addition to processing CL fragment programs that were determined to be on the OpenCL code path, the node compiler may receive ARB-based fragment programs directly from the code path engine 1110, or indirectly through the embedded CL compiler 1150, and/or the external Cg compiler 1160. When the node compiler 1120 receives ARB-based code, the code is passed to the code translation engine 1130 included in the node compiler 1120 of some embodiments. The code translation engine then translates the code before passing the translated code to the ROI/DOD function generator 1132.

The ROI/DOD function generator 1132 evaluates the ARB-based code to generate ROI and DOD functions (if possible). The generation of ROI and DOD functions will be described in more detail below in sub-section III.D.

The fingerprinting engine 1135 evaluates the received code to generate a "fingerprint" of the fragment program that may be used during later optimization of a render graph. The fingerprinting of fragment programs will be described in more detail below in sub-section III.E.

The node wrapping engine 1140 receives the output of the fingerprinting engine 1135 and generates a graph node 1180 that includes the various code translations generated by the code translation engine 1130, the ROI and DOD functions generated by the ROI/DOD function generator 1132, and the shader fingerprint generated by the fingerprinting engine 1135. In some embodiments, the node compiler 1140 also generates various setup functions and/or other information that may be used later in the rendering flow. The node compiler 1120 of some embodiments then stores the graph node 1190 in the application toolkit 1170 as a standard (i.e., non-shell) graph node.

After the node wrapping engine 1140 of some embodiments wraps a node, the node may be stored in an application toolkit 1170. The application toolkit includes shell nodes 1180 that include wrapped OpenCL code, and render graph nodes 1190 that include multiple variants of code, various setup functions, and other data and information that may be used when the node is executed. In addition to storing the render graph nodes 1190 and 1180, some embodiments assign a "handle" to each generated node such the node may be retrieved at a later time. In some cases, a list of handles with references to the nodes is updated as each node is generated. Such handles (and/or the list of handles) may be made available to a client application such that the client application may match a particular node to a particular set of image processing operations when generating a user project render description and/or when generating a render graph.

Although the graphics compiler 1100 has been described with reference to certain details, one of ordinary skill in the art will recognize that the graphics compiler could be implemented in various ways without departing from the spirit of the invention. For instance, in some embodiments the ROI/DOD function generator 1132 may be combined with the fingerprinting engine 1135.

While the preceding sub-section has described the components of the graphics compiler and the various code paths that may be used, the following sub-section describes the various components of the generated render graph nodes. In addition, the following sub-section describes a conceptual process that is used to transform fragment programs, thus converting the fragment programs into render graph nodes.

B. Code Transformation

Figure 12:
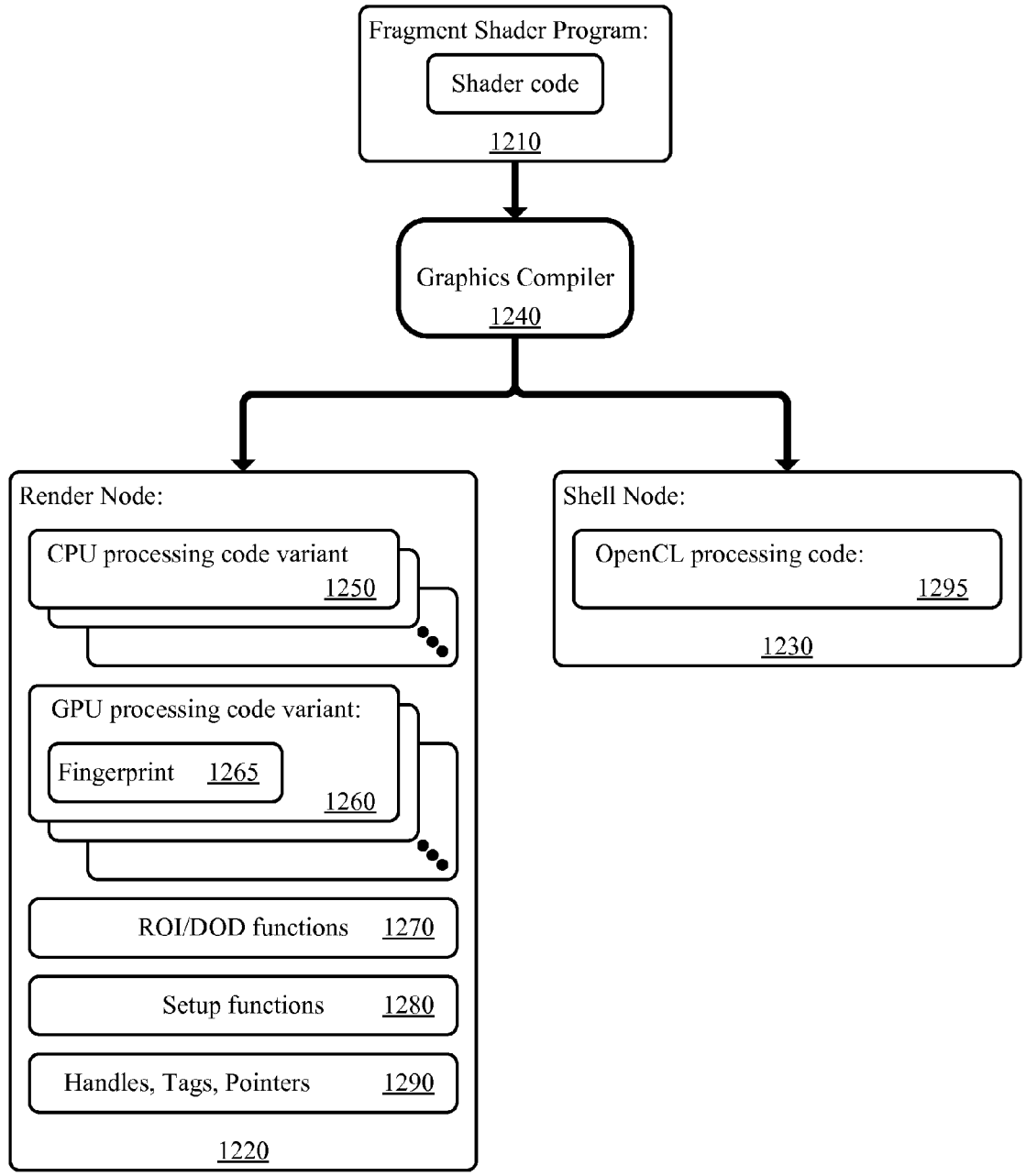
FIG. 12 illustrates a conceptual example of the transformation of a fragment program into a render graph node or shell node by the graphics compiler of some embodiments.

FIG. 12 illustrates a conceptual example of the transformation of a fragment program 1210 into a render graph node 1220 or shell node 1230 by the graphics compiler 1240 of some embodiments. Specifically, this figure shows the various components that are included in the render graph node 1220 in some embodiments. As shown, and as described above, the graphics compiler 1240 (which is the same graphics compiler 1100 as described above in reference to FIG. 11) receives a fragment program 1210 that includes some shader code used to implement a particular set of image-processing functions (e.g., color correction, blend, etc.) and transforms the received fragment program 1210 into a standard render graph node 1220 or a shell node 1230.

As shown, the render graph node of some embodiments includes one or more CPU processing code variants 1250, one or more GPU processing code variants 1260, ROI and DOD functions 1270, setup functions 1280, and various handles, tags, pointers, and/or other information 1290. The shell node 1230 of some embodiments includes OpenCL processing code 1295 embedded in a high-level programming language function (e.g., a C++ function).

Each of the CPU processing code variants 1250 in the render graph node 1220 includes a transformation of the received fragment shader program 1210 that has been optimized for execution on a particular CPU (e.g., Intel, PowerPC, etc.). In addition, the code is translated from the format of the received shader program 1210 into a format that may be executed on a CPU (e.g., C++ format). Although various examples throughout the specification refer to C++ as an example of a high-level language or ARB as an example of a low-level language, one of ordinary skill will recognize that different embodiments may receive and generate different appropriate formats than those described herein without departing from the spirit of the invention.

Each of the GPU processing code variants 1260 in the render graph node 1220 includes the received shader program 1210 (or a translation thereof) embedded in a C++ function. Each GPU processing code variant 1260 also includes a fingerprint 1265 of the estimated shader resources used by the node. The embedded shader program included in each GPU processing code variant 1260 may be generated and/or formatted in various ways. For instance, some embodiments receive ARB code (or receive the code in a different format and translate the code into ARB format) and create a C++ function that includes the ARB code as comment within the C++ function. In this manner, the graphics compiler 1240 is able to pass the fragment program (as a render graph node) to a selected GPU at run-time.

As described above, the ROI and DOD functions 1270 included in the render graph node 1220 are generated such that the render graph nodes may be efficiently executed by a particular rendering resource selected at run-time. The setup functions 1280 included in the render graph node 1220 are generated such that the render graph nodes may be optimized for the particular rendering resource that is chosen at run-time. These functions are used to calculate the various inputs to processing nodes in some embodiments. In addition, the setup functions may include various data that may be used when optimizing the processing code for execution on a particular rendering resource.

The handles, tags, and pointers 1290 of some embodiments are provided to improve the efficiency of the setup, optimization, and initialization of render graphs that is performed at run-time. For instance, location tags may be used to specify the location of a particular GPU code variant within the node 1220. In this way, run-time efficiency is improved because the renderer does not have to search the node at run-time to identify the location of the GPU code variant that corresponds to the selected rendering resource. In addition, the handle may be used to identify render nodes using a look-up table or other appropriate data structure.

Figure 13:
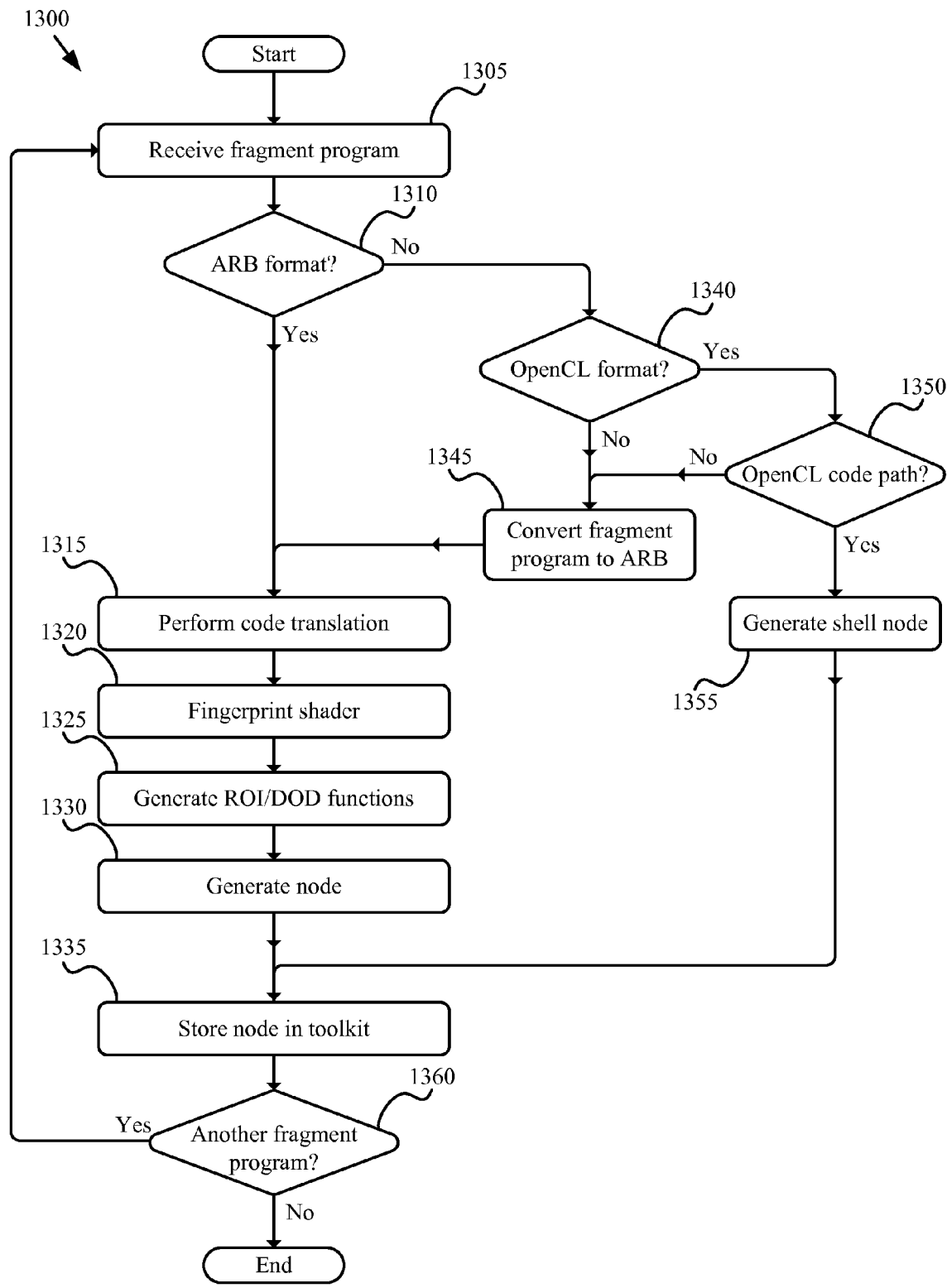
FIG. 13 illustrates a conceptual process used by some embodiments to transform a received fragment program into a render graph node.

FIG. 13 illustrates a conceptual process 1300 used by some embodiments to transform a received fragment program into a render graph node. Process 1300 will be described with reference to FIGS. 11-12. As shown, the process receives (at 1305) a fragment program. The fragment program may be coded in a number of different formats depending on the original target resource, as described above in reference to FIG. 11.

Next, the process determines (at 1310) whether the received program is in ARB format. In some cases this determination is made by a code path engine such as the code path engine 1110 described above. When the process determines (at 1310) that the fragment program is not in ARB format, the process proceeds to operation 1340 which is described below. Otherwise, the performs (at 1315) code translation. The code translation process will be described in more detail in subsection III.C below.

The process then fingerprints (at 1320) the received fragment program. The fingerprinting may be performed by a module such as the fingerprinting engine 1135 of the node compiler 1120. The resulting fingerprint may be stored as an element of a render graph node, such as the fingerprint 1265 included in each GPU processing code variant 1260 of the render graph node 1220.

Next, the process generates (at 1325) ROI and DOD functions, if possible. In some cases, the ROI and/or DOD functions may be undefined or otherwise may not be able to be efficiently calculated. In these cases, a flag or warning may be generated in place of the functions such that a developer-user may manually provide the functions if desired. The generation of the ROI and DOD functions may be performed by a module such as the ROI/DOD function generator 1132 of the node compiler 1120. The resulting functions may be stored as an element of a render graph node, such as the ROI/DOD functions 1270 included in the render graph node 1220.

The process then generates (at 1330) the render graph node. In some cases, node generation includes creating various setup functions. These setup functions may be generated by a module such as the node wrapping engine 1140 of the node compiler 1120 described above. The setup functions may then be stored as an element of a render graph node, similar to setup functions 1280. In addition to the setup functions, the process of some embodiments may include support information such as the handles, tags, and pointers 1290 as a node element. Furthermore, node generation may include embedding the elements of the node within a higher-level function (e.g., a C++ function). Such embedding may be performed by a module such as the node wrapping engine 1140. After generating (at 1330) the node, the process proceeds to operation 1335, which is described below.

In some cases, the input code is not provided in ARB format. Thus, when the process determines (at 1310) that the fragment program is not in ARB format, the process next determines (at 1340) whether the program is in OpenCL format. When the process determines (at 1340) that the program is not in OpenCL format, the process converts (at 1345) the program to ARB format and proceeds to operation 1315, which was described above. This conversion to ARB format may be performed by a module such as the Cg compiler 1160 in some embodiments.

When the process determines (at 1340) that the program is in OpenCL format, the process determines (at 1350) whether the code will follow the OpenCL code path. This determination may be made by a module such as the code path engine 1110. When the process determines (at 1350) that the code will not follow the OpenCL code path (i.e., that the code will follow the OpenGL code path), the process converts (at 1345) the program to ARB format. The conversion to ARB format may be performed by the embedded CL compiler 1150 in some embodiments. The process then proceeds to operation 1315 which was described above.

Otherwise, the process generates (at 1355) a shell node. This determination may be made by a module such as the code path engine 1110. The shell node may be generated by a node compiler 1120 as in the example of FIG. 11. The generation of the shell node may include wrapping the program in a function (e.g., a C++ function) such that the source code may be retrieved at a later time (i.e., at run-time). The wrapping may be performed by a module such as the node wrapping engine 1140 of the node compiler 1120. The process stores (at 1335) the node in the application toolkit. The application toolkit may be stored using any appropriate storage medium and data structure. The stored node is thus available for later use in building and executing a render graph.

After the node is stored (at 1335), the process determines (at 1360) whether there is another fragment program to transform. When the process determines that there is another program to transform, the process repeats operations 1305-1360 until the process determines (at 1360) that there are no other programs to transform, at which point the process ends.

One of ordinary skill in the art will recognize that process 1300 is a conceptual representation of the operations used to generate a set of nodes from a set of fragment programs. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

Although many of the examples above reference specific programming languages (e.g., C++, ARB, etc.), one of ordinary skill in the art will realize that these examples are given for illustrative purposes only. Different embodiments may receive, process, and/or output various programming languages other than those specifically given as examples.

C. Code Translation

Figures 14, 15:
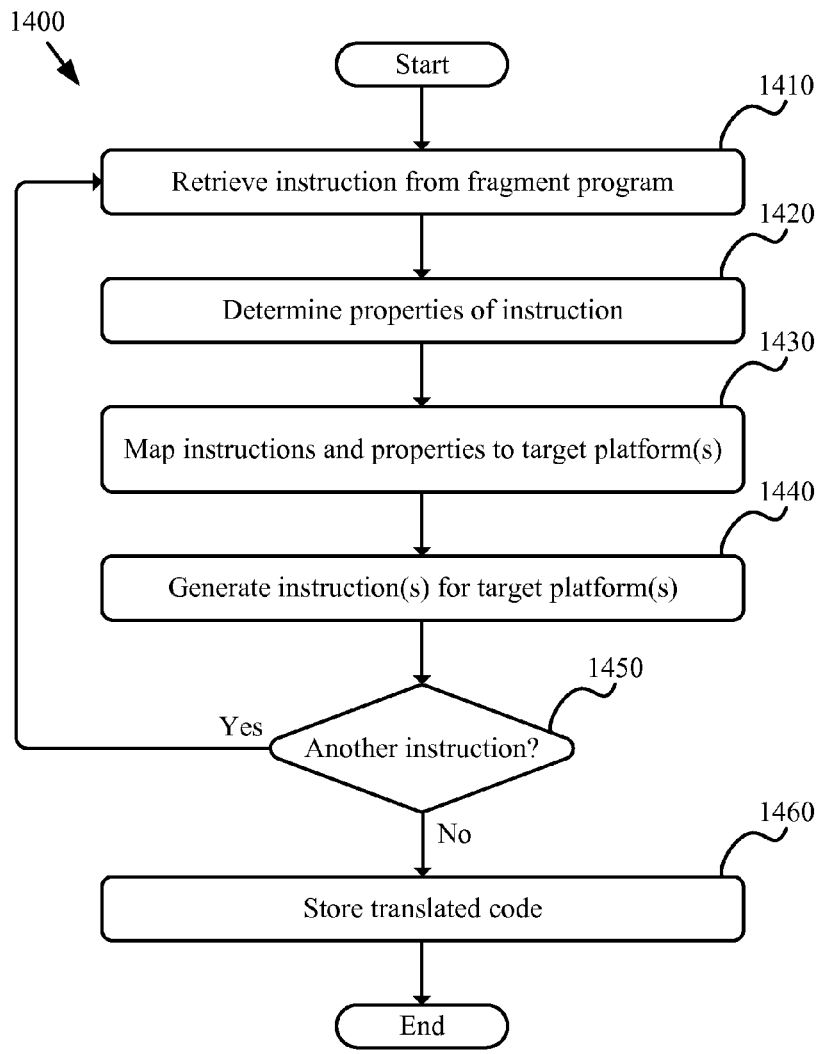
FIG. 14 illustrates a conceptual process used by some embodiments to translate a received fragment program from the provided format into the various formats associated with any potential target rendering resources.
FIG. 15 illustrates a conceptual example of a look-up table used by some embodiments to perform code translation.

FIG. 14 illustrates a conceptual process 1400 used by some embodiments to translate a received fragment program from the provided format (e.g., ARB) into the various formats associated with any potential target rendering resources (i.e., the formats associated with the various supported CPUs and GPUs). Process 1400 will be described with reference to FIGS. 11-13 and 15. As described above in reference to FIG. 13, in some embodiments the code translation is performed on ARB code. One of ordinary skill in the art will recognize that the code translation could be performed on different types of code in different embodiments.

Process 1400 begins when a fragment program is passed to a module such as the code translation engine 1130. As described above in reference to FIG. 13, in some embodiments the fragment program that is passed to the code translation engine 1130 is ARB format. Different embodiments may translate different formats of source code.

After receiving the fragment program, the process retrieves (at 1410) the next instruction (or set of instructions) from the fragment program. Instructions may include any functionality supported in the received format, such as variable or class definitions, function calls, etc. Next, the process determines (at 1420) the properties associated with the retrieved instruction. These properties could include identifying the function performed by a particular instruction as well as attributes such as variable name (and/or function name), etc.

The process then maps (at 1430) the instruction and its associated properties to one or more target platforms. In some embodiments, the framework includes a look-up table of instructions and their corresponding instructions on the various supported target platforms. In this manner, the process is able to identify one or more instructions for one or more target platform formats that correspond to the instruction retrieved at 1410.

FIG. 15 illustrates a conceptual example of such a look-up table 1500. As shown, the table includes a set of functions 1510 corresponding to the source code format and multiple sets of functions corresponding 1520 to the various code target formats. The process is thus able to use the look-up table to match a particular function from the set of source code functions 1510 to each of the code target function sets 1520.

Next, the process generates (at 1440) instructions for the target platform(s). The generated instructions (and associated attributes) achieve the same functionality as the instruction retrieved at 1410. In some cases, a single instruction may be translated into more than one instruction. In addition, in some cases, multiple instructions may be retrieved at 1410 and translated into a single instruction.

After generating (at 1440) the instructions for the target platform(s), the process determines (at 1450) whether there are other instructions in the fragment program. When the process determines that there are other instructions, the process repeats operations 1410-1450 until the process determines (at 1450) that there are no other instructions to translate.

When the process determines (at 1450) that there are no other instructions to translate, the process stores (at 1460) the translated code. The process then ends. In some embodiments, storing the translated code may include storage of the translated code in an intermediate format. Thus, in some embodiments the translated code may be passed to a module such as the node wrapping engine 1140 for final processing and storage within a complete render graph node 1190 in the application toolkit 1170. Thus, the translated code may be stored as node elements (e.g., 1250 and/or 1260) within a render graph node 1220 of some embodiments.

One of ordinary skill in the art will recognize that process 1400 is a conceptual representation of the operations used to translate received code into various output formats. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

In addition, one of ordinary skill will realize that the look-up table 1500 is a conceptual representation of the data structure that may be used to identify corresponding functions in different programming languages. Furthermore, although the table 1500 was illustrated with one set of input functions, different embodiments may support multiple input code formats.

D. Region of Interest and Domain of Definition Function Generation

As described above, some embodiments generate ROI and DOD functions during the code transformation process. The ROI function is used to calculate the region of an input image that is necessary to generate a desired region of an output image. The DOD function is used to calculate the region of an output image that is affected by a particular region of an input image.

Calculating the ROI and DOD functions at compile-time decreases the amount of processing necessary at run-time. In addition, the automatic generation of ROI and DOD functions relieves a developer-user of having to manually perform the calculations and code generation necessary to create the functions. In some cases, the ROI function is too complicated to be calculated automatically (e.g., when the function includes recursive operations such as a twirl operation). In addition, in some cases the DOD function, as the inverse of the ROI function, is undefined. In such cases, a warning flag (or some other indication) may be generated to alert a user that the automatic generation of the ROI and/or DOD functions has been unsuccessful. Before describing the automatic generation of ROI and DOD functions, several example operations and their associated ROIs and DODs will be described in reference to FIGS. 16-18 below.

Figure 16:
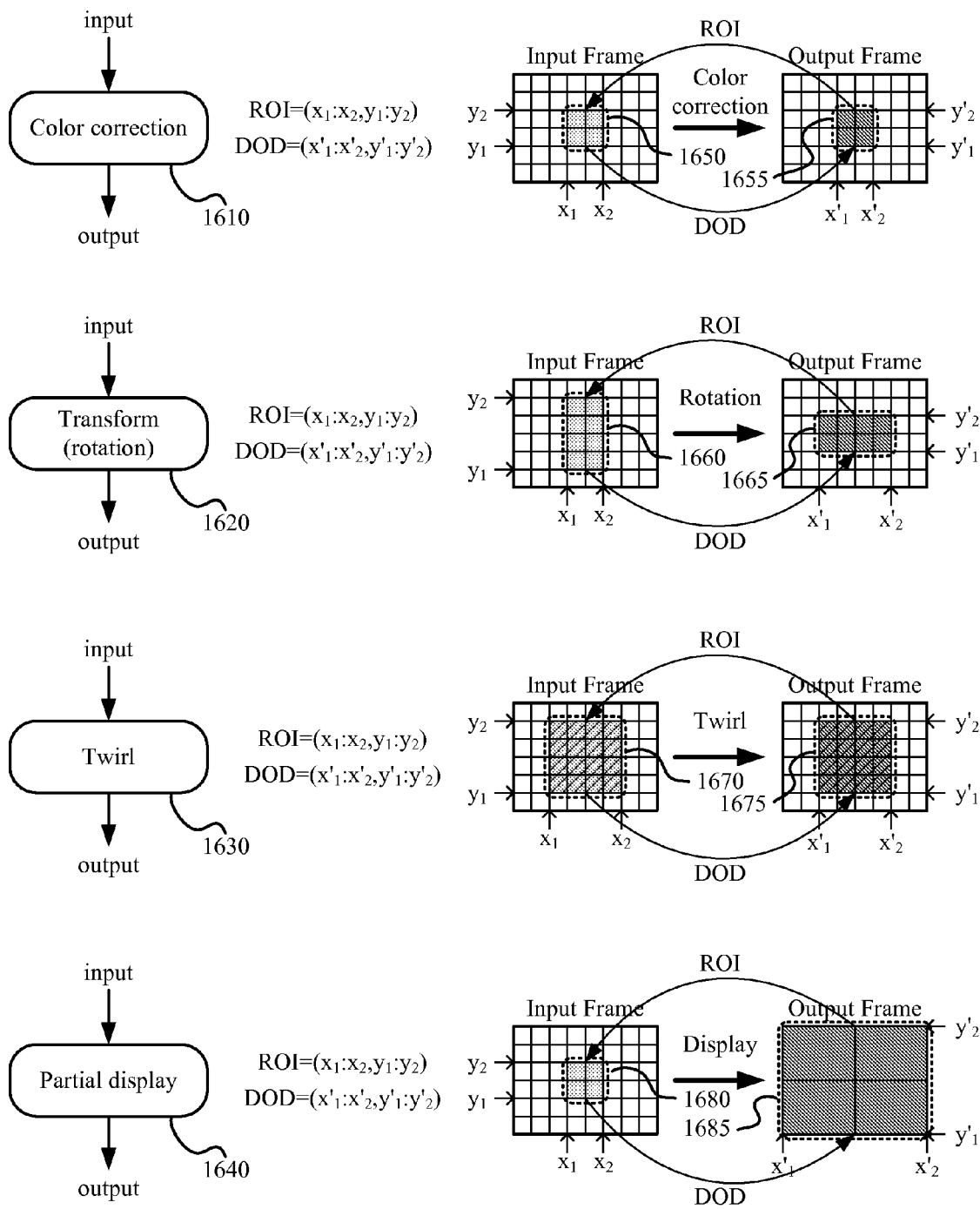
FIG. 16 illustrates several example image processing operations and their associated regions of interest ("ROI") and domains of definition ("DOD").

FIG. 16 illustrates several example image processing operations and their associated ROIs and DODs. Specifically, the figure includes four example operations 1610-1640. As shown, the first example operation 1610 is a color correction operation. The color correction operation is performed on a pixel by pixel basis in this example, and thus, the ROI 1650 at the input for a given output is simply the corresponding coordinates as those desired at the output. Thus, both the ROI 1650 and DOD 1655 in this example are defined by a direct relationship to the corresponding area at the output or input respectively.

The second example operation 1620 is a rotation operation. In contrast to the example above, the rotation operation includes a parameter (angle of rotation) that potentially affects its ROI 1660 and DOD 1665. In this case, the ROI 1660 and DOD 1665 are partly defined by the angle of rotation. Thus, in this example, the ROI and DOD functions will depend on the angle of rotation, and the generation of the ROI and DOD from the functions will require some calculation at run-time when the angle of rotation is known.

The third example operation 1630 is a twirl operation. In contrast to the examples above, the twirl operation recursively transforms the pixels at the input to generate the pixels at the output. In other words, the output pixels depend not only on the input pixels, but also on some intermediately-calculated pixels. In such a case, the ROI 1670 and DOD 1675 functions may not be able to be automatically generated in an efficient manner (as indicated by a different fill pattern than the other ROIs and DODs). As described below, when the ROI and DOD functions are not able to be automatically generated, the functions may be manually generated by a developer, or otherwise provided.

The fourth example operation 1640 is a partial display (or "zoom") operation. The partial display operation includes a parameter (zoom ratio) that potentially affects its ROI 1680 and DOD 1685. In this case, the ROI 1680 and DOD 1685 are partly defined by the zoom ratio. Thus, in this example, the ROI and DOD functions will depend on the zoom ratio, and the generation of the ROI and DOD from the functions may require some transformation of coordinates at run-time.

Figure 17:
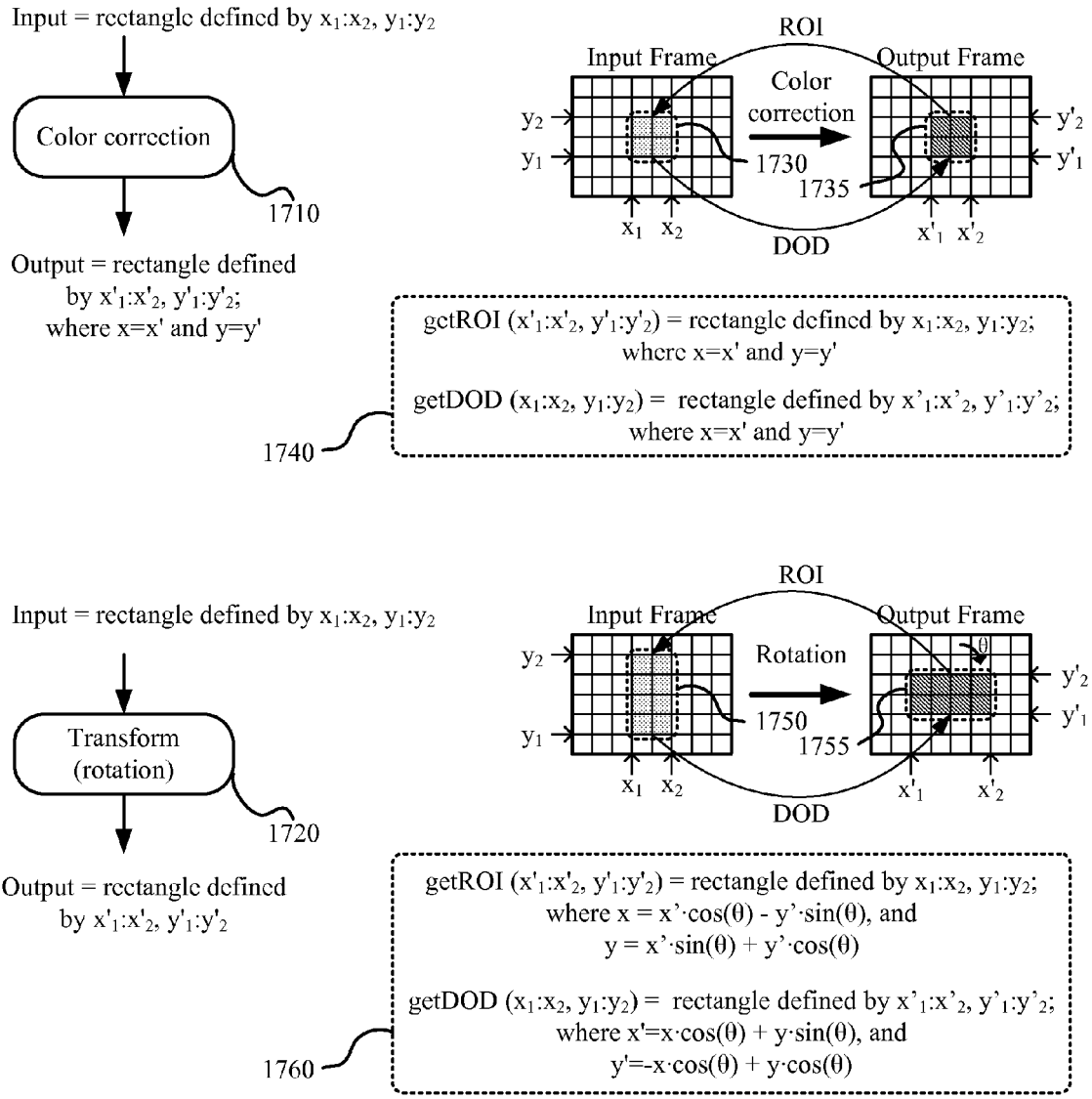
FIG. 17 illustrates several examples of ideal ROI and DOD calculations.

FIG. 17 illustrates several examples of ideal ROI and DOD calculations. Specifically, this figure shows the ROI and DOD calculations for a color correction operation 1710 and a rotation operation 1720. As shown, and as described above, a color correction operation has an output 1735 that corresponds directly to the input 1730, and vice versa. Thus, the getROI and getDOD functions 1740 (i.e., the ROI function and the DOD function used to calculate the ROI and DOD at run-time) each return output coordinates that exactly match the supplied input coordinates.

The rotation operation 1720, on the other hand, has an input 1750 that does not necessarily match its output 1755, but depends on the supplied parameter ($\theta$, or clockwise angle of rotation). Thus, in this example, the getROI and getDOD functions 1760 include a transformation of coordinates based on the supplied parameter.

Figure 18:
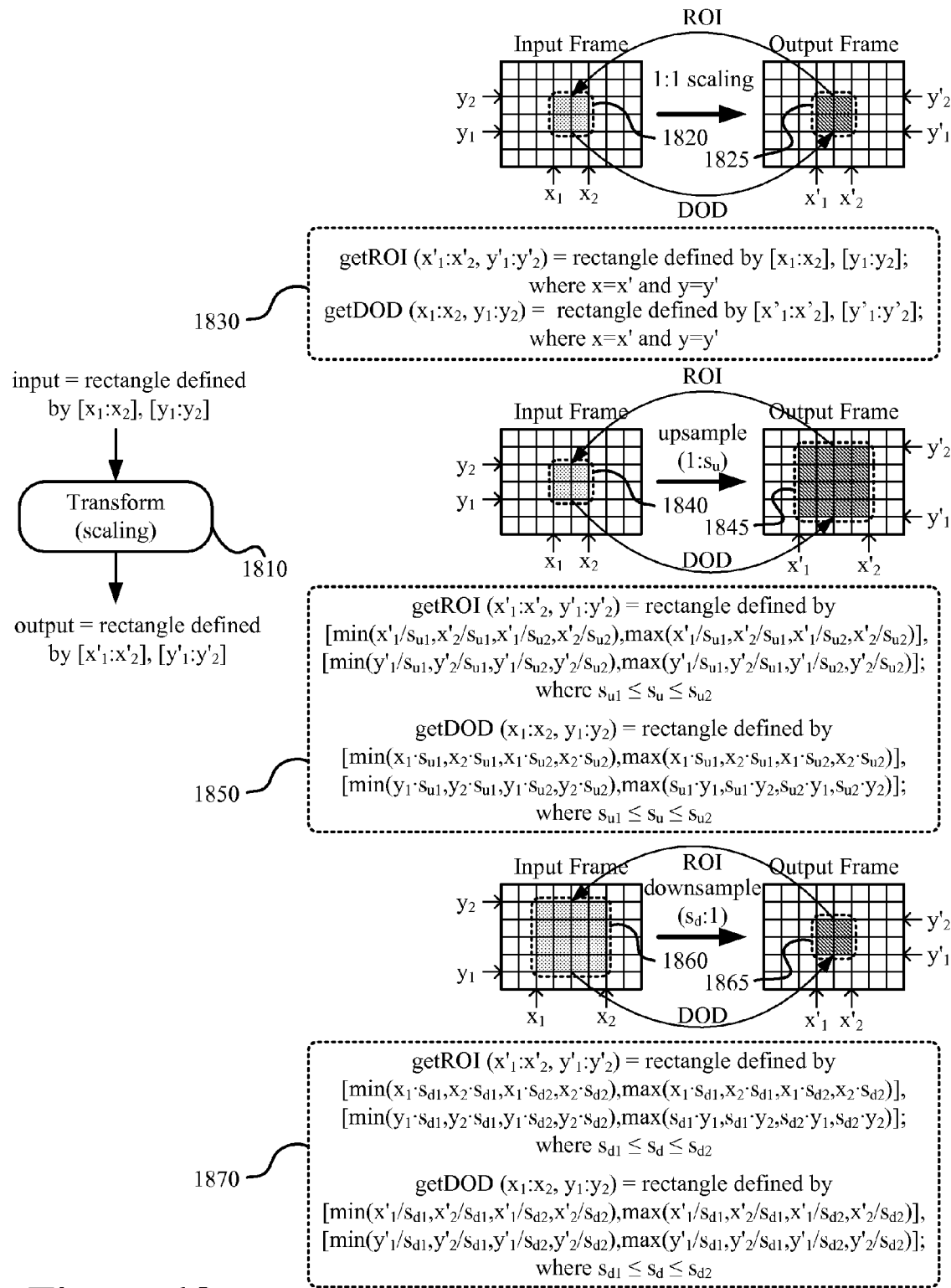
FIG. 18 illustrates calculation of the ROI and DOD calculations using interval arithmetic.

FIG. 18 illustrates calculation of the ROI and DOD calculations using interval arithmetic. Specifically, this figure illustrates several examples of a scaling operation 1810. As shown, the figure illustrates three example scaling operations and the resulting intervals that define the ROI and DOD for each operation.

When the scaling operation 1810 is a 1:1 scaling, the output 1825 corresponds directly to the input 1820, and vice versa.

Thus, the interval arithmetic results in getROI and getDOD functions 1830 that each return output coordinates that exactly match the supplied input coordinates. As will be described below, the 1:1 scaling is a specific example of an interval that may also be defined using variables.

When the scaling operation is a 1:N scaling (i.e., an "upsample"), the output frame will be larger (i.e., include more pixels) than the input frame. In this case, interval arithmetic may be used to define the range of values at the input that correspond to a range of values at the output, and vice versa. Thus, the interval arithmetic results in getROI and getDOD functions 1850 that each return output coordinates based on a scaling factor, $s_u$, and the supplied input coordinates. In this example, the scaling factor is defined by the interval $[s_{u1}:s_{u2}]$. In other words, the scaling factor is limited to a particular range of values (e.g., the upsample may use a factor between 1× and 8×).

As shown, the getROI function is defined such that, for an output rectangle 1845 defined by the interval $[x'_1:x'_2],[y'_1:y'_2]$, the input rectangle 1840 is defined by the interval $[\min(x'_1/s_{u1}, x'_2/s_{u1}, x'_1/s_{u2}, x'_2/s_{u2}), \max(x'_1/s_{u1}, x'_2/s_{u1}, x'_1/s_{u2}, x'_2/s_{u2})]$, $[\min(y'_1/s_{u1}, y'_2/s_{u1}, y'_1/s_{u2}, y'_2/s_{u2}), \max(y'_1/s_{u1}, y'_2/s_{u1}, y'_1/s_{u2}, y'_2/s_{u2})]$.

The getDOD function is defined such that, for an input rectangle 1840 defined by the interval $[x_1:x_2],[y_1:y_2]$, the output rectangle 1845 is defined by the interval $[\min(x_1 \cdot s_{u1}, x_2 \cdot s_{u1}, x_1 \cdot s_{u2}, x_2 \cdot s_{u2}), \max(x_1 \cdot s_{u1}, x_2 \cdot s_{u1}, x_1 \cdot s_{u2}, x_2 \cdot s_{u2})]$, $[\min(y_1 \cdot s_{u1}, y_2 \cdot s_{u1}, y_1 \cdot s_{u2}, y_2 \cdot s_{u2}), \max(s_{u1} \cdot y_1, s_{u1} \cdot y_2, s_{u2} \cdot y_1, s_{u2} \cdot y_2)]$.

When the scaling operation is a N:1 scaling (i.e., a "downsample"), the output frame will be smaller (i.e., include fewer pixels) than the input frame. In this case, interval arithmetic is used to define the range of values at the input that correspond to a range of values at the output, and vice versa. Thus, the interval arithmetic results in getROI and getDOD functions 1870 that each return output coordinates based on a scaling factor, $s_d$, and the supplied input coordinates. In this example, the scaling factor is defined by the interval $[s_{d1}:s_{d2}]$.

As shown, the getROI function is defined such that, for an output rectangle 1865 defined by the interval $[x'_1:x'_2],[y'_1:y'_2]$, the input rectangle 1860 is defined by the interval $[\min(x_1 \cdot s_{d1}, x_2 \cdot s_{d1}, x_1 \cdot s_{d2}, x_2 \cdot s_{d2}), \max(x_1 \cdot s_{d1}, x_2 \cdot s_{d1}, x_1 \cdot s_{d2}, x_2 \cdot s_{d2})]$, $[\min(y_1 \cdot s_{d1}, y_2 \cdot s_{d1}, y_1 \cdot s_{d2}, y_2 \cdot s_{d2}), \max(s_{d1} \cdot y_1, s_{d1} \cdot y_2, s_{d2} \cdot y_1, s_{d2} \cdot y_2)]$.

The getDOD function is defined such that, for an input rectangle 1860 defined by the interval $[x_1:x_2],[y_1:y_2]$, the output rectangle 1865 is defined by the interval $[\min(x'_1/s_{d1}, x'_2/s_{d1}, x'_1/s_{d2}, x'_2/s_{d2}), \max(x'_1/s_{d1}, x'_2/s_{d1}, x'_1/s_{d2}, x'_2/s_{d2})]$, $[\min(y'_1/s_{d1}, y'_2/s_{d1}, y'_1/s_{d2}, y'_2/s_{d2}), \max(y'_1/s_{d1}, y'_2/s_{d1}, y'_1/s_{d2}, y'_2/s_{d2})]$.

One of ordinary skill in the art will recognize that either set of equations 1850 or 1870 may be used to generate the ROI and DOD for the 1:1 scaling, the upsample, or the downsample. For instance, the equations 1850 could be used to generate the ROI and DOD for a downsample by using fractional values for $s_u$ (i.e., for a 4:1 downsample, $s_u$ may be set to 0.25). As another example, setting either scaling factor ($s_u$ or $s_d$) to 1 in the equations 1850 or 1870 results in the getROI and getDOD functions 1830.

The equations 1850 and 1870 are valid for the entire interval of scaling values $[s_{u1}:s_{u2}]$ and $[s_{d1}:s_{d2}]$, respectively. For instance, if an upsample operation can be performed from a ratio of 1:1 up to a ratio of 1:8, the ROI intervals are calculated based on the interval of scaling factors and not the actual scaling factor (which is known at run-time). Thus, the ROI and DOD calculations would not depend on the actual scaling factor used, but would be defined by the minimum and maximum scaling factor. This results in less accurate computation of the ROI interval, but also improves efficiency at run-time, because the interval does not depend on a calculation using a variable for the scaling factor (instead, the constant values are used).

One of ordinary skill in the art will recognize that, in addition to calculating the getROI and getDOD functions 1850 and 1870 using the interval of possible scaling factors, the functions could also be generated based on the actual scaling factor. Thus, for example, the getROI function for the upsample operation could be defined by the interval $[\min(x'_1/s_u, x'_2/s_u), \max(x'_1/s_u, x'_2/s_u)]$, $[\min(y'_1/s_u, y'_2/s_u), \max(y'_1/s_u, y'_2/s_u)]$, where $s_u$ is the actual scaling factor.

Figure 19:
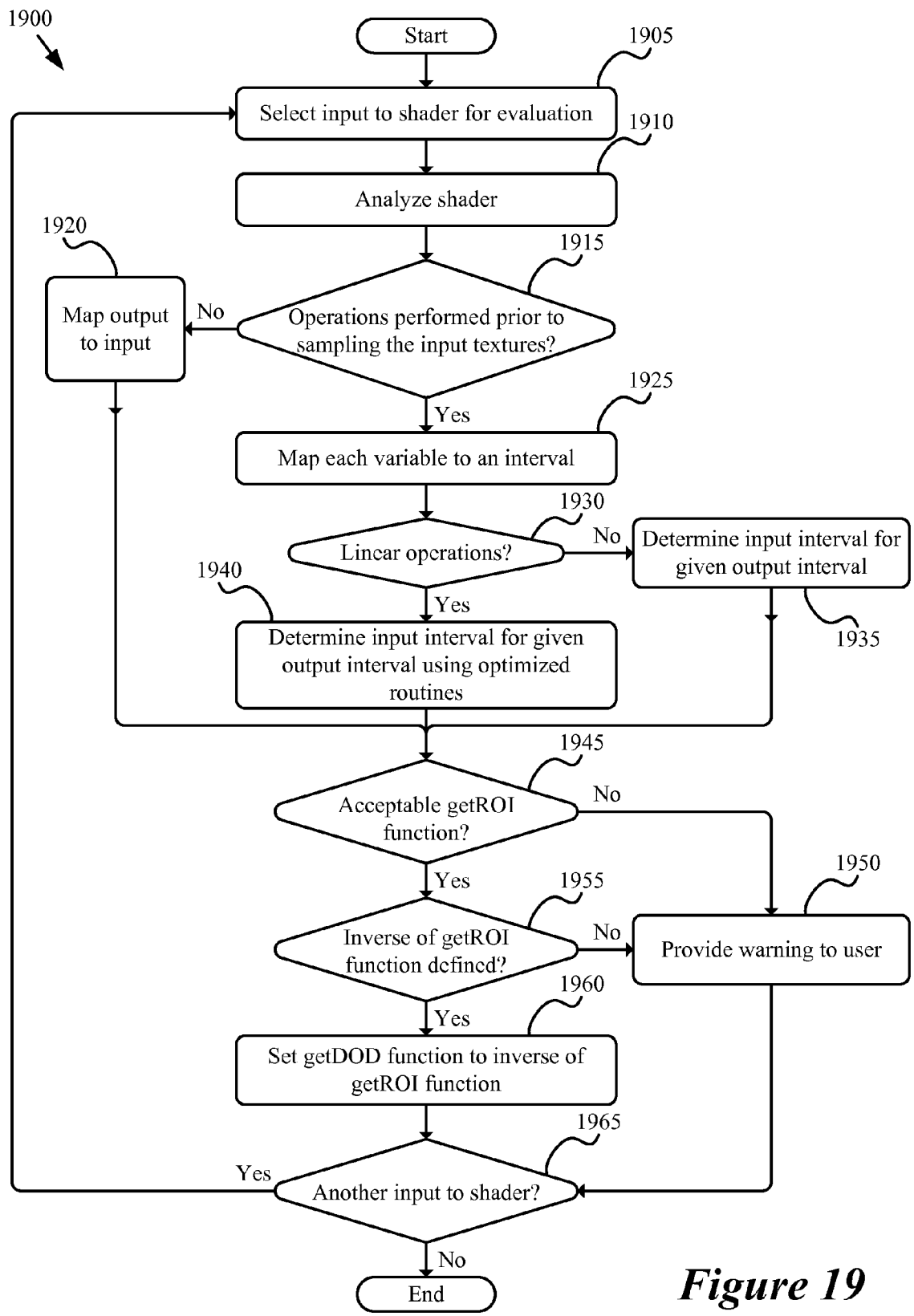
FIG. 19 illustrates a conceptual process used to automatically generate the ROI and DOD functions at compile-time.

FIG. 19 illustrates a conceptual process 1900 used to automatically generate the ROI and DOD functions at compile-time. FIG. 19 will be described with reference to FIGS. 11-12 and 16-18. Process 1900 begins when it receives a fragment program for analysis. In some embodiments, the generation of the ROI and DOD functions may be performed by a module such as ROI/DOD function generator 1132. The ROI/DOD function generator may receive the fragment program from a module such as the code translation engine 1130 in some embodiments. The fragment program may include operations such as those described above in reference to FIGS. 16-18.

As shown, after receiving the fragment program for analysis, the process selects (at 1905) an input to the shader for evaluation. Shaders may include multiple inputs and/or multiple outputs, thus each shader may include multiple ROIs (one for each input) and multiple DODs (one for each output). After selecting (at 1345) an input for evaluation, the process analyzes (at 1910) the shader. This analysis may be performed by a module such as the ROI/DOD function generator 1132. In some embodiments, the analysis includes evaluating the shader code to identify coordinate transformations. These coordinate transformations are mathematical operations (e.g., shift, add, multiply, etc.). The mathematical operations may be expressed as a "tree" of operations.

After analyzing (at 1910) the shader, the process determines (at 1915) whether any coordinate transformation operations are performed prior to sampling the input textures (i.e., operations that will affect the ROI). When the process determines (at 1915) that no coordinate transformation operations are performed before sampling the input textures, the process maps (at 1920) the desired output area to the corresponding input area. This mapping (at 1920) of output to input may be performed, for example, when the shader performs a color correction operation 1610 or 1710, a 1:1 scaling operation 1810, or some other transformation that operates on a particular pixel (or set of pixels) at the input to generate a particular pixel (or set of pixels) at a corresponding location at the output.

When the process determines (at 1915) that coordinate transformation operations are performed before sampling the input textures, the process maps (at 1925) each variable to an interval. Such an interval may correspond to a particular parameter that may be set within a range of values. For instance, the scaling operation 1810 may be defined such that the scaling factor, $s_u$, is limited to a particular range of values (e.g., an upsample that may range from a 1× upsample to an 8× upsample). In such a case, the upsample ratio parameter may be mapped to a variable with an interval of [1:8].

Next, the process determines (at 1930) whether the coordinate transformation operations performed before sampling the input textures are linear operations. Linear operations include addition and multiplication using uniform values. Scaling operations (e.g., 1810) and rotation operations (e.g., 1620 or 1710) are examples of linear operations that use a combination of multiplication and/or addition operations. Non-linear operations include addition and multiplication with non-uniform values (e.g., using other coordinates) as well as other operations (i.e., operations besides addition and multiplication). The twirl operation 1630 is one example of a non-linear operation. When the process determines (at 1930) that the operations are not linear operations, the process determines (at 1935) the input interval that corresponds to a particular output interval (i.e., the getROI function).

When the process determines (at 1930) that the coordinate transformation operations are linear operations, the process determines (at 1940) the input interval that corresponds to a particular output interval using optimized routines. These optimized routines are simplified versions of the routines used to generate the interval for a set of non-linear operations.

The process determines (at 1935 or 1940), the input interval corresponding to the output interval based on the shader analysis performed at 1910. This determination may be made using interval arithmetic, as described above in reference to FIG. 18. Alternatively or conjunctively, the determination may be made using a coordinate transformation as described above in reference to the rotation example 1720 of FIG. 17. In some cases, the determination of the input interval is made by reversing the set of coordinate transformation operations performed prior to sampling the input textures. For instance, if a shader shifted a set of coordinates in the x direction by a factor of $X_1$, the process would reverse the operation when determining the ROI (i.e., the process would add a shift in the −x direction by a factor of $X_1$. In some cases, the determined input interval is extremely large, or the process cannot automatically calculate the input interval. In such cases, a warning flag may be generated, as will be described below.

In some embodiments, the ROI function (and/or the DOD function) may be generated using a rough estimate. For instance, referring to the example rotation 1720, the ROI may be calculated by adding a buffer zone around the defined output area. In other words, some embodiments may add an offset in each direction to the output area in order to generate the ROI. This buffer zone may be at least partially based on the size of the output area. For example, the buffer zone may be calculated by determining the longest side of the output rectangle, using that determination to generate a square region and then adding a number of pixels in each direction, where the number of pixels is based on the size of the square.

After determining (at 1935 or 1940) the input interval for a given output interval, the process determines (at 1945) whether an acceptable getROI function was generated (at 1935 or 1940). As described above, in some cases the automatic generation of the getROI function results in an extremely large input interval or the process is unable to converge on a solution for the getROI function. The twirl operation 1630 is one example of such a function. When the process determines (at 1945) that the getROI function is not acceptable, the process provides (at 1950) a warning to the developer-user. The warning may be a flag or other indication that the getROI function is undefined, or generates a very large input interval for a given output interval. The developer-user may then manually generate the getROI function and add it to the shader code included in a particular render graph node. The process then proceeds to operation 1965, which is described below.

When the process determines (at 1945) that the getROI function is acceptable, the process determines (at 1955)

whether the inverse of the getROI function is defined. In some cases, the getROI function may not have a mathematical inverse (e.g., when the getROI function includes an absolute value calculation). When the inverse of the getROI function is undefined, the process provides (at 1955) a warning to the developer-user. This warning is similar to the warning generated when the process determines (at 1945) that the getROI function is not acceptable. In such cases, a developer-user may generate the inverse manually. When the process determines (at 1955) that the inverse of the getROI function is defined, the process sets (at 1960) the getDOD function to the inverse of the getROI function.

Next, the process determines (at 1965) whether there is another input to the shader. When the process determines (at 1965) that there is another input to the shader, the process repeats operations 1905-1965 until the process determines (at 1965) that there are no more inputs to the shader, at which point the process ends. The resulting ROI and DOD functions may subsequently be stored in a render graph node, such as element 1270 of render graph node 1220.

One of ordinary skill in the art will recognize that process 1900 is a conceptual representation of the operations used to generate ROI and DOD functions. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

E. Shader Fingerprinting

Figure 20:
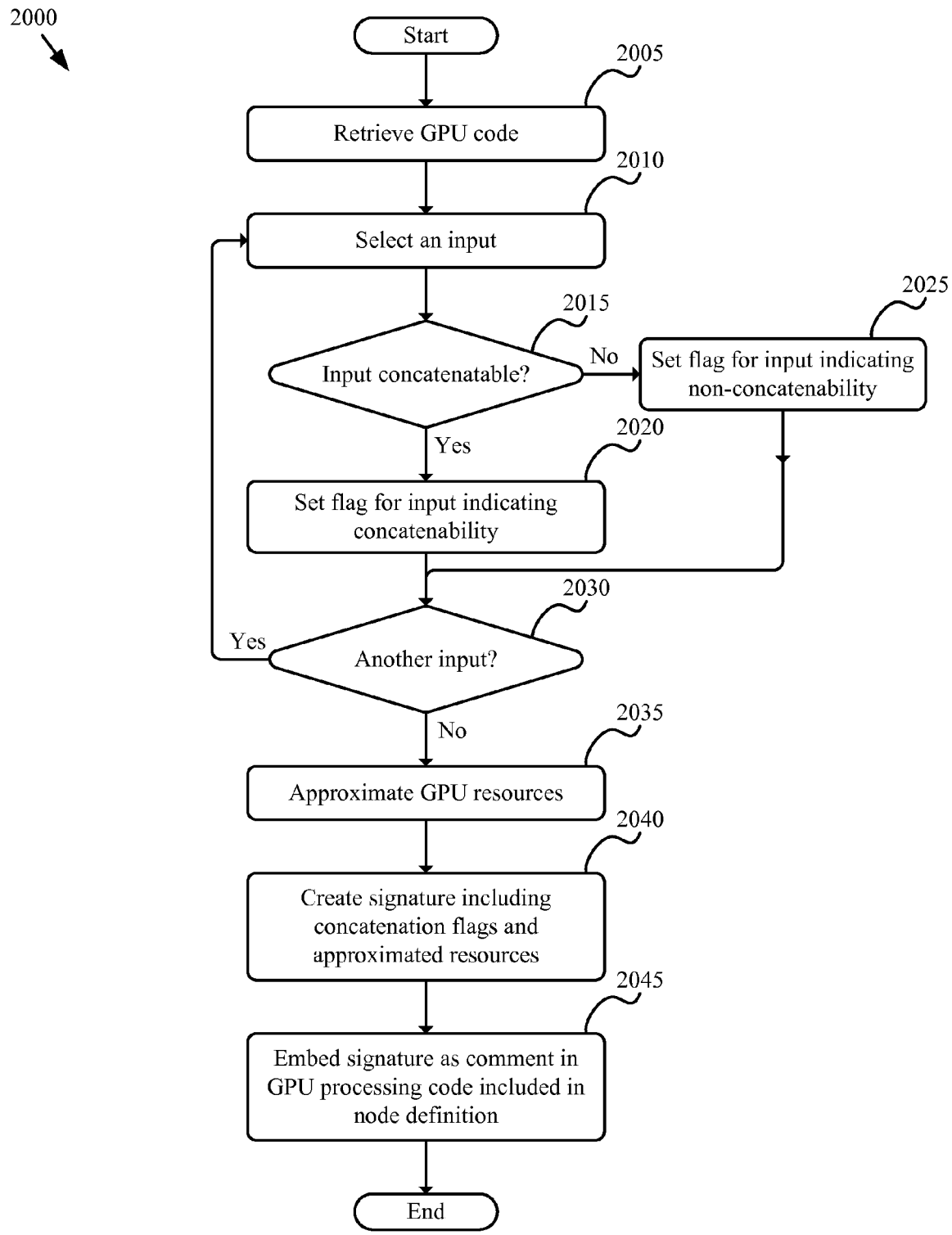
FIG. 20 illustrates a conceptual process for generating a shader fingerprint.
Figure 21:
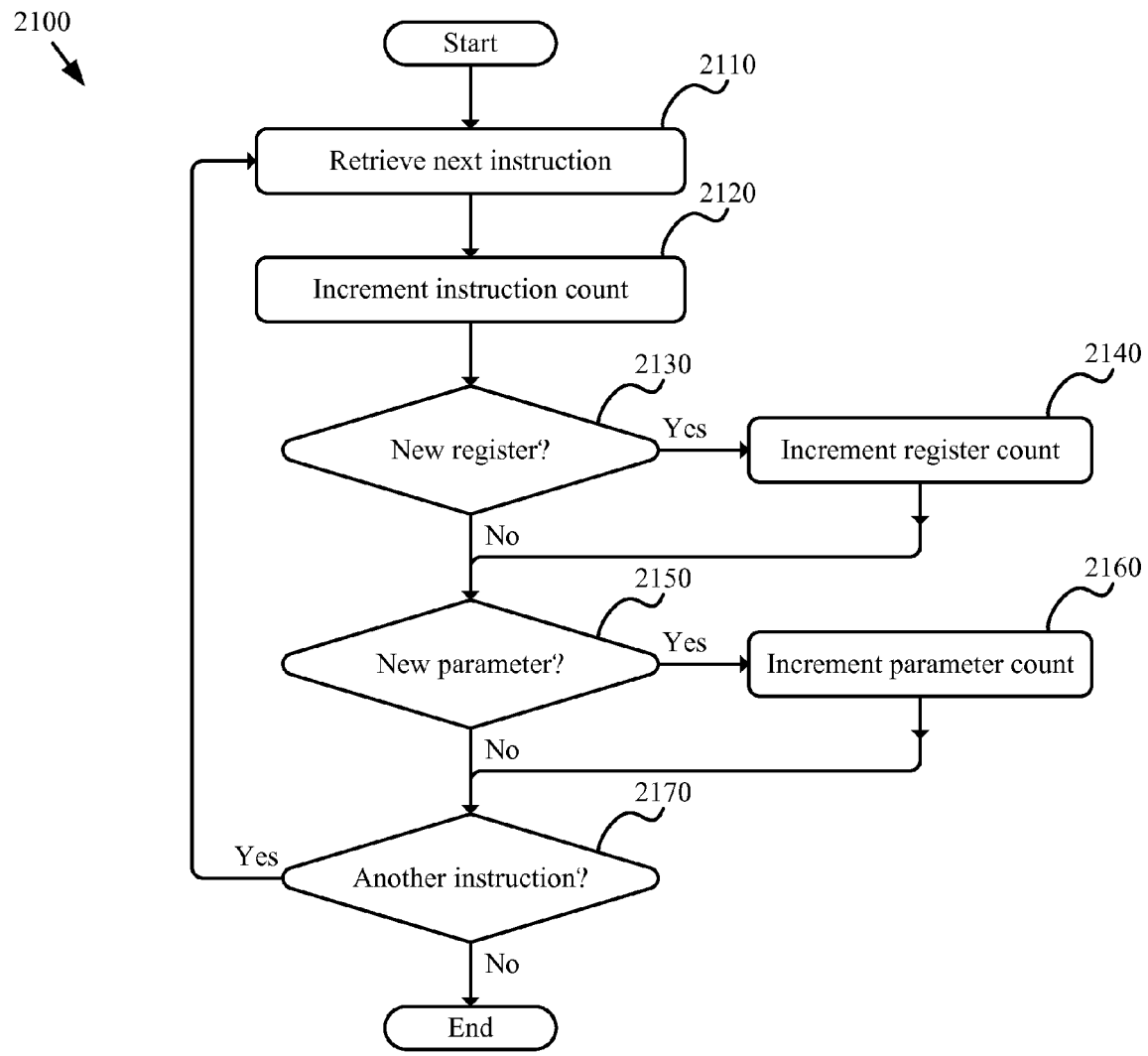
FIG. 21 illustrates a process used to analyze shader code in order to estimate the number of resources used by the shader.

As described above, some embodiments generate a "fingerprint" for each fragment program. The fingerprint estimates the resources used by the shader such that shaders may be concatenated at run-time based on the capabilities of the rendering resource identified for use at run-time. FIGS. 20-21 describe conceptual processes used to generate a shader fingerprint. As described above, in some embodiments, the shader fingerprinting is performed by a resource such as the fingerprinting engine 1135.

FIG. 20 illustrates a conceptual process 2000 for generating a shader fingerprint. The process will be described with reference to FIGS. 11-12. The process begins when a fragment program is passed to a module such as the fingerprinting engine 1135. As shown, the process retrieves (at 2005) the GPU shader code. The process then selects (at 2010) an input to the shader.

Next, the process determines (at 2015) whether the input is concatenatable (i.e., whether it may be possible to combine the received shader with a node that supplies the received shader's input). In some cases, an input is not able to be concatenated (e.g., when the node is a leaf node that takes its input directly from a storage). When the process determines (at 2015) that the input is concatenatable, the process sets (at 2020) a flag indicating the input is concatenatable. Otherwise, the process sets (at 2025) a flag indicating that the input is not concatenatable. After setting (at 2020 or 2025) the concatenatability flag, the process determines (at 2030) whether there is another input to the shader.

When the process determines (at 2030) that there is another input to the shader, the process performs operations 2005-2030 until the process determines (at 2030) that there are no other inputs to the shader. When the process determines (at 2030) that there are no other inputs to the shader, the process approximates (at 2035) the GPU resources used by the shader. These resources are estimated by analyzing the shader code, as will be described in reference to FIG. 21 below. In some embodiments, no inputs to the shader are concatenatable. In these cases, the shader resources may still be estimated such that the shader could potentially be combined with another shader connected to its output.

After approximating (at 2035) the GPU resources, the process creates (at 2040) a signature (or "fingerprint") that includes the concatenation flags and the approximated resources. In some embodiments the signature may include various other flags or information. The signature is then embedded (at 2045) as a comment string in the GPU processing code that is included in the node definition. The fingerprint 1265 corresponding to GPU processing code variant 1260 is one example of such a stored signature. By storing the fingerprint as a comment, the fingerprint does not affect the execution of the GPU code, but may be easily accessed a later time (i.e., at run-time).

FIG. 21 illustrates a process 2100 used to analyze shader code in order to estimate the number of resources used by the shader. This process may be executed by, for example, the fingerprinting engine 1135 when nodes are being generated by the graphics compiler 1100 in some embodiments. The process begins when a set of instructions (i.e., a fragment program) is received. The shader may be received by the fingerprinting engine 1135 for analysis. In some embodiments the analysis is performed on ARB code, but other embodiments may analyze different types of shader code or an intermediate code representation generated by the code translation engine. In addition, some embodiments may separately analyze multiple variants of GPU code corresponding to the different code types generated by the code translation engine. This may be done for each code type because different GPUs may have different capabilities, and thus a particular GPU may use different resources to implement a particular set of operations than another GPU. Thus, as in the example of FIG. 12, each GPU processing code variant 1260 may be analyzed separately in order to generate its corresponding fingerprint 1265.

In any case, after a set of instructions is received, the process retrieves (at 2110) the next instruction in the set of instructions. The process then increments (at 2120) the instruction count of the shader. Next, the process determines (at 2130) whether the instruction retrieved at 2110 would require a new register, or registers, to be accessed at run-time (i.e., register(s) that were not previously accessed by the shader). When the process determines (at 2130) that new register(s) have been accessed, the process increments (at 2140) the register count to reflect the total number of registers accessed by the shader.

After incrementing (at 2140) the register count, or determining (at 2130) that no new register(s) will be accessed, the process determines (at 2150) whether the instruction will access or create a new parameter or parameters at run-time. When the process determines (at 2150) that the instruction retrieved at 2110 will access or create new parameter(s), the process increments (at 2160) the parameter count to reflect the total number of parameters that will be accessed or created by the shader.

After incrementing (at 2160) the parameter count, or after determining (at 2140) that no new parameters were accessed or created, the process determines (at 2170) whether the shader includes another instruction. When the process determines (at 2170) that the shader does include another instruction, the process repeats operations 2110-2170 until the process determines (at 2170) that the shader does not include any other instructions, at which point the process ends. The resulting fingerprint, which includes the estimated shader resources, may be generated and stored as described above in reference to process 2000. The estimated shader resources may also include the number of inputs to the shader, which may be determined by incrementing an input count after selecting (at 2010) an input to evaluate for concatenatability during process 2000.

Although the process 2100 has been described with reference to particular resources (e.g., instruction count, register count, parameter count), one of ordinary skill in the art will recognize that different embodiments may determine different resources than those specified. For example, some embodiments may determine the number of texture fetches, the texture indirection count (e.g., using one texture to fetch another texture, or any computed texture when using certain GPUs), arithmetic instruction count, number of texture coordinates, number of outputs, number of inputs, etc. These various resource counts may be estimated in a similar manner to the estimation of register count or parameter count described in reference to process 2100. In some embodiments, the resources that are estimated may depend on the known limitations of particular GPUs.

One of ordinary skill in the art will recognize that processes 2000 and 2100 are conceptual representations of the operations used to generate a shader fingerprint. Different embodiments may perform the operations in a different order, combine various operations, or divide operations into sub-operations. In addition, each process may not be implemented as one contiguous set of operations, but may be partially performed at different times. In addition, the processes may each be performed as part of a larger macro-process or as a combination of several sub-processes.

IV. Graph Generation

The preceding section described the modules and processes used to generate render graph nodes in some embodiments. The following section describes the generation of render graphs that include such render graph nodes. These render graphs (or processing trees) specify a set of image processing operations to be performed at render-time. Sub-section IV.A describes the software architecture used to generate render graphs in some embodiments. Sub-section IV.B describes the process used by some embodiments to generate a render graph.

A. Architecture

Figure 22:
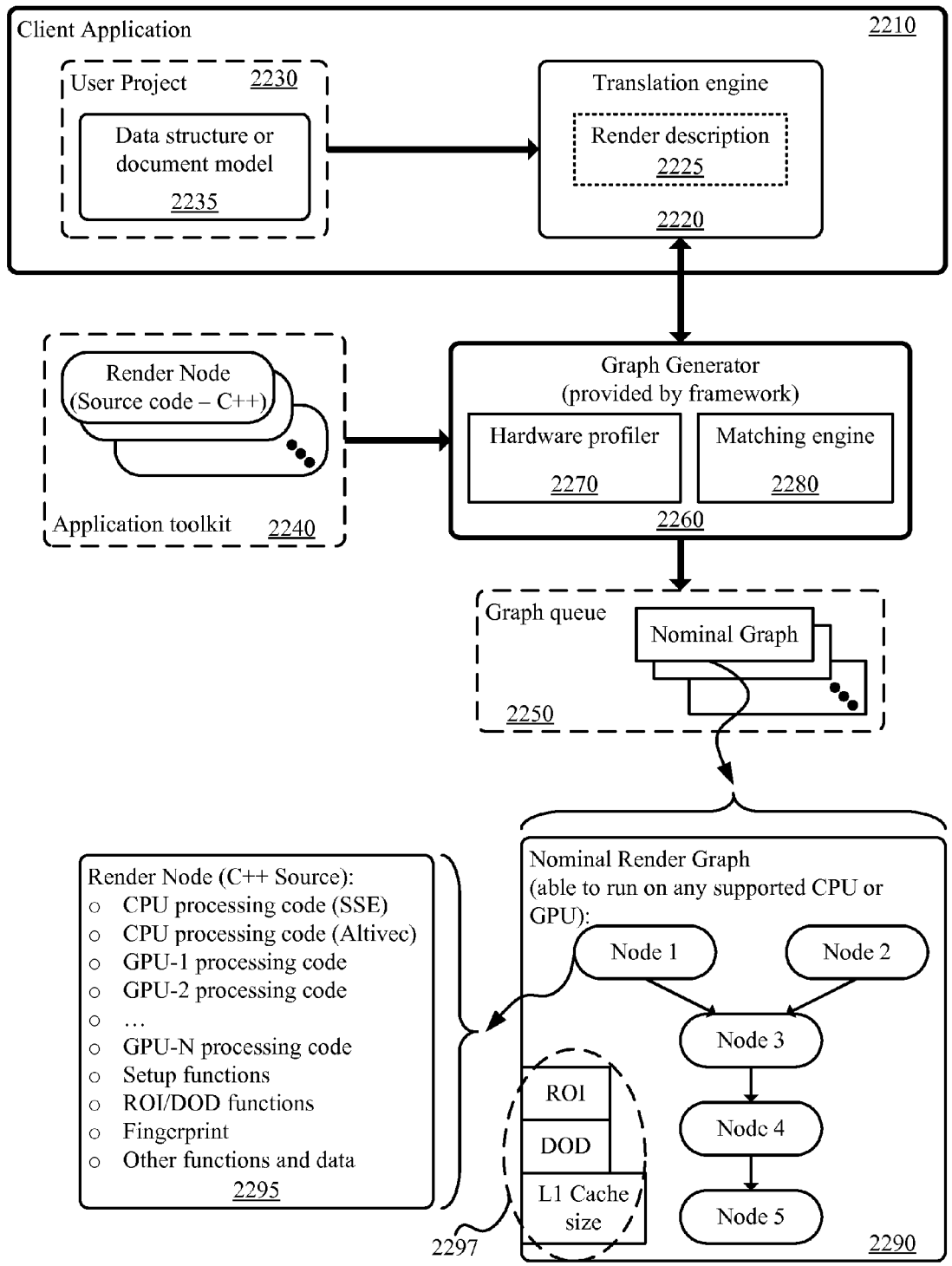
FIG. 22 illustrates the graph generation architecture of some embodiments.

FIG. 22 illustrates the graph generation architecture of some embodiments. Specifically, this figure illustrates the translation of a render description 2225 supplied by a client application 2210 into a set of render graphs using the graph generator 2260 of some embodiments. The graph generator 2260 is the same graph generator 750 described above in reference to FIG. 7. Although the graph generator 2260 is illustrated as being separate from the client application 2210, one of ordinary skill in the art will recognize that while the graph generator is part of the framework, a particular instantiation of the framework (including the graph generator 2260) may be included within the client application 2210.

As shown, the client application includes a translation engine 2220 for generating a render description 2225 based on a data structure or document model 2235 representing the user project 2230. In addition, the client application 2210 and/or the graph generator 2260 are able to access user project data 2230, an application toolkit 2240, and a graph queue 2250 during graph generation.

As shown, the graph generator 2260 of some embodiments includes a hardware profiler 2270 for identifying the available rendering resources and a matching engine 2280 for matching operations included in the render description to their corresponding graph nodes from the application toolkit 2240.

In some embodiments, the translation engine 2220 retrieves the data structure or document model 2235 that represents the user project data 2230. The document model 2235 may be retrieved from any appropriate storage location. The translation engine 2220 then generates a render description based on the retrieved document model. Such a render description may include various instructions, commands, variables, pointers, references, etc., that completely describe the render operations needed to implement the user project 2230. These instructions, commands, etc., may each be associated with a particular node in an application toolkit (such as toolkit 2240) and include various attributes that define the connections between nodes and other properties that may be required to generate a render graph. The translation engine 2220 then passes the render description 2225 to the graph generator 2260. The render description 2225 may be stored in various appropriate locations before being passed to (or retrieved by) the graph generator 2260.

The graph generator of some embodiments, before receiving the render description, directs the hardware profiler 2270 to identify the available rendering resources on the system that will execute the render graphs. The hardware profiler thus identifies the CPU(s) and/or GPU(s) available on the system. In addition, the hardware profiler of some embodiments may determine various properties of the identified resources (e.g., CPU cache size, number of inputs to the GPU, etc.). In some embodiments, the hardware profiler functionality is provided by a module that is external to the graph generator 2260. The identified resources may be stored in memory, or otherwise made accessible when a rendering resource is selected.

The matching engine 2280 of some embodiments receives the render description 2225 and matches the image processing operations specified by the render description to nodes in the application toolkit 2240. This matching may utilize a list of handles created when the application toolkit was generated, as described above in reference to FIG. 11. The graph generator 2260 then assembles the nominal render graph by instantiating the various nodes and connecting the nodes as specified by the render description 2225.

As shown, the graph generator 2260 sends each nominal render graph to a graph queue 2250. The graph queue includes the set of render graphs created using the render description 2225. Each nominal render graph 2290 includes one or more nodes corresponding to the image processing operations performed by executing the graph. In this example, the render graph 2290 includes five render nodes. At this stage in the rendering process, each render graph node 2295 includes code variants for all supported CPU and GPU rendering resources. In addition to the render graph nodes, in some embodiments the render graphs include other information 2297. This other information may include a graph-level ROI calculation, a graph-level DOD calculation, a level 1 ("L1") cache size, and/or other information relevant to the graph. The generation of graph-level ROIs and DODs will be described below in reference to FIGS. 25-26. The determination of L1 cache size may be made by a module such as the hardware profiler 2270. In some embodiments, the L1 cache size is used to optimize performance at run-time, as will be described below in sub-section VI.B.

Figure 23:
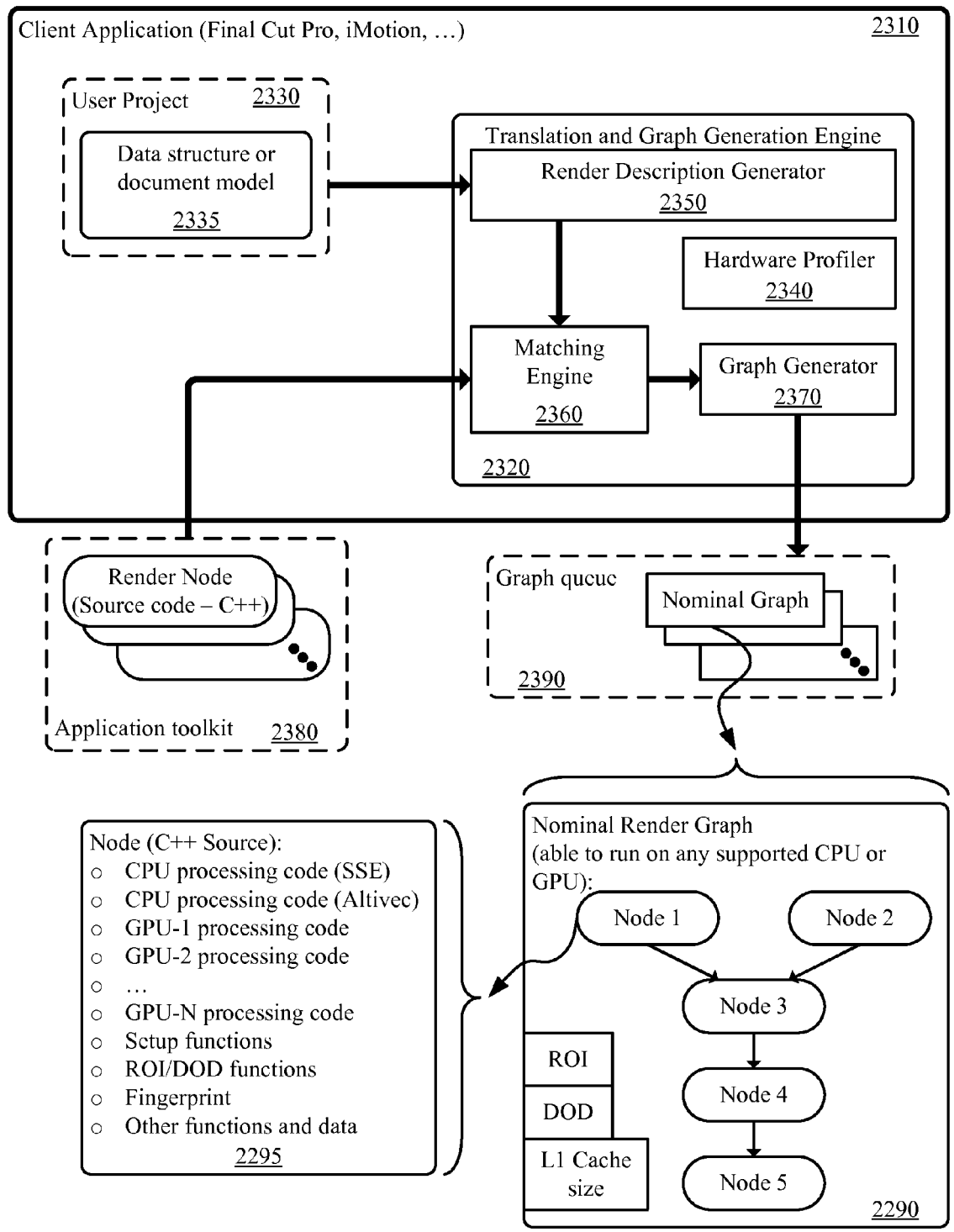
FIG. 23 illustrates an alternative graph generation architecture of some embodiments.

FIG. 23 illustrates an alternative graph generation architecture of some embodiments. Specifically, this figure illustrates the generation of render graphs by a client application 2310. This graph generation architecture corresponds to the alternative framework architecture described above in reference to FIG. 9.

As shown, the client application 2310 includes a translation and graph generation engine 2320 for generating render graphs based on a data structure or document model 2335 representing the user project 2330. The translation and graph generation engine 2320 of some embodiments includes a hardware profiler 2340 for identifying the available rendering resources, a render description generator 2350 for generating a render description based on the data structure or document model 2335, a matching engine 2360 for matching operations included in the render description to their corresponding graph nodes from the application toolkit 2380, and a graph generator 2370 for assembling render graphs based on the render description using the graph nodes. In addition, the client application 2310 is able to access user project data 2330, an application toolkit 2380, and a graph queue 2390 during graph generation.

The translation and graph generation engine 2320 of some embodiments, before generating the render graph(s), directs the hardware profiler 2340 to identify the available rendering resources on the system that will execute the render graphs. The hardware profiler thus identifies the CPU(s) and/or GPU(s) available on the system. In addition, the hardware profiler of some embodiments may determine various properties of the identified resources (e.g., CPU cache size, number of inputs to the GPU, etc.). In some embodiments, the hardware profiler functionality is provided by a module that is external to the translation and graph generation engine 2320. The identified resources may be stored in memory, or otherwise made accessible when a rendering resource is selected.

In some embodiments, the render description generator 2350 retrieves the data structure or document model 2335 that represents the user project data 2330. The render description generator 2350 then generates a render description based on the retrieved document model. Such a render description may include various commands, variables, references, etc., that completely describe the render operations needed to implement the user project 2330. The render description generator 2350 then passes the render description to the matching engine 2360.

The matching engine 2360 of some embodiments receives the render description and matches the image processing operations specified by the render description to nodes in the application toolkit 2380. This matching may utilize a list of handles created when the application toolkit was generated, as described above in reference to FIG. 11. The graph generator 2370 then assembles the render graph by instantiating the various nodes and connecting the nodes as specified by the render description.

As shown, the graph generator 2370 sends each render graph to a graph queue 2390. The graph queue includes the set of render graphs created using the render description. Each nominal render graph 2290 includes one or more nodes corresponding to the image processing operations performed by executing the graph. In this example, the render graph 2290 includes five render nodes. At this stage in the rendering process, each render graph node 2295 includes code variants for all supported CPU and GPU rendering resources.

Although the graph generation architectures have been described with reference to certain details, one of ordinary skill in the art will recognize that the graph generator 2260 or the translation and/or graph generation engine 2320 could be implemented in various ways without departing from the spirit of the invention. For instance, in some embodiments the hardware profiling could be performed by a system resource, the client application, or some application or module that is external to both the rendering framework and client application.

B. Process

Figure 24:
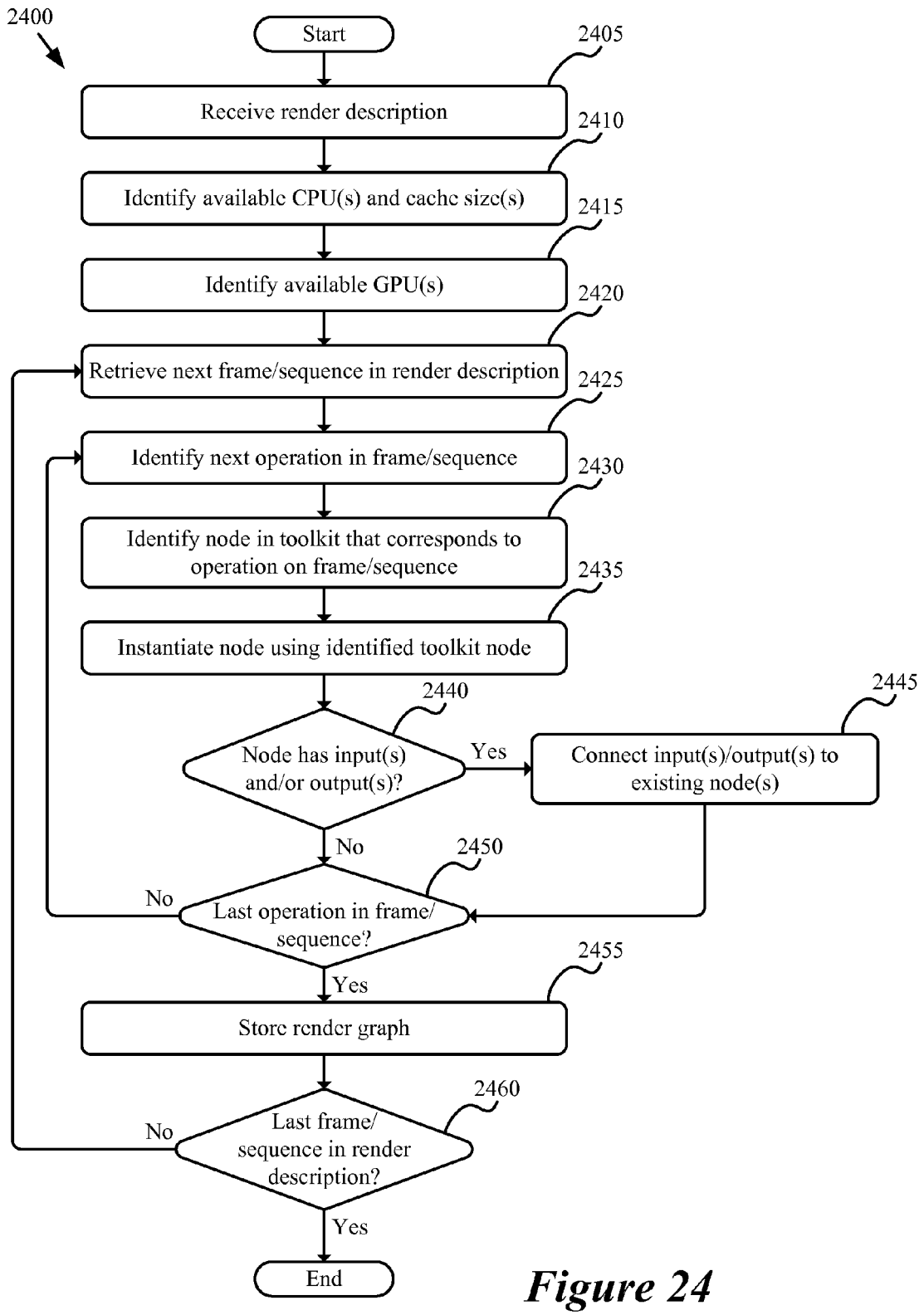
FIG. 24 illustrates a conceptual process used to generate render graphs in some embodiments.

FIG. 24 illustrates a conceptual process 2400 used to generate render graphs in some embodiments. Specifically, this figure shows the operations performed by some embodiments to generate a render graph using a render description provided by a client application and a previously-generated application toolkit that is associated with the client application. Process 2400 will be described with reference to the graph generation architectures described above in reference to FIGS. 22 and 23.

As shown, the process receives (at 2405) a render description. This render description may have been generated by a module such as the translation engine 2220 or the render description generator 2350 as described above. Next, the process identifies (at 2410) the available CPU(s) and the size(s) of their associated cache memory. Next, the process identifies (at 2415) the available GPU(s). In some cases, the process may identify other properties associated with the CPU(s) and/or GPU(s). For instance, in some embodiments, the process may identify the number of inputs for each GPU. The identification of CPU and GPU resources (at 2410-2415) and properties may be performed by a module such as hardware profiler 2270 or 2340.

The process then retrieves (at 2420) the next frame or sequence in the render description. In some cases, the client application will generate a render graph for each frame of output video, while in other cases, the client application generates a render graph for a segment of video (i.e., a series of frames). The generation of render graphs for frames and segments will be described in more detail in sub-section VI.D below. The frame or sequence may be retrieved by a module such as matching engine 2280 or 2360 in some embodiments.

Next, the process identifies (at 2425) the next operation in the frame or sequence. The operation may be an image processing operation such as a color correction, blend, etc. The process then identifies (at 2430) a node in the application toolkit that corresponds to the operation identified at 2425. The identification of the operation and the corresponding toolkit node may be performed by a module such as matching engine 2280 or 2360.

The process then instantiates (at 2435) the node using the identified toolkit node. Next, the process determines (at 2440) whether the node has any inputs and/or outputs. When the process determines that the node has one or more input(s) and/or one or more output(s), the input(s) and/or output(s) are connected (at 2445) to any previously-instantiated nodes that supply the input(s) and/or receive the output(s). Operations 2435-2445 may be performed by a module such as graph generator 2260 or 2370.

After connecting (at 2445) any input(s) and/or output(s) to any previously-instantiated nodes, or after determining (at 2440) that the node identified at 2430 has no inputs or outputs, the process determines (at 2450) whether the operation identified at 2425 is the last operation in the frame or sequence. When the operation is not the last operation in the frame or the sequence, the process repeats operations 2425-2450 until the process determines (at 2450) that the last operation in the frame or sequence has been identified, at which point the process stores (at 2455) the render graph corresponding to the frame or sequence retrieved at 2420.

Next, the process determines (at 2460) whether the frame or sequence retrieved at 2420 is the last frame or sequence in the render description. When the process determines that it is not that last frame or sequence, the process repeats operations 2420-2460 until the process determines (at 2460) that all frames or sequences in the render description have been stored as render graphs, at which point the process ends.

Operations 2450-2460 may be performed by a module such as graph generator 2260 or 2370 in some embodiments.

One of ordinary skill in the art will recognize that process 2400 is a conceptual representation of the operations used to generate a render graph. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

In addition to the operations performed by process 2400, some embodiments generate graph-level ROIs and DODs. Graph-level ROIs and DODs are based on the node-level ROIs and DODs (i.e., the ROIs and DODs generated using the getROI and getDOD functions). The graph-level ROIs and DODs are generated by traversing the graph on a node-by-node basis to determine the ROI at each leaf node of the graph and the DOD at the root node of the graph.

Figure 25:
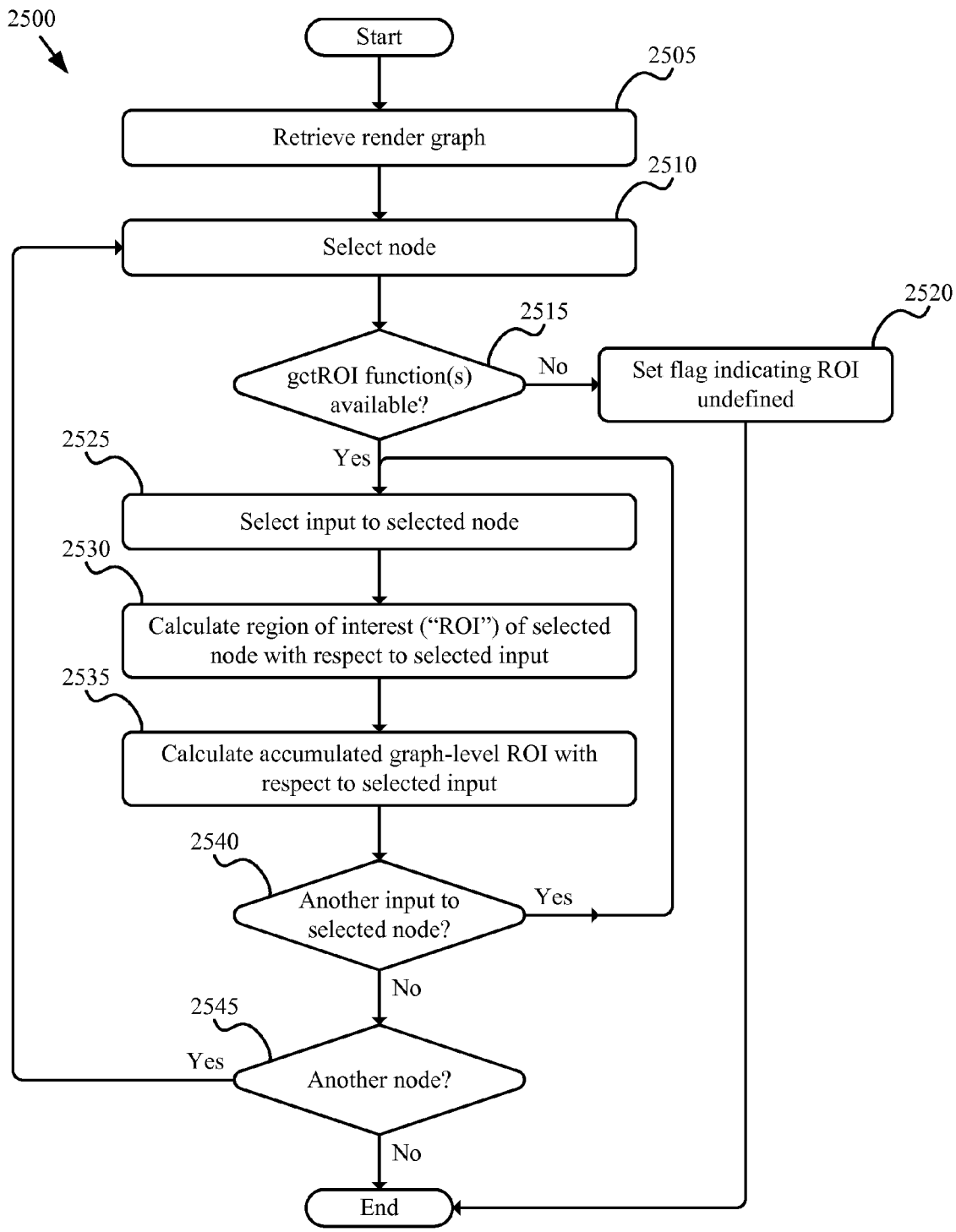
FIG. 25 illustrates a process for generating graph-level ROIs using the node-level ROI functions of some embodiments.
Figure 26:
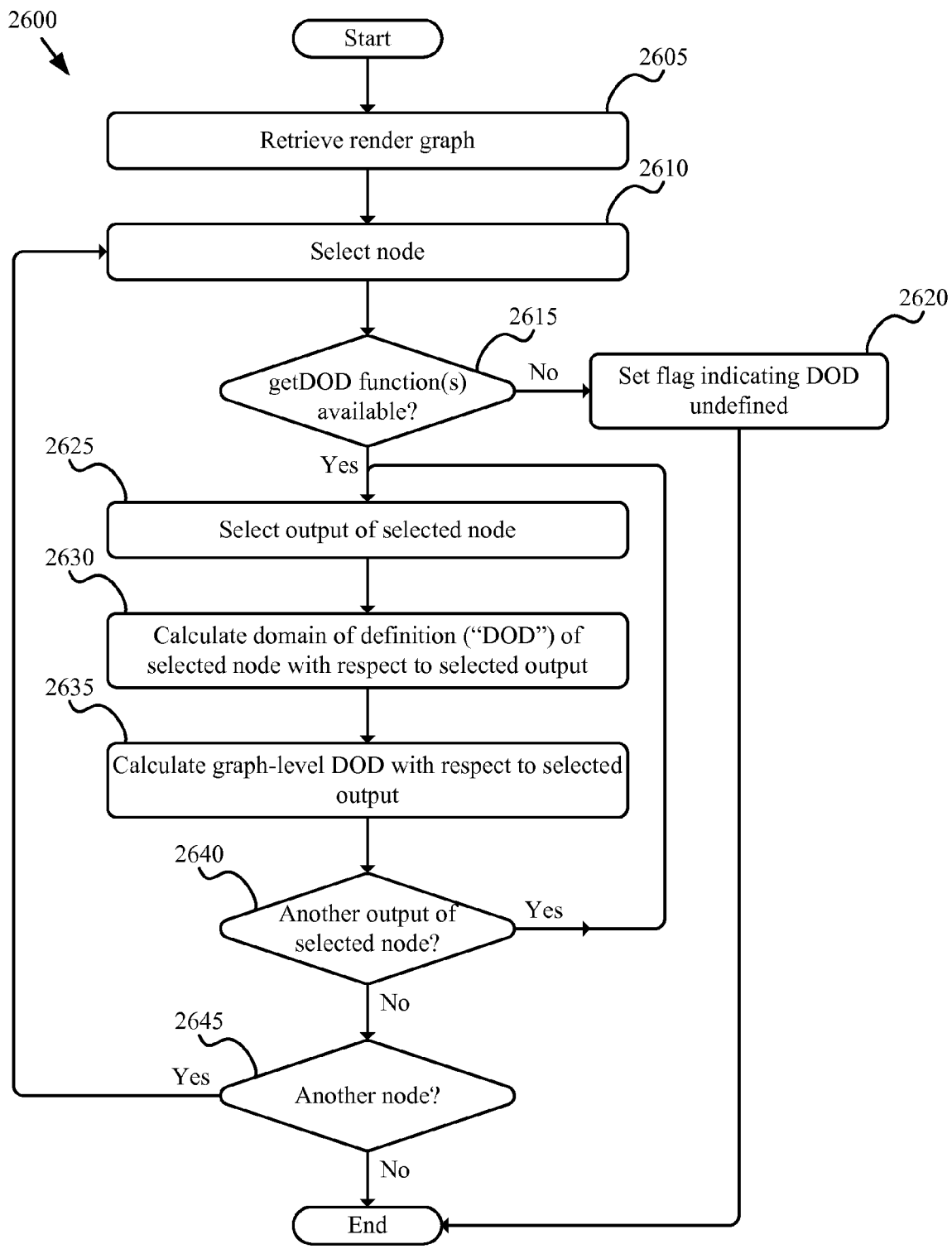
FIG. 26 illustrates a process for generating graph-level DODs using the node-level DOD functions of some embodiments.

FIGS. 25-26 illustrate the processes 2500 and 2600 used to generate the graph-level ROIs and DODs in some embodiments. Processes 2500 and 2600 may be performed after a particular graph has been generated or stored. In some embodiments, these graph-level ROIs and DODs are stored within the render graph 2290 as other information 2297.

FIG. 25 illustrates a process 2500 for generating graph-level ROIs at run-time using the node-level ROI functions of some embodiments. These node-level ROI functions may be the same functions generated by process 1900. The node-level ROI functions may be stored in a location such as the functions 1270 shown in node 1220 in FIG. 12. The generation of the graph-level ROIs may be performed by a module such as graph generator 2260 or 2320. A graph-level ROI may be generated for each input to each leaf node of the graph.

As shown, process 2500 retrieves (at 2505) a render graph. In some cases, the render graph may be retrieved from a storage, while in other cases, the render graph may be received directly from a graph generator (e.g., graph generators 2260 or 2320). Next, the process selects (at 2510) a node from the graph. The root node is selected before other nodes because the graph-level ROI calculation works back from the output.

Next, the process determines (at 2515) whether a getROI function is available for the particular node. As described above in reference to process 1900, in some cases a getROI function may not be able to be automatically generated. In addition, a getROI function may not be available for a variety of other reasons. When the process determines (at 2515) that no getROI function is available, the process sets (at 2520) a flag indicating that the graph-level ROI is undefined. Such a flag may be stored with the graph. After the flag has been generated (at 2520) the process ends.

When the process determines (at 2515) that a getROI function is available, the process selects (at 2525) an input to the node for analysis. The process then calculates (at 2530) the node-level ROI with respect to that input. Next, the process calculates (at 2535) the accumulated graph-level ROI with respect to the root node using any previously-calculated ROIs. In other words, the graph-level ROI calculation is updated based on the ROI of the current node, selected at 2510. After calculating the graph-level ROI, the process determines (at 2540) whether there is another input to the selected node.

When the process determines (at 2540) that there is another input to the selected node, the process repeats operations 2525-2535 for every input to the selected node until the process determines (at 2540) that there are no more inputs to the selected node. The process then determines (at 2545) whether there is another node in the graph. When the process determines that there is another node, the process repeats operations 2510-2545.

In some embodiments, the process identifies the nodes based on a hierarchy from root to leaf. Thus, the process may select each node that was connected to an input of the previously-selected node. The process may then select each node that was connected to an input of any of nodes at that level. The process may continue selecting nodes in this manner until all branches of the render graph have been analyzed and a graph-level ROI has been calculated with respect to each leaf node. When the process determines (at 2545) that there are no more nodes in the render graph, the process stores the graph-level ROI calculations (which include all nodes from the root node to the input of a leaf node that is associated with the particular graph-level ROI).

One of ordinary skill in the art will recognize that process 2500 is a conceptual representation of the operations used to calculate a graph-level ROI. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

FIG. 26 illustrates a process 2600 for generating graph-level DODs using the node-level DOD functions of some embodiments. These node-level DOD functions may be the same functions generated by process 1900. The node-level DOD functions may be stored in a location such as element 1270 shown in node 1220 in FIG. 12. The generation of the graph-level DODs may be performed by a module such as graph generator 2260 or 2320. A graph-level DOD may be generated for each input to each leaf node of the graph. In some embodiments, process 2600 is not performed when process 2500 has determined that the graph-level ROI is undefined for the retrieved render graph.

As shown, process 2600 retrieves (at 2605) a render graph. In some cases, the render graph may be retrieved from a storage, while in other cases, the render graph may be received directly from a graph generator (e.g., graph generators 2260 or 2320). Next, the process selects (at 2610) a node from the graph. A leaf node is selected before other nodes because the graph-level DOD calculation works forward from each input.

Next, the process determines (at 2615) whether a getDOD function is available for the particular node. As described above in reference to process 1900, in some cases a getDOD function may not be able to be automatically generated. In addition, a getDOD function may not be available for a variety of other reasons. When the process determines (at 2615) that no getDOD function is available, the process sets (at 2620) a flag indicating that the graph-level DOD is undefined. Such a flag may be stored with the graph. After the flag has been generated (at 2620) the process ends.

When the process determines (at 2615) that a getDOD function is available, the process selects (at 2625) an output of the node for analysis. The process then calculates (at 2630) the node-level DOD with respect to that output. Next, the process calculates (at 2635) the graph-level DOD with respect to a leaf node using any previously-calculated DODs. After calculating the graph-level DOD, the process determines (at 2640) whether there is another output of the selected node.

When the process determines (at 2640) that there is another output of the selected node, the process repeats operations 2625-2635 for every output of the selected node until the process determines (at 2640) that there are no more outputs of the selected node. The process then determines (at 2645) whether there is another node in the graph. When the process determines that there is another node, the process repeats operations 2610-2645.

In some embodiments, the process identifies the nodes based on a hierarchy from leaf to root. Thus, the process may select each node that was connected to an output of the previously-selected node. The process may then select each node that was connected to an output of any of nodes at that level. The process may continue selecting nodes in this manner until all branches of the render graph have been analyzed and a graph-level DOD has been calculated with respect to each root node. When the process determines (at 2645) that there are no more nodes in the render graph, the process stores the graph-level DOD calculations.

One of ordinary skill in the art will recognize that process 2600 is a conceptual representation of the operations used to calculate a graph-level DOD. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

V. Rendered Selection and Graph Execution

The preceding section described the modules and processes used to generate render graphs in some embodiments. The following section describes the selection of a rendering resource (and its associated renderer) at run-time and the setup and initialization performed on the render graph once a rendering resource has been identified. Sub-section V.A describes the software architecture used by some embodiments to select a rendering resource and execute a render graph. Sub-section V.B describes the conceptual process used by some embodiments to select a rendering resource and execute a render graph. Sub-section V.C then describes CPU-based rendering. Next, sub-section V.D describes GPU-based rendering.

A. Renderer Selection Architecture

Figure 27:
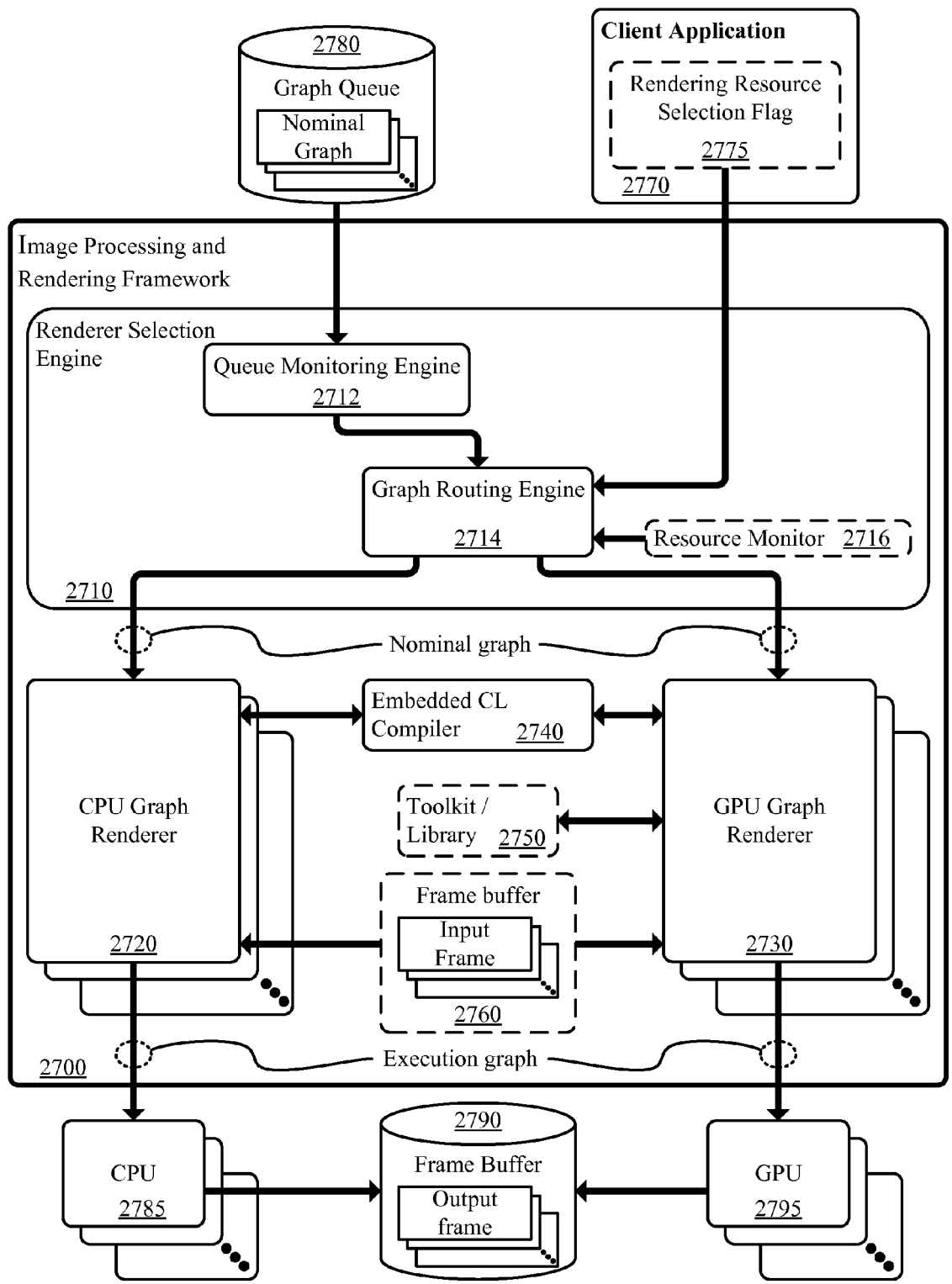
FIG. 27 illustrates the image processing framework of some embodiments, as used to select a rendering resource at run-time.

FIG. 27 illustrates the image processing framework 2700 of some embodiments, as used to select a rendering resource at run-time. Specifically, the figures shows the framework as used to retrieve render graphs from a queue, receive a selection of a rendering resource, prepare the graphs for execution, and pass the graphs to the selected rendering resource. As shown, the framework 2700 includes a renderer selection engine 2710 for selecting a rendering resource, one or more CPU graph renderers 2720 that prepare render graphs for execution on a CPU, one or more GPU graph renderers 2730 that prepare render graphs for execution on a GPU, and an embedded CL compiler 2740 for translating OpenCL code into an executable format.

The renderer selection engine 2710 includes a queue monitoring engine 2712 for retrieving render graphs to be executed, a graph routing engine 2714 for sending the retrieved render graphs to the appropriate rendering resources, and a resource monitor 2716 for determining the availability of various rendering resources. In addition, the framework has access to an application toolkit 2750 that stores render graph nodes and a frame buffer 2760 that stores input frames that will be provided to the various render graphs during execution. The framework 2700 may also receive data from a client application 2770 and a graph queue 2780 that stores graphs to be executed.

In some embodiments, the queue monitoring engine 2712 determines whether there are any render graphs to be executed in the graph queue 2780. The queue monitoring engine 2712 then retrieves each graph from the queue and passes each graph to the graph routing engine 2714. The graph routing engine receives each graph from the queue monitoring engine 2712 and then selects a rendering resource that will be used to execute the render graph. As shown, the graph routing engine may receive a rendering resource selection flag 2775 from the client application 2770. In addition, the graph routing engine 2714 may receive information from the resource monitor 2716. In some embodiments the resource monitor 2716 is provided by the framework 2700, while in other embodiments, the resource monitor may be provided by a module that is external to the framework (e.g., an operating system module, a resource monitoring application, etc.).

The graph routing engine 2714 of some embodiments may select a rendering resource based solely on the rendering resource selection flag 2775. In other embodiments, the graph routing engine 2714 may select a rendering resource based on a determination of resource availability by evaluating the resource usage information provided by the resource monitor 2716. Once the graph routing engine 2714 selects a rendering resource, the graph routing engine passes the render graph to the appropriate renderer for the selected rendering resource.

When a CPU is selected as the rendering resource, the graph routing engine 2714 passes the render graph to the CPU graph renderer 2720. In some embodiments, the framework includes one CPU renderer for each machine that performs CPU rendering (i.e., a single CPU renderer may support multiple CPUs included in a particular machine). The framework 2700 allows for an arbitrary number of CPU renderers 2720. The CPU graph renderer 2720 receives the graph from the renderer selection engine 2710 and performs various setup, initialization, and optimization operations on the graph. As described above in Sections III-IV, the render graphs in the graph queue 2780 include nodes with multiple code variants for the various supported rendering resources. As such, the setup of a graph may include removing the extraneous code (or otherwise ignoring the code when generating an executable render graph).

Initialization is used to enable execution of a graph through a CPU. Such initialization includes defining various properties that affect the execution of the graph. For instance, in some embodiments, initialization includes defining the input image, selecting an interpolation filter, etc. In addition, initialization of some embodiments may include calculating and/or supplying parameters needed by various nodes. Optimization may be performed in some cases by, for example, tiling the input image. Tiling involves dividing the input image into multiple sections, where the size of the sections is selected such that a section fits into the L1 cache of the CPU. The L1 cache being the smallest cache (and thus the fastest cache) available to the CPU.

The renderer 2720 outputs an executable graph that may be processed by a particular CPU 2785 without further intervention by the renderer 2720. Once the executable graph has been passed to the CPU 2785, the CPU processes the graph and passes the output data to a frame buffer 2790.

When a GPU is selected as the rendering resource, the graph routing engine 2714 passes the render graph to the GPU graph renderer 2730. In some embodiments, the framework includes one GPU renderer for each available GPU in the rendering system (i.e., each GPU will have an associated GPU renderer). The framework 2700 allows for an arbitrary number of GPU renderers 2730. The GPU graph renderer 2730 receives the graph from the renderer selection engine 2710 and performs various setup, initialization, and optimization operations on the graph. As described above in Sections III-IV, the render graphs in the graph queue 2780 include nodes with multiple code variants for the various supported rendering resources. As such, the setup of a graph may include removing the extraneous code (or otherwise ignoring the code when generating an executable render graph). In addition, because different GPUs have different processing limitations (e.g., maximum number of inputs, maximum instruction count, etc.), some graph nodes are automatically decomposed by the renderer 2730 using the toolkit 2750. The decomposition of render graph nodes will be described in more detail in reference to FIG. 31 below.

Initialization is used to enable execution of a graph through a GPU. Such initialization includes defining certain aspects of the OpenGL state that affect the graph. For instance, in some embodiments, initialization includes defining the input image, selecting an interpolation filter, etc. In addition, initialization in some embodiments may include calculating and/or supplying parameters needed by various nodes (e.g., any decomposed sub-nodes). Optimization may be performed in some cases by combining render graphs. For instance, some render graphs do not use the full capabilities of the selected GPU (e.g., the GPU has inputs that are not used by a particular graph, the GPU has more available registers than are used by the particular render graph, etc.). In such cases, the render graphs may be combined in order to reduce the number of render passes performed by the GPU.

The renderer 2730 outputs an executable graph that may be processed by a particular GPU 2795 without further intervention by the renderer 2730. Once the executable graph has been passed to the GPU 2795, the GPU processes the graph and passes the output data to a frame buffer 2790.

One of ordinary skill in the art will recognize that the architecture described in reference to FIG. 27 is a conceptual architecture that may be implemented in various different ways without departing from the spirit of the invention. For instance, in some embodiments, the input frame buffer 2760 may not be accessed directly by the GPU renderer 2730 or the CPU renderer 2720, but may instead be accessed by a CPU 2785 which then passes the data to the appropriate renderer (2720 or 2730), or places the data in an appropriate memory location such that it may be efficiently accessed by the renderer (2720 or 2730).

B. Renderer Selection Process

Figure 28:
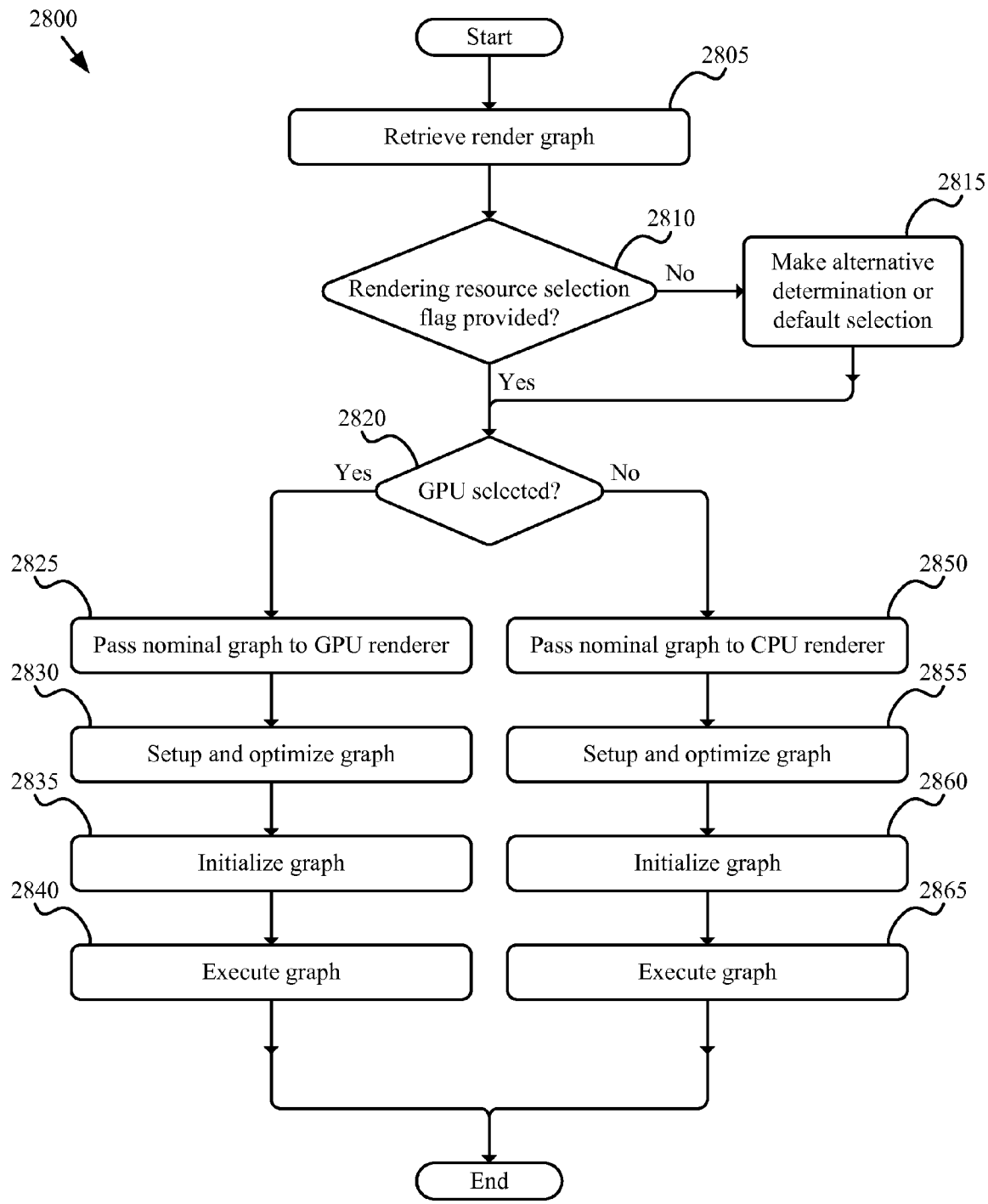
FIG. 28 illustrates a conceptual process used to select a rendering resource and execute a render graph in some embodiments.

FIG. 28 illustrates a conceptual process 2800 used to select a rendering resource and execute a render graph in some embodiments. Process 2800 will be described with reference to the rendering resource selection architecture described above in reference to FIG. 27.

As shown, process 2800 retrieves (at 2805) a render graph. The render graph may be retrieved from a storage (such as graph queue 2780) or from another module (e.g., the graph generator 2260 or 2370). The render graph may be retrieved by a module such as queue monitoring engine 2712.

Next, the process determines (at 2810) whether a renderer selection flag has been supplied. The rendering resource selection flag is typically supplied by a client application, such as the rendering resource selection flag 2775 supplied by client application 2770. In some cases, the rendering resource selection flag may be supplied from a different source than the client application.

When the process determines (at 2810) that no rendering resource selection flag has been provided, the process makes (at 2815) an alternative determination of a rendering resource or makes a default selection. The alternative determination may be based on various factors (e.g., resource usage, whether the rendered video will be displayed immediately or stored, etc.). In some cases, a default selection is made (e.g., an available GPU is always selected in the absence of a flag). The determination of whether a rendering resource selection flag has been supplied or the alternative or default determination may be performed by a module such as the graph routing engine 2714 in some embodiments.

After the process determines (at 2810) that a rendering resource selection flag has been provided, or after making (at 2815) an alternative determination or default selection of a rendering resource, the process determines (at 2820) whether a GPU rendering resource has been selected. When the process determines that a GPU rendering resource has been selected, the process passes (at 2825) the nominal render graph to the GPU renderer. The graph may be passed by a module such as the graph routing engine 2714.

Next, the process sets up and optimizes (at 2830) the nominal render graph. In some embodiments the setup and optimization includes removing unused code from the render graph (i.e., code for unselected rendering resources). GPU-based optimization will be described in more detail in Section VI below. After performing setup and optimization, the process initializes (at 2835) the render graph. In some cases, initialization includes defining all textures and/or other parameters needed by the GPU, thus enabling the shader code through the cache. The setup, optimization, and initialization operations may be performed by a module such as the GPU graph renderer 2730.

During setup and optimization, some embodiments may utilize the graph-level ROI and DOD functions generated using processes 2500 and 2600 to identify the portions of the input image that are needed by the render graph and/or to identify the portions of the output image that are produced by the render graph. These ROI and DOD calculations improve processing efficiency by limiting the image processing operations specified by the render graph to only those regions of the image(s) that are needed by or affected by the image processing operations.

After performing (at 2830) setup and optimization of the render graph, and initializing (at 2835) the graph, the process executes (at 2840) the graph. In some embodiments, execution includes passing the execution render graph to the selected GPU and then executing the graph on the GPU. After executing (at 2840) the render graph, the process ends.

When the process determines (at 2820) that a GPU rendering resource has not been selected (i.e., that a CPU rendering resource has been selected), the process passes (at 2850) the nominal render graph to the CPU renderer. The graph may be passed by a module such as the graph routing engine 2714.

Next, the process sets up and optimizes (at 2855) the nominal render graph. In some embodiments the setup and optimization includes removing unused code from the render graph (i.e., code for unselected rendering resources). CPU-based optimization will be described in more detail in Section VI below. After performing setup and optimization, the process initializes (at 2860) the render graph. In some cases, initialization includes generating all the inputs that will be operated on by the render graph. The setup, optimization, and initialization operations may be performed by a module such as the CPU graph renderer 2720.

During setup and optimization, some embodiments may utilize the graph-level ROI and DOD functions generated using processes 2500 and 2600 to identify the portions of the input image that are needed by the render graph and/or to identify the portions of the output image that are produced by the render graph. These ROI and DOD calculations improve processing efficiency by limiting the image processing operations specified by the render graph to only those regions of the image(s) that are needed by or affected by the image processing operations.

After performing (at 2855) setup and optimization of the render graph, and initializing (at 2860) the graph, the process executes (at 2865) the graph. In some embodiments, execution includes passing the execution render graph to the selected CPU and then executing the graph on the CPU. After executing (at 2865) the render graph, the process ends.

One of ordinary skill in the art will recognize that process 2800 is a conceptual representation of the operations used to select a rendering resource and execute a render graph. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

C. CPU-Based Rendering

The framework sections described above in reference to FIG. 27 include a CPU graph renderer 2720. The CPU graph renderer is described in more detail in reference to FIG. 29 below. In addition, the discussion related to FIG. 29 describes alternative architectures and communication pathways than those described above in reference to FIG. 27.

Figure 29:
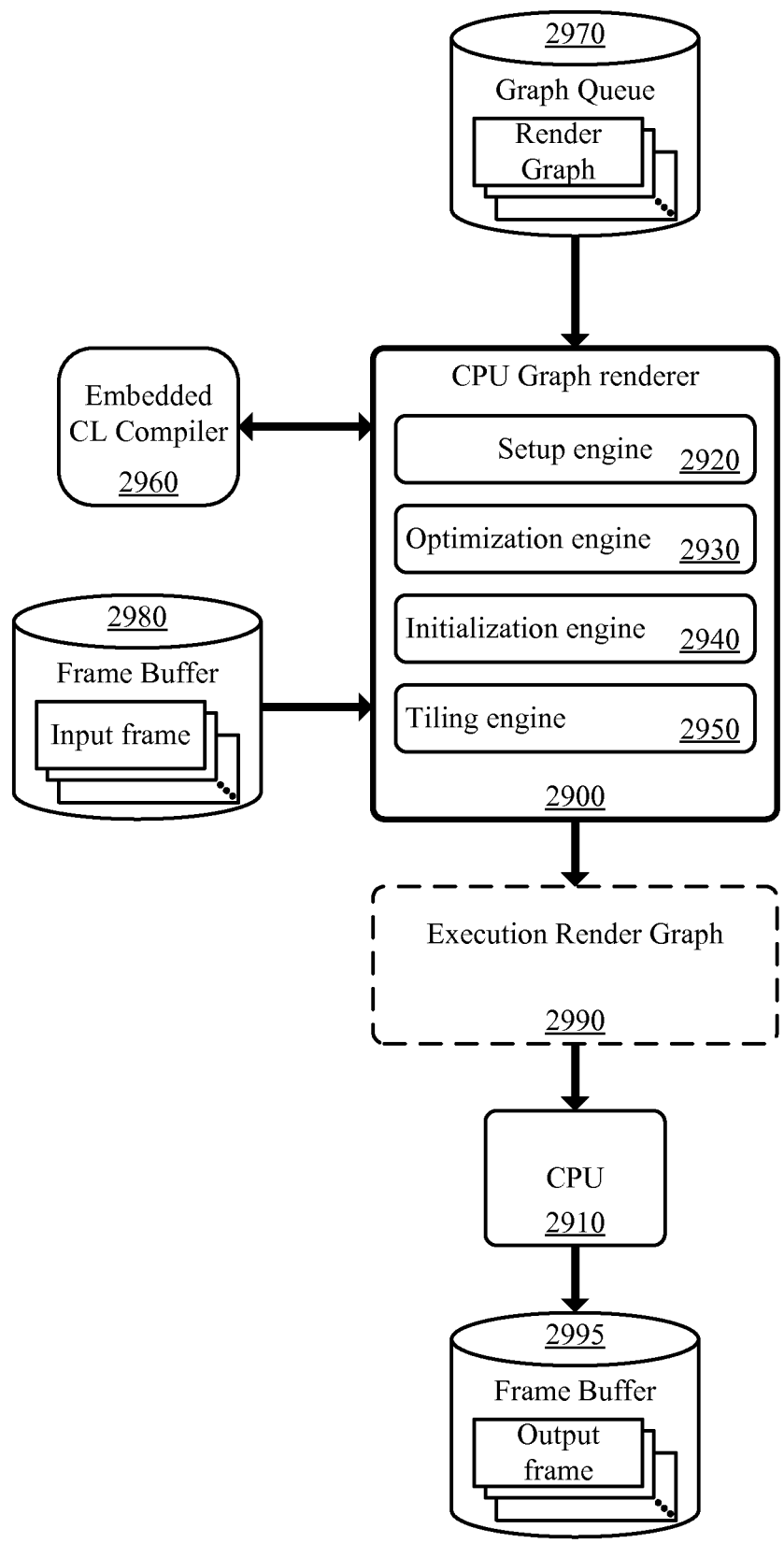
FIG. 29 illustrates the processing of render graphs by a CPU graph renderer and associated CPU.

FIG. 29 illustrates the processing of render graphs by a CPU graph renderer 2900 and associated CPU 2910. As shown, the CPU graph renderer includes a setup engine 2920 for performing setup of a render graph, an optimization engine 2930 for optimizing the render graph based on the selected rendering resource, an initialization engine 2940 for initializing the render graph, and a tiling engine 2950 for dividing an input frame into sections. The CPU graph renderer 2900 also has access to an embedded CL compiler 2960 for compiling OpenCL code that was not previously compiled (i.e., OpenCL code that is on the OpenCL code path).

As shown, the CPU graph renderer 2900 receives render graphs from a render graph queue 2970. In some embodiments, the render graphs may be routed through a renderer selection engine 2710 as described above in reference to FIG. 27. The received render graphs are then processed through the setup engine 2920, the optimization engine 2930, and the initialization engine 2940. The setup and initialization operations performed by the setup engine 2920 and initialization engine 2940 were described above in sub-sections V.A and V.B, respectively. Several potential CPU-specific optimization operations that may be performed by the optimization engine 2930 will be described in more detail in sub-section VI.B below.

The tiling engine 2950 of some embodiments divides the input frame (i.e., the image data to be processed by execution of the render graph) retrieved from the input frame buffer 2980 into sections. These sections are sized such that they will fit into the L1 cache of the selected CPU 2910, resulting in more efficient use of memory and reduced memory read/write times. In some embodiments, the tiling engine 2950 uses information 2297 stored with the render graph. In other embodiments, the tiling engine 2950 may retrieve the information directly from a particular module (e.g., a hardware profiler 2270 or 2340). The operation of the tiling engine 2950 will be described in more detail in sub-section VI.B below.

The CPU graph renderer 2900 of some embodiments generates an execution render graph 2990 that has been optimized, set up, and initialized for execution on the chosen CPU 2910. In some embodiments, the execution render graph 2990 is passed directly to the CPU 2910 by the renderer 2900. In other embodiments, the execution render graph 2990 may be placed in storage for retrieval by the CPU 2910. In addition to passing the render graph 2990 to the CPU 2910, in some embodiments, the renderer 2900 also passes sections of the input frame (as determined by the tiling engine 2950) from the input frame buffer 2980 to the CPU 2910 for processing. Although not shown, a single CPU graph renderer 2900 may utilize more than one CPU 2910. In some embodiments, one CPU graph renderer 2900 is used for each rendering system (e.g., a PC), regardless of the number of CPUs the system includes.

The CPU 2910 then executes the render graph 2990 using the sections of the input frame that were passed from the tiling engine 2950. After executing the graph on a particular section of the input frame, the CPU 2910 passes the rendered section to the output frame buffer 2995 where the rendered section will be combined with other rendered sections of the input frame to produce a complete output frame. In some embodiments, the CPU 2910 is able to execute the render graph using multiple sections of the input frame, whereby each section is assigned to a different CPU thread. CPU threading will be described in more detail in sub-section VI.B below.

One of ordinary skill in the art will recognize that the CPU graph renderer 2900 may be implemented in various different ways without departing from the spirit of the invention. For instance, the embedded CL compiler 2960 may be included within the CPU graph renderer 2900 in some embodiments. As another example, in some embodiments the execution render graph 2990 may be passed to a storage element instead of being passed directly to the CPU 2910. As yet another example, in some embodiments the setup engine 2920 and initialization engine 2940 may be combined in a single module. Likewise, the optimization engine 2930 and tiling engine 2950 may be combined in a single module in some embodiments.

D. GPU-Based Rendering

The framework sections described above in reference to FIG. 27 include a GPU graph renderer 2730. The GPU graph renderer is described in more detail in reference to FIG. 30 below. In addition, the discussion related to FIG. 30 describes alternative architectures and communication pathways than those described above in reference to FIG. 27.

Figure 30:
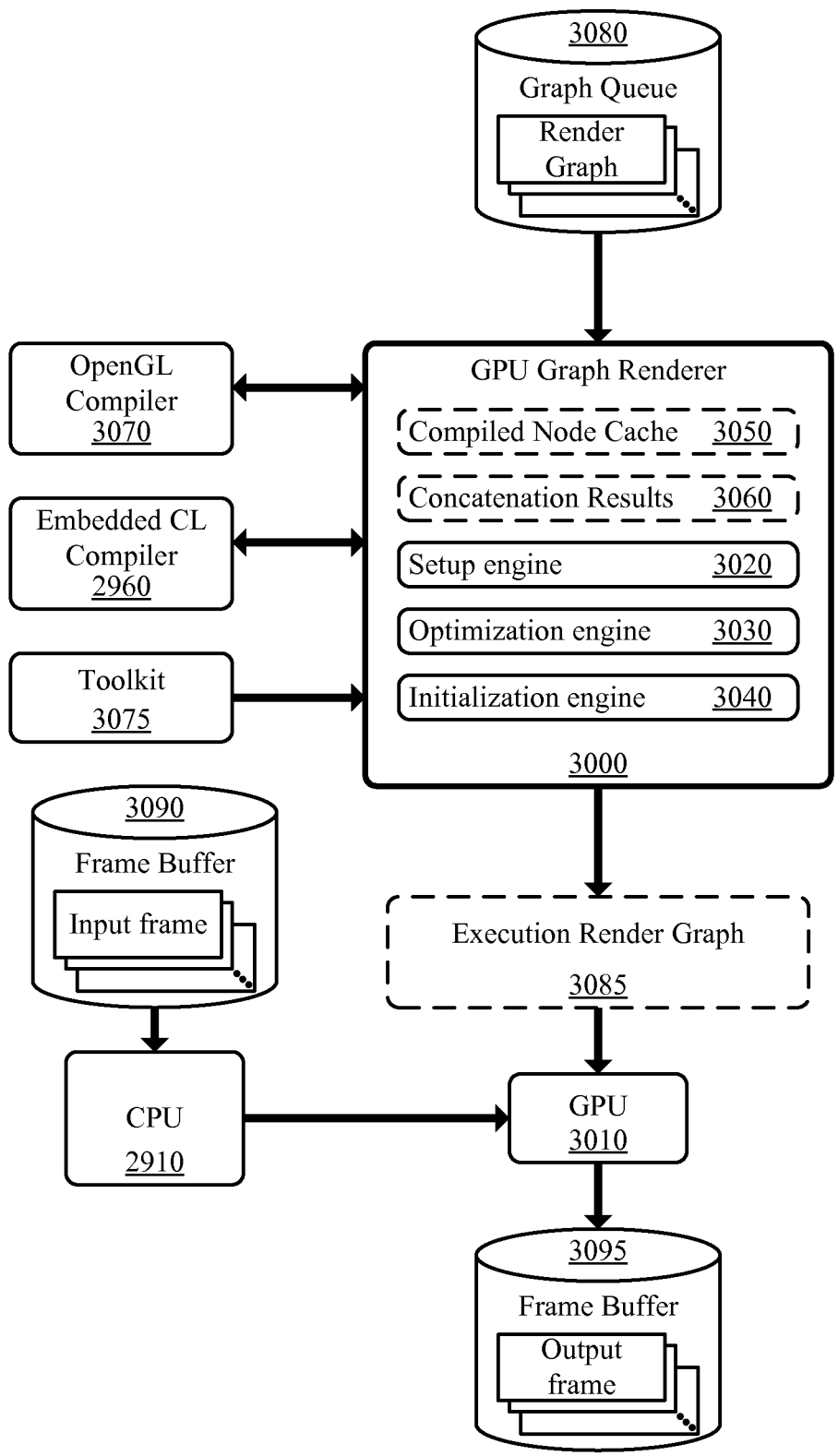
FIG. 30 illustrates the processing of render graphs by a GPU graph renderer and associated GPU.

FIG. 30 illustrates the processing of render graphs by a GPU graph renderer 3000 and associated GPU 3010. As shown, the GPU graph renderer includes a setup engine 3020 for performing setup of a render graph, an optimization engine 3030 for optimizing the render graph based on the selected rendering resource, an initialization engine 3040 for initializing the render graph, a compiled node cache 3050 for storing previously-compiled graph nodes, and a concatenation results cache 3060 for storing the results of previous concatenation attempts. The GPU graph renderer 3000 also has access to an embedded CL compiler 2960 for compiling OpenCL code that was not previously compiled (i.e., OpenCL code that is on the OpenCL code path), an OpenGL compiler 3070 for compiling GPU code included in the render graph nodes, and an application toolkit 3075 for storing available render graph nodes.

As shown, the GPU graph renderer 3000 receives render graphs from a render graph queue 3080. In some embodiments, the render graphs may be routed through a renderer selection engine 2710 as described above in reference to FIG. 27. The received render graphs are then processed through the setup engine 3020, the optimization engine 3030, and the initialization engine 3040. The setup and initialization operations performed by the setup engine 3020 and initialization engine 3040 were described above in sub-sections V.A and V.B, respectively. In addition, the setup engine 3020 of some embodiments is used to decompose render graph nodes, as described in more detail below in reference to FIGS. 31-32. Several potential GPU-specific optimization operations that may be performed by the optimization engine 3030 will be described in more detail in sub-section VI.C below.

The compiled node cache 3050 of some embodiments stores compiled nodes after processing by the OpenGL compiler 3070. In some embodiments, each render node includes an uncompiled fragment program that encodes the GPU version of the image processing algorithm using ARB. The first time that such a render node is executed on the GPU, the GPU renderer compiles the fragment program string into a machine language suitable for execution on the target GPU using the OpenGL compiler 3070. When the node is successfully compiled, the OpenGL compiler 3070 returns a handle that references the compiler fragment program. This handle is used to bind the fragment program to an input texture for processing. This storage of compiled nodes allows the GPU renderer 3000 to retrieve the already-compiled nodes when those nodes are used again (e.g., when the nodes are used in a subsequent render graph) without having to compile the node every time it is used. Although represented as a component of the GPU graph renderer 3000, the compiled node cache 3050 may be implemented using a storage that is external to the GPU renderer 3000.

The concatenation results cache 3060 is used to store the results of shader concatenation attempts. In this way, the renderer 3000 is able to more efficiently evaluate potential shader concatenations (i.e., if two particular shaders were not able to be concatenated, the renderer 3000 will not attempt to concatenate them if they are encountered in the future). Although represented as a component of the GPU graph renderer 3000, the concatenation results cache 3060 may be implemented using a storage that is external to the GPU renderer 3000. Shader concatenation and other GPU-based optimizations will be described in more detail in sub-section VI.C below.

The GPU graph renderer 3000 of some embodiments generates an execution render graph 3085 that has been optimized, set up, and initialized for execution on the chosen GPU 3010. In some embodiments, the execution render graph 3085 is passed directly to the GPU 3010 by the renderer 3000. In other embodiments, the execution render graph 2990 may be placed in storage for retrieval by the CPU 2910. Typically, a GPU graph renderer 3000 is required to support each available GPU 3010.

The GPU 3010 then executes the render graph 3085 on an input frame (or section thereof) that was passed from the input frame buffer 3090 through a CPU 2910. After executing the graph on a particular input frame, the GPU 3010 passes the rendered frame to the output frame buffer 3095. In some embodiments, the input frames are divided into sections by a tiling engine (not shown) that operates in a similar manner to tiling engine 2950. In contrast to the CPU tiling, which is done to optimize performance, GPU tiling may be necessary to accommodate the memory limitations of the GPU (i.e., the GPU may not be able to process an image that is larger than the GPU's internal memory).

One of ordinary skill in the art will recognize that the GPU graph renderer 3000 may be implemented in various different ways without departing from the spirit of the invention. For instance, the embedded CL compiler 2960 may be included within the GPU graph renderer 3000 in some embodiments. As another example, in some embodiments the execution render graph 3085 may be passed to a storage element instead of being passed directly to the GPU 3010. As yet another example, in some embodiments the setup engine 3020 and initialization engine 3040 may be combined in a single module.

Figure 31:
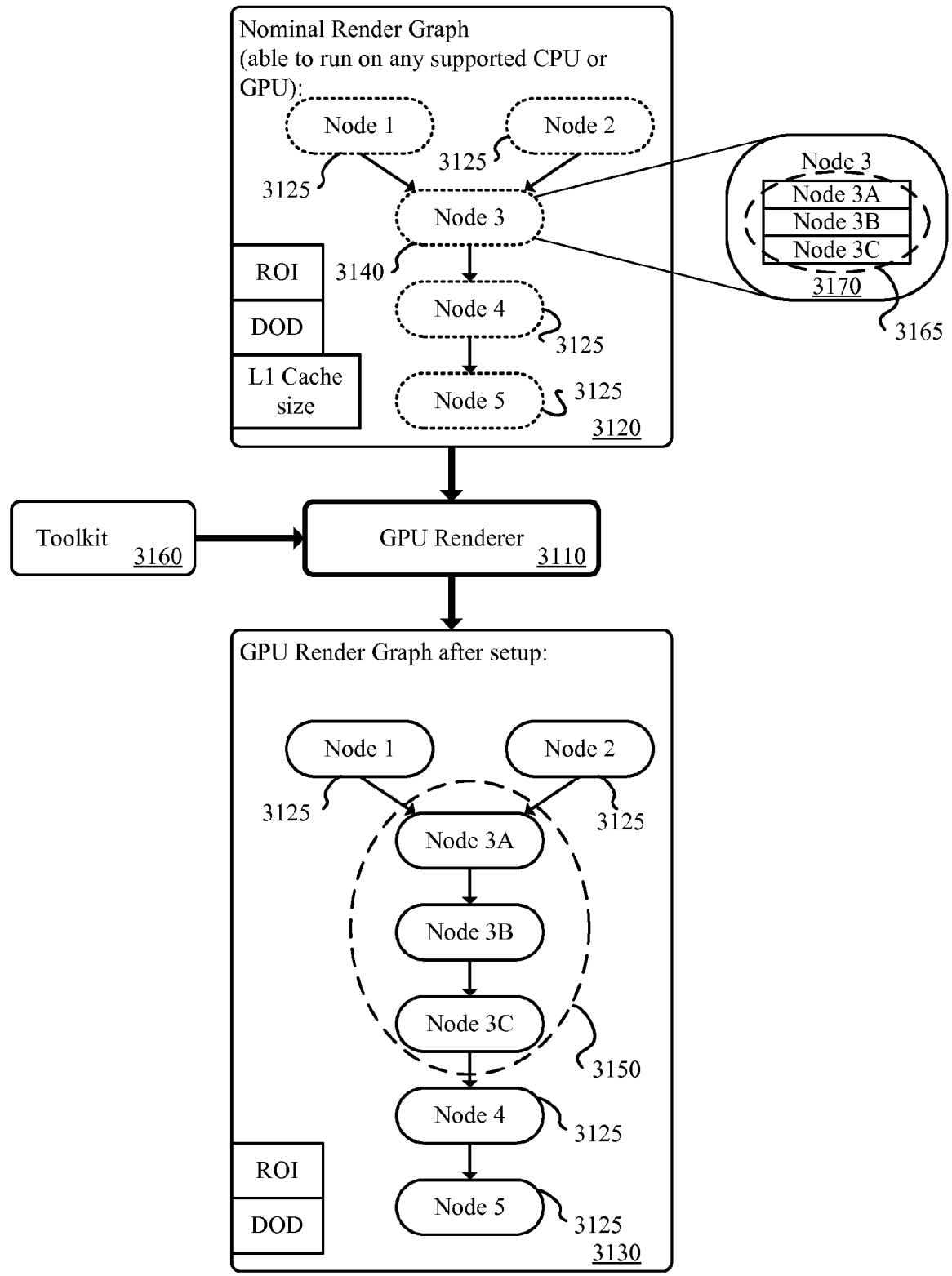
FIG. 31 illustrates a render graph that includes a node that must be decomposed using the GPU renderer of some embodiments before the render graph may be executed on the selected GPU rendering resource.

FIG. 31 illustrates a render graph that includes a node that may be decomposed using the GPU renderer 3110 of some embodiments before the render graph is executed on the selected GPU rendering resource. Specifically, the figure shows the GPU renderer 3110 of some embodiments receiving a nominal render graph 3120 and outputting an execution render graph 3130 where one of the nodes 3140 of the nominal render graph 3120 has been decomposed into several nodes 3150 before execution by the selected GPU. The GPU renderer 3110 may be the same GPU renderer 3000 described above in reference to FIG. 30.

As shown in FIG. 31, the nominal render graph 3120 includes two types of render nodes 3125 and 3140. Each of these render nodes may perform various image processing operations. In this example, the nominal render graph includes four nodes of a first type 3125 that do not include sub-nodes, and are thus not decomposable. In addition, the nominal render graph includes one node of a second type 3140 that does include sub-nodes and is able to be decomposed.

The node 3140 includes references 3165 to various sub-nodes, as shown in breakout section 3170. These references may be used to identify sub-nodes included in an application toolkit 3160 that together perform the functionality required by node 3140. These references may be included in a data structure 2295 such as that shown in FIG. 22 or 23. In some embodiments, the references may be included in the setup functions, other functions and data, or as some other element of a render graph node.

The second type of node 3140 may be specifically generated by a developer-user in order to perform different sub-operations under different conditions. The second type of node 3140 may include a processing tree that is executed when the node is called. Such a node may automatically determine the particular set of sub-operations dictated by evaluating a particular set of conditions at run-time (e.g., image processing parameters, properties of the input image, etc.).

For instance, a particular node may include a processing tree that includes a blend operation that blends two inputs to generate a single output. In some cases, the blend operation may ignore one of the two inputs and pass the other input through to the output. In such a case, evaluation of the processing tree may indicate that a sub-node that provides the ignored input (and, in fact, the blend node) is not necessary to produce the desired output. In such a case, the sub-node (or sub-nodes) connected to the ignored input may not be included in the execution render graph. In contrast, when the blend operation uses both inputs, each sub-node that provides an input to the blend sub-node will be included in the execution render graph.

The nominal render graph is passed to the GPU renderer 3110, which provides access to the application toolkit 3160 such that any sub-nodes of a particular node may be accessed as described above in reference to FIGS. 27 and 30. The GPU renderer is thus able to provide access to the toolkit 3160, which includes various sub-nodes 3165 included in the processing tree of the original node 3140. The process of substituting a set of sub-nodes for a particular render node will be described in reference to FIG. 32 below.

In the example of FIG. 31, the node 3140 is decomposed, and the resulting graph 3130 includes the group of sub-nodes 3150 corresponding to the references 3165 supplied by the original node 3140. In addition, the resulting graph 3130 includes the non-decomposed nodes 3125 that were included in the nominal render graph 3120.

Figure 32:
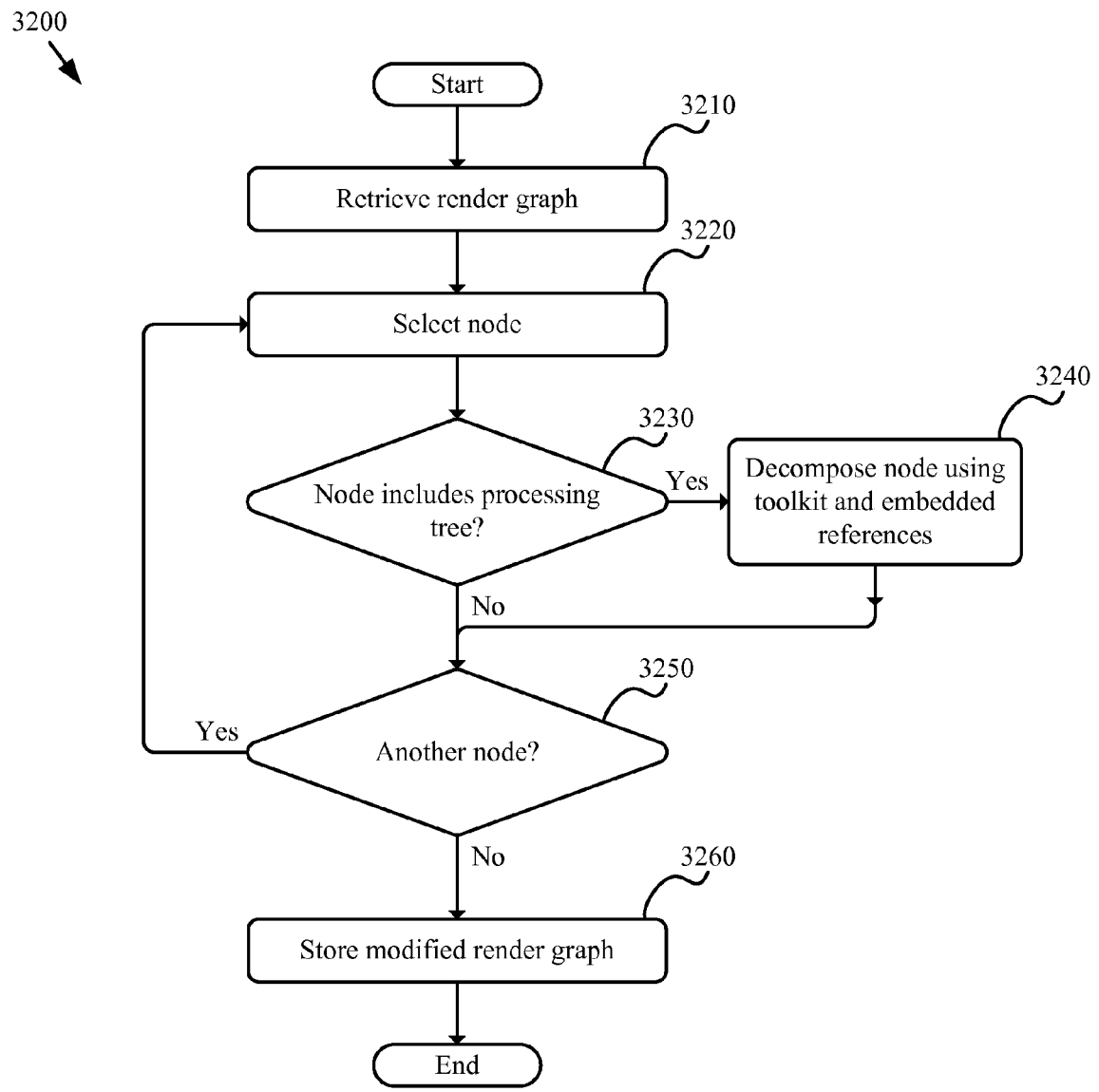
FIG. 32 illustrates a conceptual process used by some embodiments to decompose render graph nodes at run-time.

FIG. 32 illustrates a conceptual process 3200 used by some embodiments to decompose render graph nodes at run-time. Process 3200 will be described with reference to FIG. 31. As shown, the process retrieves (at 3210) a nominal render graph. Render graph 3120 is one example of such a nominal render graph. Next, the process selects (at 3220) a node within the render graph. In the example of FIG. 31, the render graph includes five nodes 3125 and 3140. When selecting (at 3220) a node, process 3200 may use various algorithms. For instance, in some embodiments the node may be selected at random from the included nodes. In other embodiments, the process 3200 may evaluate the nodes in some defined order (e.g., beginning with leaf nodes and proceeding to root nodes). In addition, in some embodiments, the nodes may include a flag or other designation that indicates that the node may not be decomposed (i.e., that the node does not include a set of sub-nodes). In such cases, the process may iteratively select (at 3220) several nodes before identifying a node that is able to be decomposed. This, in the example of FIG. 31, the process may successively select the various nodes 3125 and 3140.

After selecting (at 3220) a node for evaluation, the process next determines (at 3230) whether the node includes a processing tree. When the process determines (at 3230) that the selected node includes a processing tree, the process decomposes (at 3240) the node using the processing tree. In some embodiments, this decomposition includes executing or evaluating the processing tree to determine which sub-nodes are required by the selected node under the given set of conditions. In the example of FIG. 31, the process may first determine (at 3230) that node 3140 includes a processing tree and then proceed to decompose (at 3240) the node using the embedded references 3165 to identify and retrieve the sub-nodes 3150 that correspond to the selected macro node 3140. One of ordinary skill in the art will recognize that a particular node may be decomposed into different combinations of sub-nodes depending on the set of operating conditions.

After determining (at 3230) that the node does not include a processing tree, or after decomposing (at 3240) a node when the process has determined (at 3230) that the node does include a processing tree, the process determines (at 3250) whether there is another node to evaluate. When there is another node to evaluate, the process repeats operations 3210-3250 until the process determines (at 3250) that there are no more nodes to evaluate. When the process determines (at 3250) that there are no more nodes to evaluate, the process stores (at 3260) the modified render graph and ends.

One of ordinary skill in the art will recognize that process 3200 is a conceptual representation of the operations used to evaluate render graphs and decompose any nodes that exceed GPU resources. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

VI. Optimization

As described above, render graphs may be optimized for execution on the particular resource chosen at run-time. Sub-section VI.A describes several general optimization techniques of some embodiments (i.e., techniques that may be applied to either CPU-based rendering or GPU-based rendering). Next, sub-section VI.B describes CPU-specific optimization operations used by some embodiments. Sub-section VI.C then describes GPU-specific optimization operations used by some embodiments. Sub-section VI.D follows that discussion with a description of several optimization techniques that may be applied during graph execution using a CPU or a GPU rendering resource.

A. General Optimization Techniques

Figure 33:
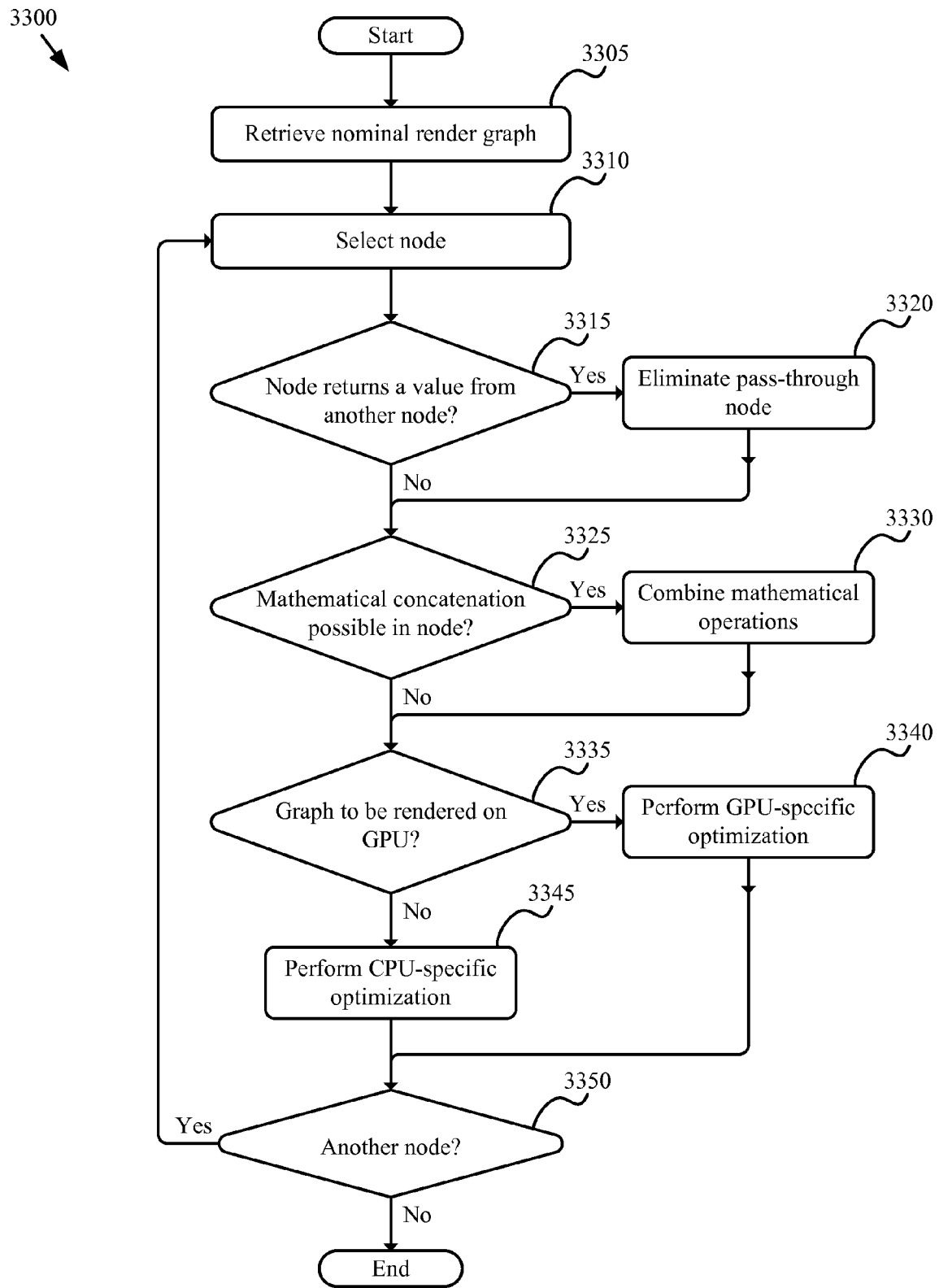
FIG. 33 illustrates a process used to apply several general optimization techniques for render graph execution that may be applied to either CPU-based rendering or GPU-based rendering.

FIG. 33 illustrates a process 3300 used to apply several general optimization techniques for render graph execution that may be applied to either CPU-based rendering or GPU-based rendering. FIG. 33 will be described with reference to FIGS. 27 and 29-30. The process may be performed, in some embodiments, by a renderer such as a CPU graph renderer 2720 or 2900 or a GPU graph renderer 2730 or 3000. In some embodiments, the process may be performed by a resource such as optimization engine 2930 or 3030.

As shown, the process by retrieves (at 3305) a render graph. Next, the process selects (at 3310) a particular node included in the render graph. The selection of a particular node may be based on various criteria. In some embodiments, the nodes may be selected randomly. In other embodiments, the nodes may be selected in some defined order (e.g., leaf nodes selected before other nodes, root nodes selected before other nodes, etc.).

Next, the process determines (at 3315) whether the node returns a value from another node. A render node may return a value generated by another node under various circumstances. For instance, when a node performs a blend operation (blending the inputs provided by two other nodes), the blend parameter may be set to zero (i.e., a first input to the blend node is selected while a second input is not used at all) or set to one (i.e., the second input to the blend node is selected while the first input is not used at all). In such a case, the blend node merely returns the value provided at its first input (when the blend parameter is zero), or the value provided at its second input (when the blend parameter is one).

As another example, a node that processes a gamma function (i.e., $x^y$) may receive a value of one for the y parameter. In such a case, the function merely returns the value x (provided by another node in this example), and can avoid calculating the function $x^y$, where y is equal to one.

In some embodiments, the process determines (at 3315) whether the particular node returns a value from another node by evaluating the code stored in the node. Specifically, some embodiments may include a getOutput function that is used to determine the output of a particular node based on a set of input parameters. This getOutput function may then be evaluated when the parameters are known to determine if a value is passed-through the node.

When the process determines (at 3315) that the particular node selected at 3310 returns a value from another node, the process eliminates (at 3320) the pass-through node from the render graph retrieved at 3305. After eliminating (at 3320) the pass-through node or after determining (at 3315) that the selected node does not return a value from another node, the process determines (at 3325) whether a mathematical concatenation of the functions performed by a node is possible. For instance, in some cases, a particular node may perform successive matrix computations in order to perform a set of transformations. In some cases, the successive matrices may be concatenated into one matrix that is then used to perform a single transformation. When the process determines (at 3325) that mathematical concatenation is possible, the process combines (3330) the mathematical operations.

In addition to performing mathematical concatenation of operations within a node, some embodiments may mathematically concatenate one or more nodes into a single node. In some embodiments, nodes with certain characteristics (e.g., nodes performing a 4×4 matrix multiplication) may include a flag or other indication that the node may be mathematically concatenated. In some cases, the renderer is able to automatically identify nodes that may be mathematically concatenated (e.g., by identifying particular types of operations that perform 4×4 matrix multiplications or by evaluating the source code included in the node to determine whether the operations performed by the node may be mathematically concatenated). This node evaluation may be performed at compile-time and/or at run-time in other embodiments. In other cases, the developer-user may set a flag at compile-time that indicates to the renderer that the node may be mathematically concatenatable at run-time.

After combining (at 3330) the concatenatable mathematical operations, or after determining (at 3325) that mathematical concatenation is not possible, the process determines (at 3335) whether the graph will be rendered on a GPU.

When the process determines (at 3335) that the graph will be rendered on a GPU, the process performs (at 3340) GPU-specific optimization of the graph. When the process determines (at 3335) that the graph will not be rendered on a GPU (i.e., that the graph will be rendered on a CPU), the process performs (at 3345) CPU-specific optimization of the graph. Such CPU-specific optimization may be performed by a resource such as the optimization engine 2930, while the GPU-specific optimization may be performed by a resource such as the optimization engine 3030. CPU-specific optimization will be described in more detail in sub-section VI.B below, while GPU-specific optimization will be described in more detail in sub-section VI.C below.

After performing (at 3340 or 3345) GPU-specific optimization or CPU-specific optimization, the process determines (at 3350) whether there is another node in the selected render graph. When the process determines (at 3350) that there is another node in the render graph, the process repeats operations 3305-3350 until the process determines (at 3350) that there are no other nodes in the selected render graph, at which point the process ends.

One of ordinary skill in the art will recognize that process 3300 is a conceptual representation of the operations used to optimize a render graph. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

Additionally, although the process 3300 has been described with reference to particular elements and modules, some embodiments may implement the process using different elements or modules than those described above.

B. CPU-Specific Optimization

Figure 34:
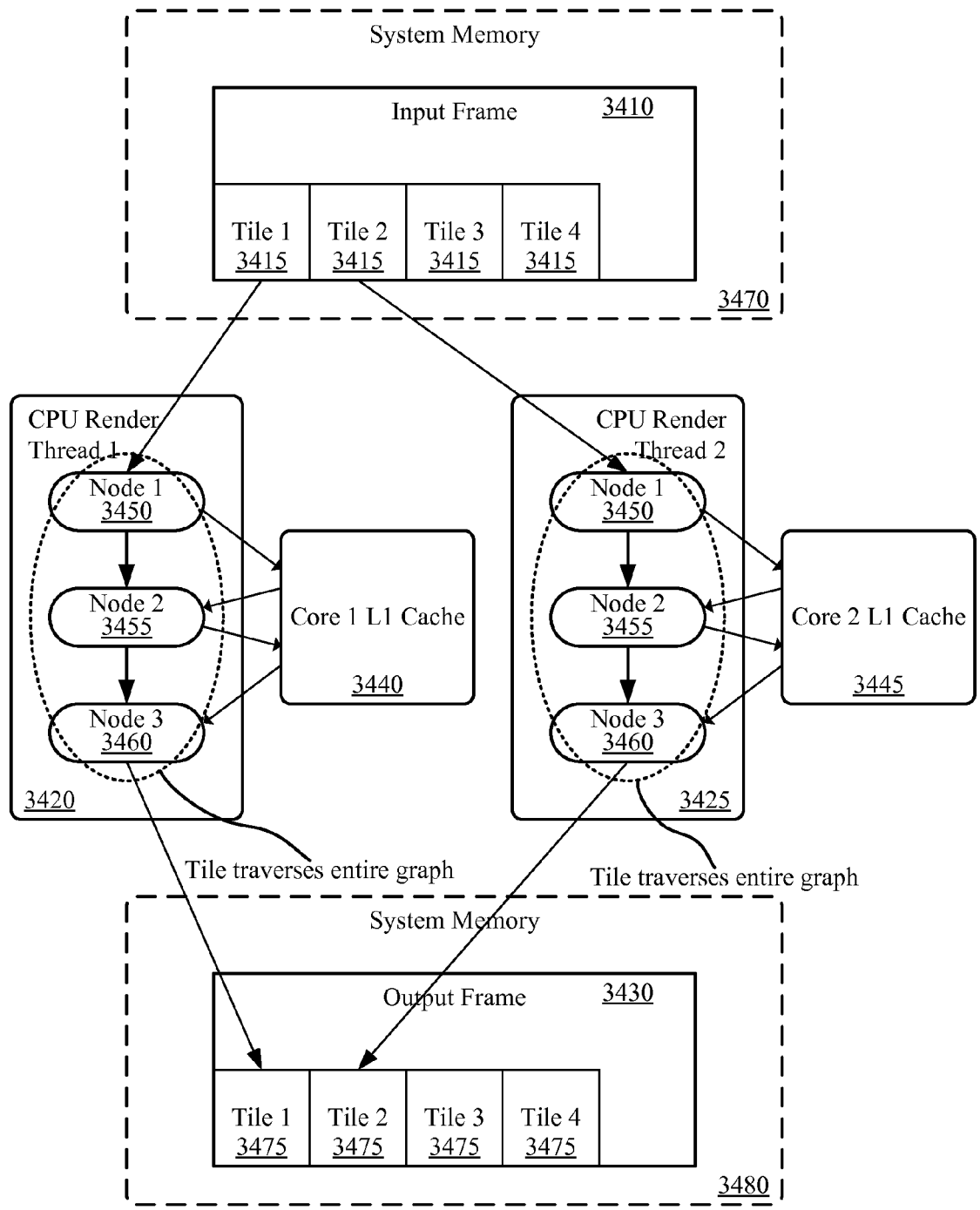
FIG. 34 illustrates using image tiling to optimize CPU rendering.

FIG. 34 illustrates using image tiling to optimize CPU rendering. Specifically, this figure shows an input frame 3410 that is processed by various CPU render threads 3420 and 3425 before being re-assembled as an output frame 3430.

As shown, the input frame 3410 is divided into various processing tiles 3415. Each tile is sized such that the tile may be stored within the L1 cache 3440 or 3445 of the CPU. In other words, each tile is sized such that the data corresponding to the pixels in the tile may be stored in the L1 cache. Such tiling is designed to minimize system memory transaction costs.

In this example, there are two CPU execution threads 3420 and 3425, each rendering a graph that includes three processing nodes 3450-3460. In this example the render graph executed by each CPU thread 3420 and 3425 is the same render graph, while the input tile is different for each thread 3420 or 3425. When rendering commences, the CPU renderer defines the appropriate processing tile size and sets a pointer to a particular processing tile as the input to node 1 3450 in the render graph being executed on CPU render thread 1 3420.

When node 1 3450 is executed, it loads the processing tile from system memory 3470 and performs the operations specified by node 1 3450. When finished, node 1 3450 writes the result to an output tile that fits in the L1 cache 3440 or 3445. When node 2 3455 is executed, it reads its input from the L1 cache 3440 or 3445 and writes its output to the L1 cache with minimal memory latency. When node 3 3460 is executed, it also reads its input from the L1 cache 3440 or 3445 with minimal memory latency. However, the output of node 3 3460 (i.e., the 3475) is written to system memory 3480 as it is the root node in the graph.

Thus, processing time is reduced because each render graph only has to read from system memory once, and write to system memory once. The intermediate reads and writes are performed using the L1 cache 3440 or 3445, which allows much faster read/write operations than the system memory 3470 or 3480.

In addition to selecting the processing tile size such that the tiles will fit into the L1 cache, some embodiments enable a particular CPU thread to execute a tile through an entire graph without regard to the status of the other CPU threads. In other words, some embodiments execute each tile through an entire graph using a particular CPU thread instead of performing the operations specified by a particular node on all CPU threads (and waiting for each thread to finish processing the node) before proceeding to the next node.

Although the example of FIG. 34 has been described with reference to single-input graphs (i.e., a render graph that receives all input data from a single image), one of ordinary skill will recognize that the same techniques could be applied to a render graph that takes inputs from multiple images (e.g., a render graph that performs a blend operation). In such a case, the tiles may be indexed such that matching tiles are selected from each input frame (i.e., so that all input tiles are selected that are necessary to render a particular output tile).

Although the example of FIG. 34 has been described with reference to certain specific features, one of ordinary skill in the art will recognize that different embodiments may include other specific features or different implements without departing from the spirit of the invention. For instance, although the example of FIG. 34 shows two CPU threads, different CPUs may have more than two available threads (and associated L1 caches).

Figure 35:
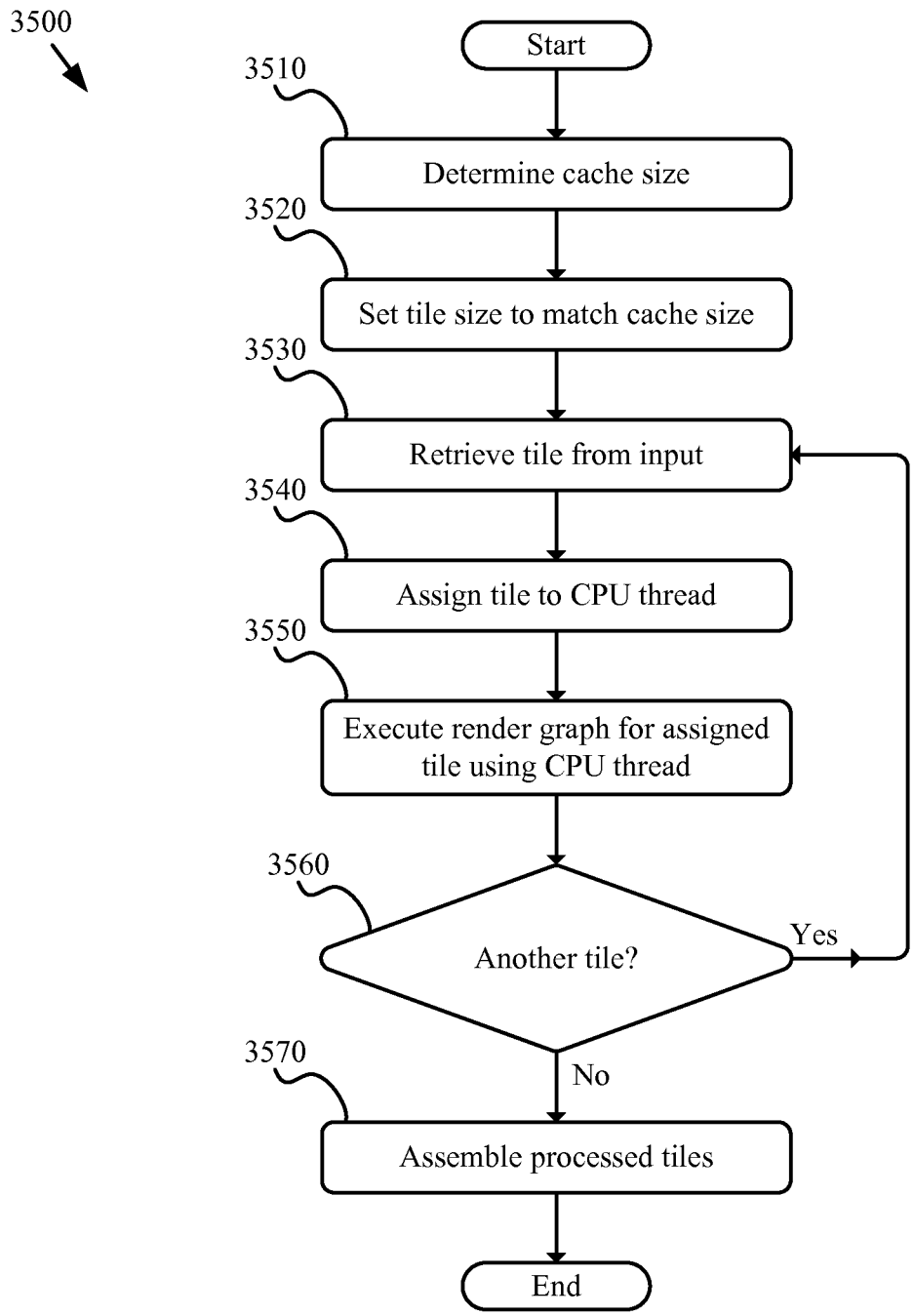
FIG. 35 illustrates a conceptual process used to perform CPU tiling in some embodiments.

FIG. 35 illustrates a conceptual process 3500 used to perform CPU tiling in some embodiments. Process 3500 will be described with reference to FIG. 34. Process 3500 may be performed by a module such as the tiling engine 2950 described above in reference to FIG. 29. The process begins when the renderer has generated an executable graph and the CPU is available to process the graph. As shown, the process determines (at 3510) the cache size associated with each CPU thread. This determination may be made by accessing data stored with the render graph or by profiling the CPU capabilities using a hardware profiler. In different embodiments, the hardware profiling may be performed by different modules, applications, etc. For instance, in some embodiments, the hardware profiler is included in the image processing framework, while in other embodiments the hardware profile may be supplied by the client application, or by another resource (e.g., the operating system).

After determining (at 3510) the available cache size, the process sets (at 3520) the processing tile size such that the data corresponding to the pixels in the tile fits within the available cache. Tiles 3415 of image 3410 illustrate one such example of such a processing tile in relation to an input frame. Next, the process retrieves (at 3530) a tile from the input frame. The process then assigns (at 3540) the tile to a CPU thread. As in the example of FIG. 34, each tile 3415 may be assigned to any one of the various available CPU threads 3420-3425.

Next, the process executes (at 3550) the render graph for the tile using the CPU thread assigned at 3540. The render graph including nodes 3450-3460 is one such example of a render graph used to execute a tile 3415 using a CPU thread 3420 and its associated L1 cache 3440.

After executing (at 3550) the render graph, the process determines (at 3560) whether there is another tile from the input frame that needs to be rendered. When the process determines (at 3560) that there is another tile to render, the process repeats operations 3510-3560 until the process determines (at 3560) that there are no other tiles to render.

When the process determines (at 3560) that there are no other tiles to render, the process assembles (at 3570) the processed tiles to form the output frame. One example of such assembly is the output frame 3430 which is made up of processed tiles 3475. Once the output frame has been assembled, the image may be stored in memory for future display.

One of ordinary skill in the art will recognize that process 3500 is a conceptual representation of the operations used to tile an image in order to process a render graph using a CPU. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

C. GPU-Specific Optimization

Figure 36:
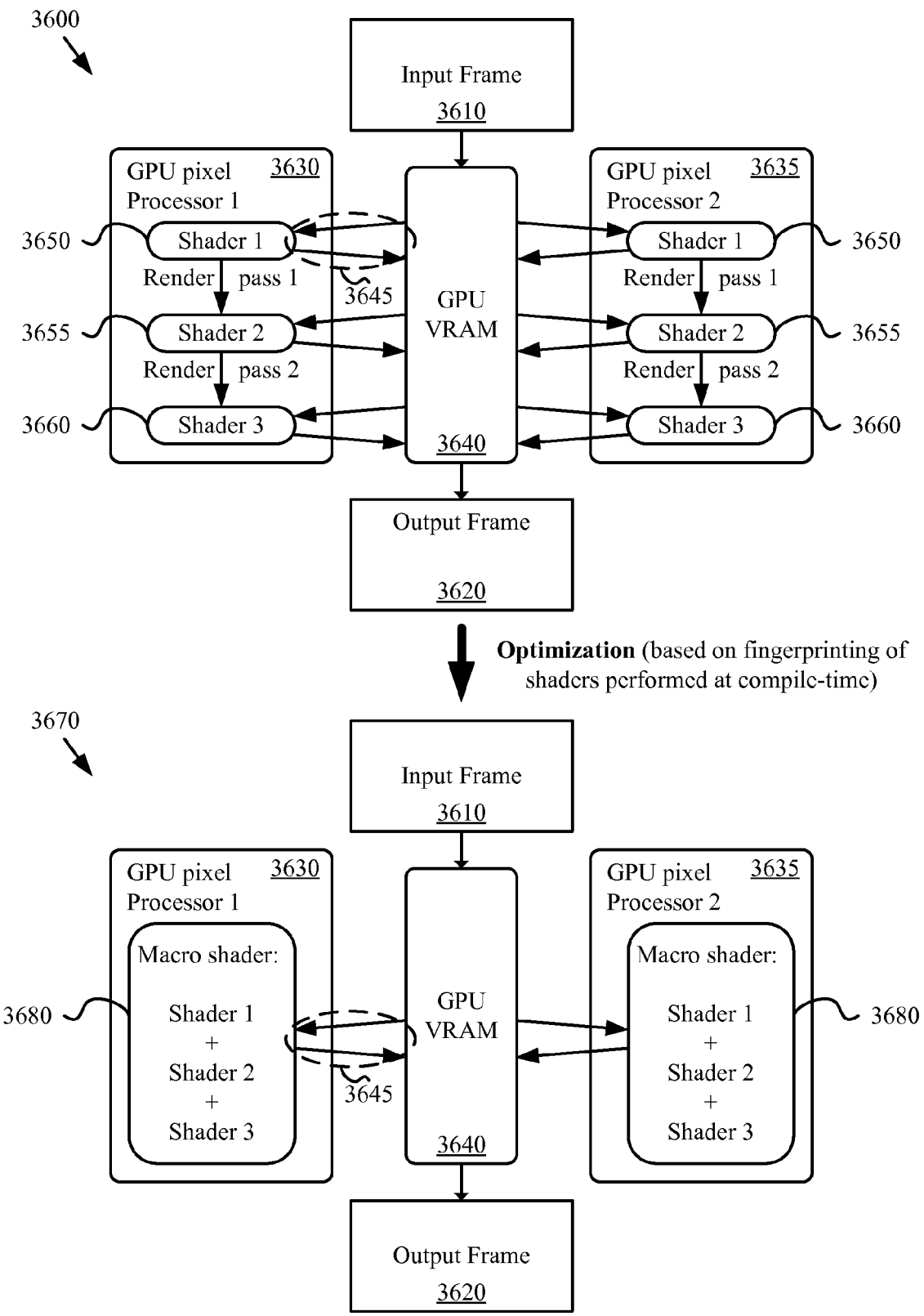
FIG. 36 illustrates optimization of GPU rendering using shader concatenation.

FIG. 36 illustrates optimization of GPU rendering using shader concatenation. Specifically, this figure shows the concatenation of several shaders into a single shader, thus reducing the number of render passes required by the GPU to process the shader operations. The figure illustrates two processing variations 3600 and 3670 that illustrate the shader concatenation process of some embodiments.

As shown, in the first processing variation 3600 includes an input frame 3610, an output frame 3620, two or more GPU pixel processors 3630 and 3635 for executing fragment programs (specifically, for computing the final pixel color, lighting and depth of a particular pixel), a GPU memory 3640 for storing image data (e.g. a "VRAM"), and a set of shaders 3650-3660 for performing image processing operations.

In the example variation 3600, the shaders 3650-3660 are performed in series, with a read/write operation 3645 performed by each shader in the series 3650-3660. Each write/read operation between consecutive fragment programs is called a render pass. Reducing the number of render passes, and thus the number of read/write operations improves the efficiency of the rendering process.

Processing variation 3670 illustrates the same image processing operation performed using fewer render passes. As shown, the shaders 3650-3660 have been concatenated into a single macro shader 3680. Such a macro shader performs only one read/write operation 3645 when performing the same set of image processing operations performed by multiple shaders 3650-3660 over multiple render passes.

Figure 37:
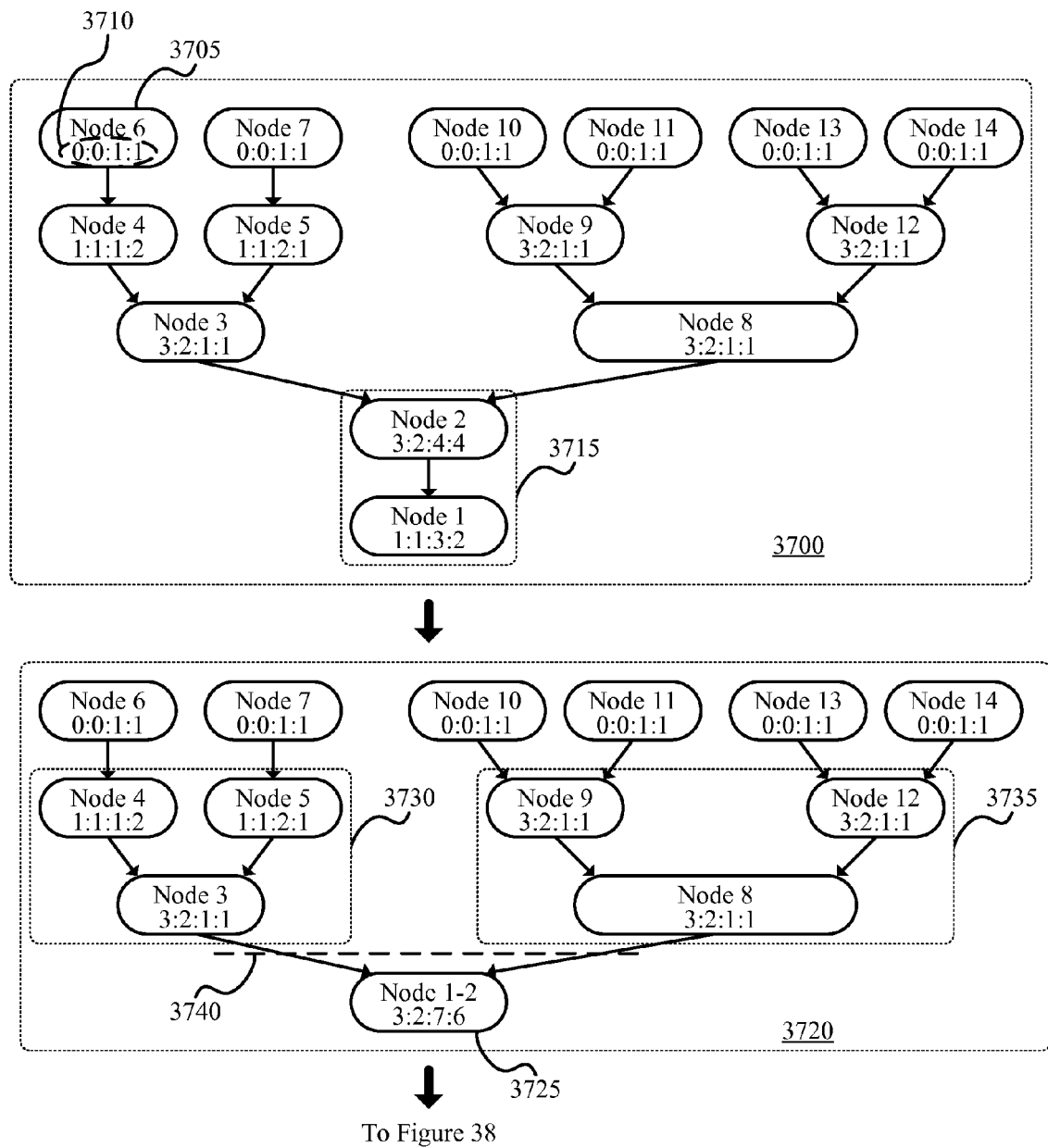
FIGS. 37-38 illustrate an example render graph and potential shader concatenation of the nodes included with the render graph.
Figure 38:
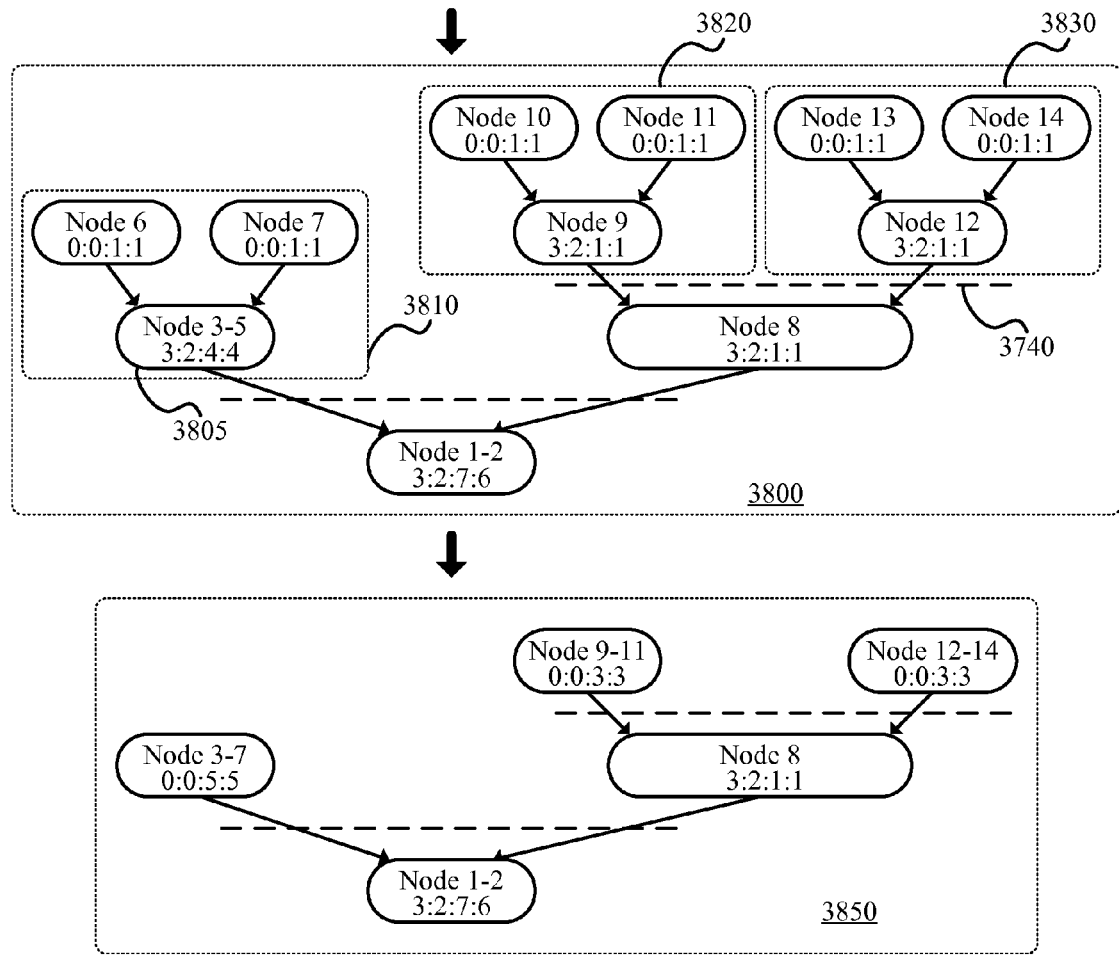

FIGS. 37-38 illustrate an example render graph 3700 and potential shader concatenation of the nodes included with the render graph. Specifically, these figures show four stages 3700, 3720, 3800, and 3850 that illustrate several evaluations of concatenatability and the resulting render graph at each stage.

As shown, the graph 3700 includes various processing nodes 3705 that are connected in a particular configuration. Each node 3705 includes a fingerprint 3710. The fingerprint may have been generated as described above in reference to FIGS. 20 and 21. In addition, the fingerprint may have been generated by a module such as the fingerprinting engine 1135 and stored as an element within a GPU processing code variant stored in a render graph node, such as that shown in FIG. 12.

In this example, the fingerprint is formatted to show an input concatenatability flag, a number of inputs, an instruction count, and a register count. The input concatenatability flag indicates whether a particular input or inputs to a node may be concatenated. In this example, a value of zero indicates that none of the inputs to the node may be concatenated, while a flag of one indicates that a first input to the node may be concatenated. The concatenatability of multiple inputs is represented in a binary format in this example (i.e., a flag of one indicates that a first input is concatenatable, a flag of two indicates that a second input is concatenatable, and a flag of three indicates that both a first and second input are concatenatable).

As an example of input concatenatability, a leaf node (e.g., a node that reads image data from memory) may not be concatenated with its input, and thus the concatenatability flag would indicate that the input to the leaf node may not be concatenated, regardless of the limitations of the GPU. Different embodiments may format the fingerprint data in different ways and include different elements than those described above. Any values or limitations of a GPU are meant for illustrative purposes only, and are not meant to reflect typical GPU capabilities.

As shown, the first stage 3700 is before any concatenation has taken place. Thus, the evaluation begins at the root node and the node or nodes 3715 connected to its input. In this example, the combination of the nodes 3715 does not exceed the limitations of the GPU. In other words, the number of inputs, the instruction count, etc. of the combined nodes 3715 does not exceed the limitations of the GPU. The second stage 3720 illustrates the result of the concatenation, as the two nodes 3715 have been combined to form a single node 3725. In addition, although not shown, the resulting node 3725 was not able to be concatenated with either of the nodes at its inputs. Thus, a "concatenation frontier" 3740 is set. Each concatenation frontier indicates a delineation between shaders that will require a render pass.

In the second stage 3720, two other sets of nodes 3730 and 3735 are under evaluation to determine if they may be successfully concatenated. The third stage 3800 shows the result of those concatenation evaluations. As shown, one set of nodes 3730 was concatenated into a single node 3805, while the other set of nodes 3735 was not successfully concatenated (and a concatenation frontier 3740 was set). In this example, the second set 3735 was not successfully concatenated because the number of input to the concatenated node (four) exceeded the limitations of a hypothetical GPU (two inputs maximum).

In the third stage, 3800, three sets of nodes 3810-3830 are under evaluation to determine if they may be concatenated. The fourth stage 3850 shows the results of those evaluations. In this example, all three sets of nodes 3810-3830 have been successfully concatenated.

Figure 39:
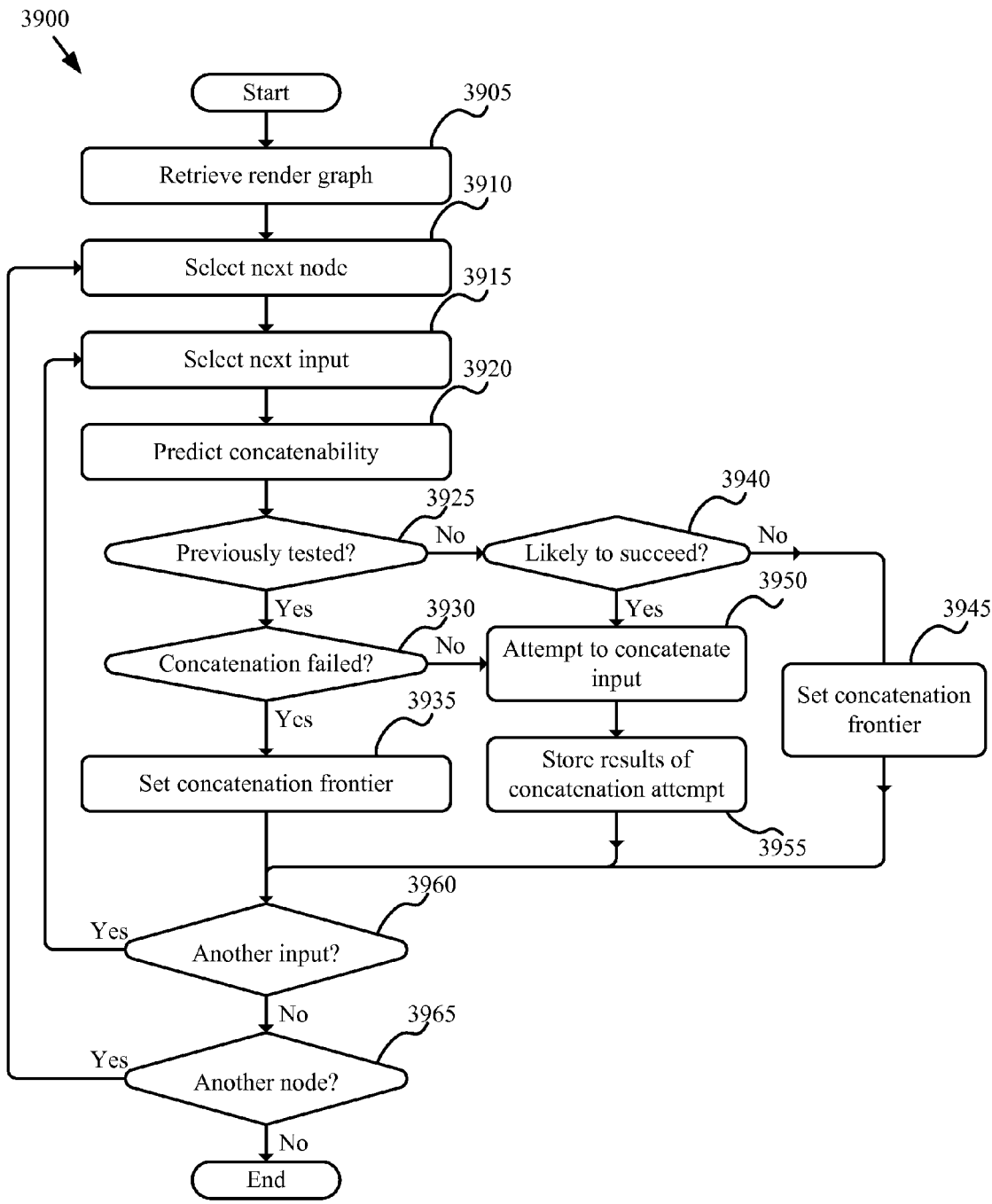
FIG. 39 illustrates a conceptual process used by some embodiments to determine whether shaders may be concatenated.

FIG. 39 illustrates a conceptual process 3900 used by some embodiments to determine whether shaders may be concatenated. As shown, the process retrieves (at 3905) a render graph. The process then selects (at 3910) the next node in the render graph, starting at the root node. Next, the process selects (at 3915) an input to the selected node. The process then predicts (at 3920) the concatenatability of the input. This prediction involves evaluating the shader fingerprints and the resources of the selected GPU to determine whether it is likely that the combination of shaders will not exceed the limitations of the GPU. Some embodiments perform the evaluation of shader fingerprints by generating an arithmetic combination of the fingerprints corresponding to the nodes under consideration.

Some embodiments use heuristic algorithms to determine when the shader concatenation is likely to succeed. Some embodiments may store this prediction as a computed metric that indicates the probability of successful concatenation.

Next, the process determines (at 3925) whether the nodes under consideration were previously tested. Some embodiments store the concatenation results in a cache memory so that the results may be efficiently stored and retrieved (e.g., concatenation results cache 3060 described above in reference to FIG. 30). When the nodes have been previously tested, the process next determines (at 3930) whether the concatenation attempt failed. When the process determines that the concatenation attempt failed, the process sets (at 3935) a concatenation frontier, indicating a separation between shaders. Otherwise, the process proceeds to operation 3950, which is described below.

When the process determines (at 3925) that the combination of nodes has not been tested, the process next determines (at 3940) whether the concatenation is likely to succeed. This determination may be made in some embodiments by comparing the concatenation prediction metric to a threshold. When the process determines that the concatenation attempt is not likely to succeed, the process sets (at 3945) a concatenation frontier. The process then proceeds to operation 3960, which is described below.

When the process determines (at 3940) that the concatenation attempt is likely to succeed, or after determining (at 3930) that a previous concatenation attempt including the same nodes under evaluation has succeeded, the process attempts to concatenate the selected input 3950. The process used to attempt and verify concatenation is described below in reference to FIG. 40. Next, the process stores (at 3955) the results of the concatenation attempt, which may include setting a concatenation frontier in some cases.

After setting (at 3935 or 3945) a concatenation frontier or after storing (at 3955) the results of a concatenation attempt, the process determines (at 3960) whether the node has another input. When the process determines that the node does have another input, the process repeats the operations 3920-3960 until the process determines (at 3960) that there are no more inputs. When the process determines that there are no other inputs, the process determines (at 3965) whether there is another node in the graph. When the process determines that there is another node, the process repeats operations 3910-3965 until the process determines that all nodes have been evaluated. In some embodiments, the process traverses the nodes from the root node to each leaf node until all possible concatenations have been evaluated.

One of ordinary skill in the art will recognize that process 3900 is a conceptual representation of the operations used to determine whether shaders may be concatenated. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

Figure 40:
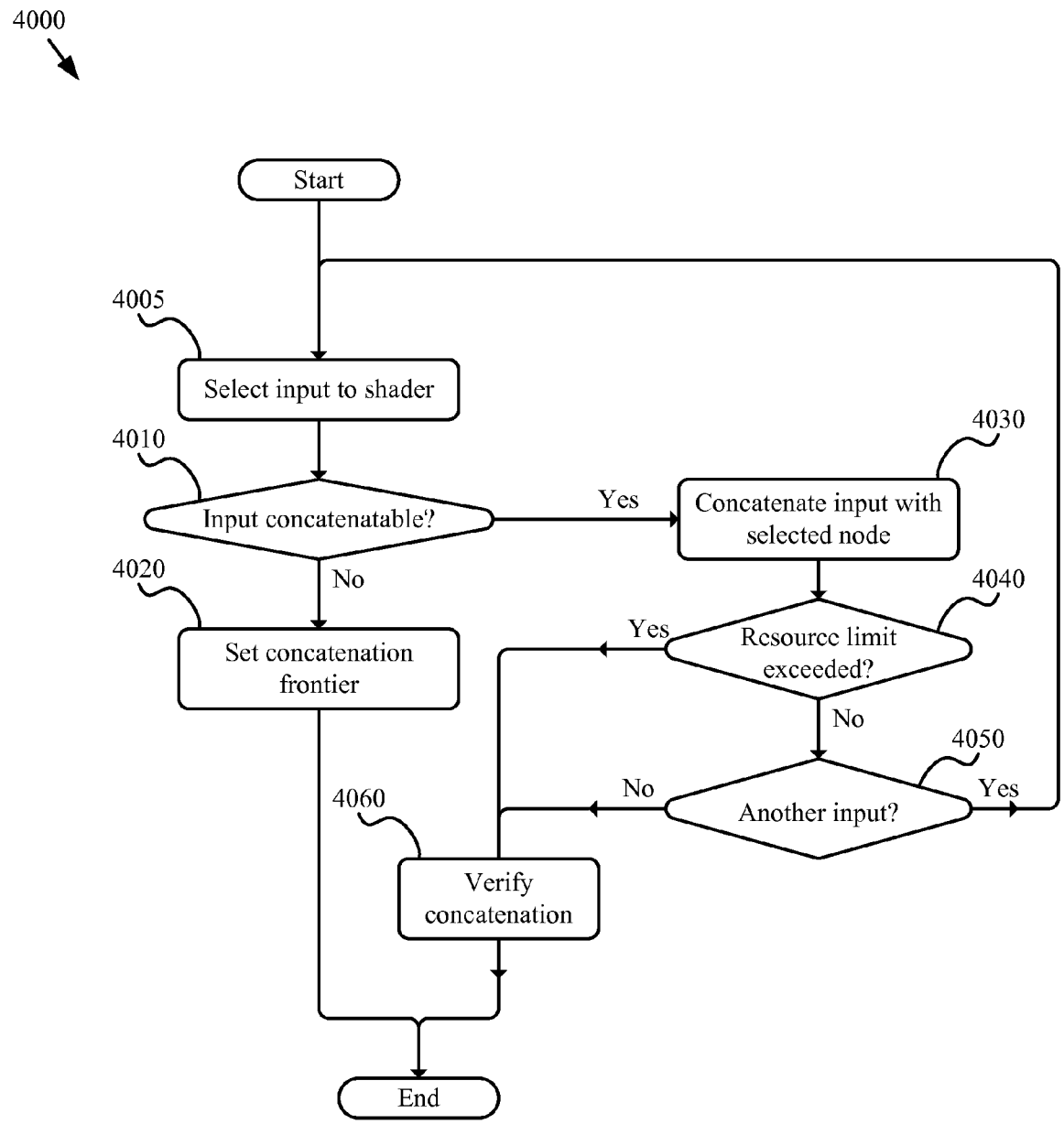
FIG. 40 illustrates the conceptual process used by some embodiments to attempt and verify concatenation of two or more shaders.

FIG. 40 illustrates the conceptual process 4000 used by some embodiments to attempt and verify concatenation of two or more shaders. The process selects (at 4005) an input to the shader. Next, the process determines (at 4010) whether the selected input is concatenatable. In some embodiments, multiple inputs to a shader may be attempted and verified individually, in other embodiments, multiple inputs may be attempted and verified in a single operation. In some embodiments, the determination of whether an input is concatenatable may be made by evaluating the shader fingerprint. When the process determines that the input is not concatenatable, the process sets (at 4020) a concatenation frontier. The process then ends. In some cases (not shown), when the process determines that a particular input is not concatenatable, the process may evaluate other inputs to the shader to determine if other inputs may be concatenatable.

When the process determines (at 4010) that the input is concatenatable, the process concatenates (at 4030) the input with the selected node. Some embodiments concatenate the input(s) by combining the shader code from the shader under analysis and the shader code of the shader providing the input under evaluation into a single piece of processing code. In some embodiments, combining multiple shaders requires various operations to ensure that, for instance, variables included in the shaders do not overlap. For instance, two shaders under consideration for concatenation may each include an input variable called "input0". In such a case, when concatenating the shader code, the process renames one of the inputs (e.g., one "input0" may be renamed "inputA0"), such that the variables do not collide.

In addition, in some embodiments, the various resource counts specified by the fingerprint may be adjusted to reflect the combined code. For instance, in some cases, a particular shader will end with a division by an alpha value (i.e., a transparency value), while a second shader that receives the output of the particular shader may begin with a multiplication by the same alpha value. In such cases, the two instructions cancel each other out and may be eliminated by the process.

The process then determines (at 4040) whether the resource limit has been exceeded. When the resource limit has not been exceeded, the process next determines (at 4050) whether there is another input to the shader to evaluate. Such an input may be another input to the original unconcatenated shader, or an input to the concatenated shader. When there is another input to evaluate, the process repeats operations 4005-4050 until the process determines (at 4040) that the resource limit has been exceeded or determines (at 4050) that there are no other inputs to evaluate.

When the process determines (at 4040) that the resource limit has been exceeded or determines (at 4050) that there are no other inputs to evaluate, the process verifies (at 4060) the concatenation. In some embodiments, when the process has determined (at 4040) that the resource limit has been exceeded, the process, prior to verifying (at 4060) the concatenation, undoes the last concatenation operation performed at 4030. By undoing the last concatenation operation, the combined shader is returned to a state that did not exceed the resource limitation, as determined at 4040.

In some embodiments, this verification includes submitting the combined shader to an OpenGL driver for compiling. The driver will then return a flag indicating the success or failure of the compilation attempt.

When the flag indicates that the concatenation has failed, the process undoes the last concatenation operation (e.g., by removing a particular shader string from the concatenated shader) before performing another verification. The process may repeatedly undo previously-attempted concatenations until the process verifies (at 4060) that the concatenated shader will compile and execute on the selected resource. After verifying (at 4060) the shader concatenation, the process sets a concatenation frontier and ends. In contrast, when the verification operation is successful on the first attempt, no concatenation frontier is set (i.e., other shaders may potentially be concatenated with the verified concatenated shader).

Some embodiments update the heuristic statistics whenever a concatenation attempt is made. The heuristic prediction process is then updated based on the computed metric predicting whether the concatenation would be successful and the result of the concatenation attempt.

One of ordinary skill in the art will recognize that process 4000 is a conceptual representation of the operations used to attempt and verify shader concatenation. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

D. Optimization During Execution

As described above, the image processing framework of some embodiments may execute render graphs on a per-frame or a per-segment basis. When executed on a per-frame basis, one graph (and its associated parameters) is loaded and executed in order to produce each output frame. When executed on a per-segment basis, a graph is loaded, and its associated parameters are updated (e.g., on a per-frame basis), but no new graph is loaded until the end of the segment is reached. A segment may include one or more frames.

Figure 41:
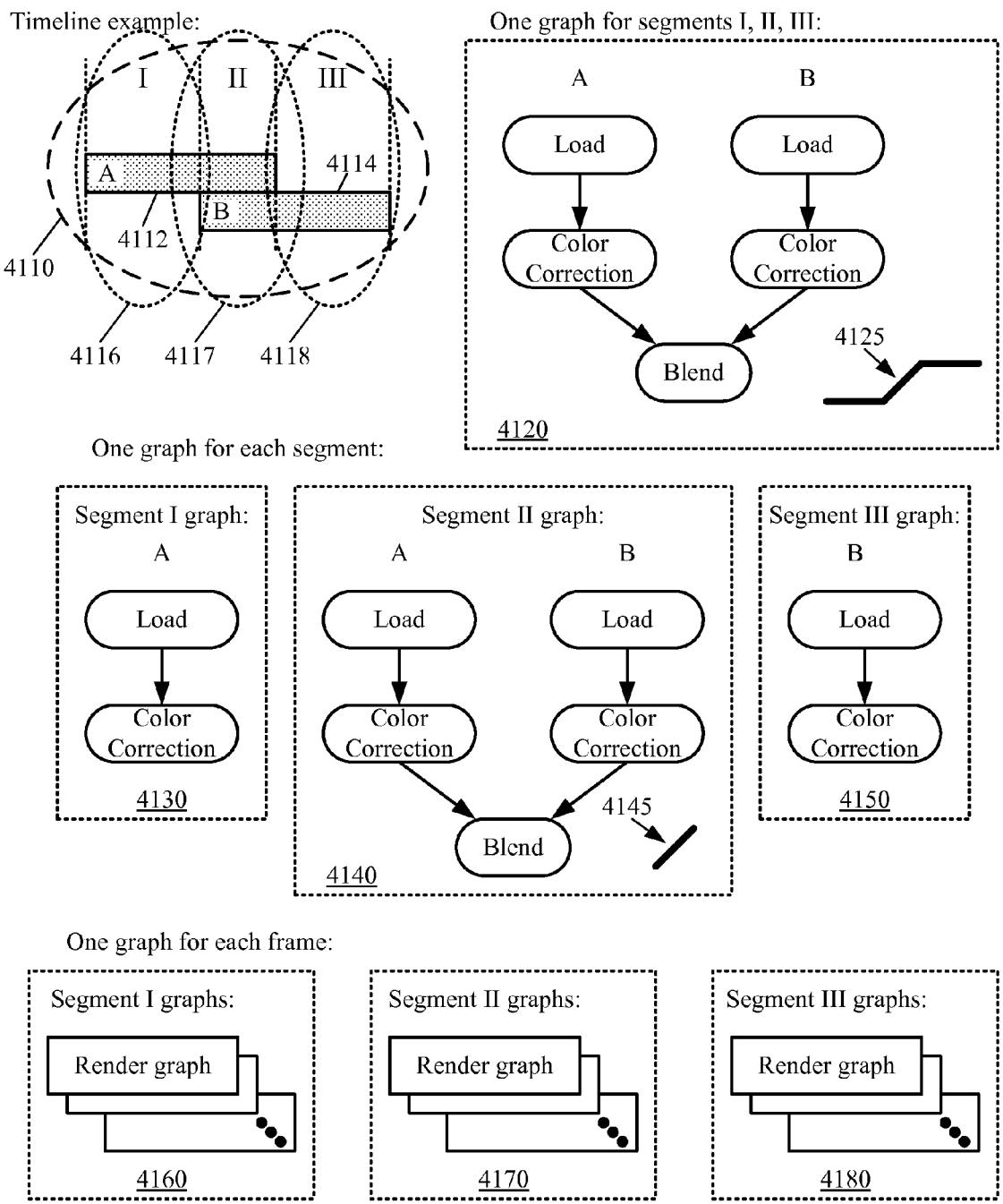
FIG. 41 illustrates a conceptual example of several options for executing render graphs on a per-frame or per-segment basis.

FIG. 41 illustrates a conceptual example of several options for executing render graphs on a per-frame or per-segment basis. Specifically, the figure illustrates a section of a video timeline 4110, and the resulting graphs 4120-4180 that are created and executed depending on whether the graphs will be executed on a per-frame or per-segment basis.

As shown, the timeline 4110 includes two video clips 4112 and 4114 that are defined relative to three segments 4116-4118. In this example timeline 4110, the first segment 4116 includes video based on clip 4112 only, the second segment 4117 includes video based on a combination of clips 4112 and 4114, and the third segment 4118 includes video based on clip 4114 only. In this example, the second segment 4117 performs a transition from clip 4112 to clip 4114 using a blend operation. In other words, the second segment 4117 begins by defining a display with only clip 4112, proceeds to define a display that combines clips 4112 and 4114, and ends by defining a display with only clip 4114.

Render graph 4120 illustrates the use of a single render graph for all three segments 4116-4118. As shown, the graph 4120 includes several nodes, ending with the root node 4122 that blends the two clips 4112 and 4114. The parameter 4125 selecting the blend between the two clips 4112 and 4114 is set to zero during the first segment 4116 (i.e., the blend node selects the first input and ignores the second input), rises linearly during the second segment 4117, and is set to one during the third segment 4118 (i.e., the blend node selects the second input and ignores the first input).

As an alternative, a render graph may be generated for each segment. Thus, the render graphs 4130, 4140, and 4150 correspond to each of the segments 4116-4118. In this example, only the graph for the second segment 4140 includes the blend node and its associated blend parameter 4145.

As another alternative, one graph may be generated for each frame, as represented by the segment I graphs 4160, the segment II graphs 4170, and the segment III graphs 4180. In this example, the segment I graphs 4160 will all be identical to each other, as will the segment III graphs 4180 because neither set of graphs has any varying parameters. The segment II graphs 4170, by contrast, will vary from frame to frame as the blend parameter rises from zero to one.

Figure 42:
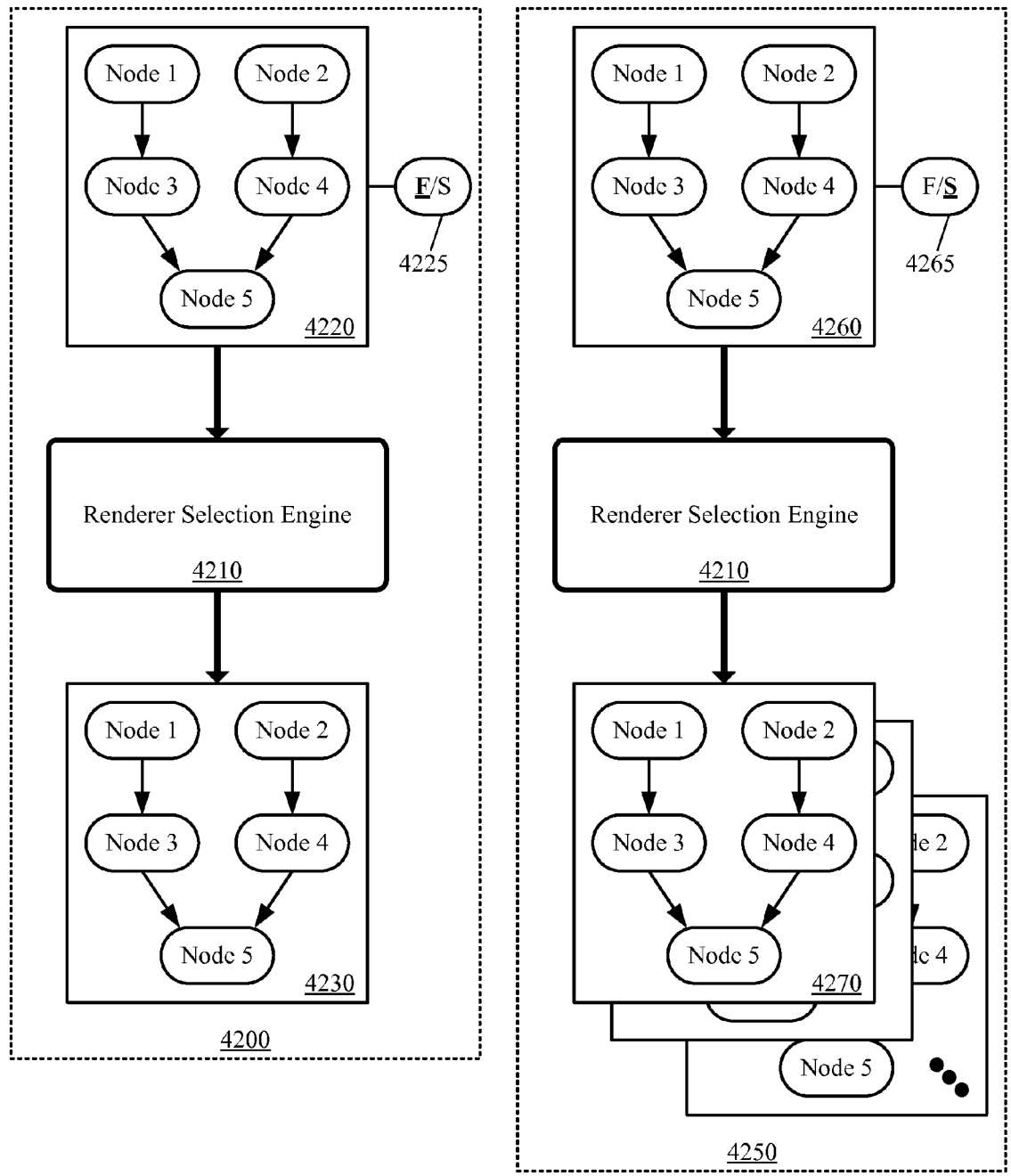
FIG. 42 illustrates the processing of frame-based render graphs and segment-based render graphs by the renderer selection engine of some embodiments.

FIG. 42 illustrates the processing of frame-based render graphs and segment-based render graphs by the renderer selection engine 4210 of some embodiments. Specifically, this figure shows a first example 4200 where render graphs are provided for each frame and a second example 4250 where render graphs are provided for each segment. The renderer selection engine 4210 is the same renderer selection engine 2710 described above in reference to FIG. 27.

As shown, in the first example 4200, a render graph 4220 corresponding to a particular frame is received by the renderer selection engine 4210. The graph includes a frame/segment flag 4225 that indicates that the graph corresponds to a particular frame (in this example, the "F" is bolded and underlined to show that the flag indicates the graph corresponds to a frame). The renderer selection engine, in turn, outputs a render graph 4230 corresponding to the particular frame. This graph may be passed to a renderer such as CPU renderer 2720 or GPU renderer 2730 described above in reference to FIG. 27.

In the second example 4250, a render graph 4260 corresponding to a particular segment is received by the renderer selection engine 4210. The graph includes a frame/segment flag 4265 that indicates that the graph corresponds to a particular segment (in this example, the "S" is bolded and underlined to show that the flag indicates the graph corresponds to a segment). The renderer selection engine, in turn, outputs a render graph 4270 for each frame included in the segment. These graphs may be passed to a renderer such as CPU renderer 2720 or GPU renderer 2730 described above in reference to FIG. 27.

Different embodiments may process segment graphs 4260 in different ways. For example, in some embodiments, the renderer selection engine may pass a single graph to the selected renderer and the renderer may update the parameters (e.g., a blend parameter) associated with graph on a frame-by-frame basis (not shown). In some embodiments, the parameters may be included in the segment graph (e.g., as a function, a series of values with corresponding frame references, etc.). In some embodiments, the frame/segment flag 4225 or 4265 may be embedded in the render graph (for instance in the other information 2297 described above in reference to FIG. 22). The frame/segment flag 4225 or 4265 may alternatively be provided directly to the renderer selection engine 4210 in some embodiments. In this way, a client application may elect to process a graph on a frame-by-frame or segment basis at run-time.

Figure 43:
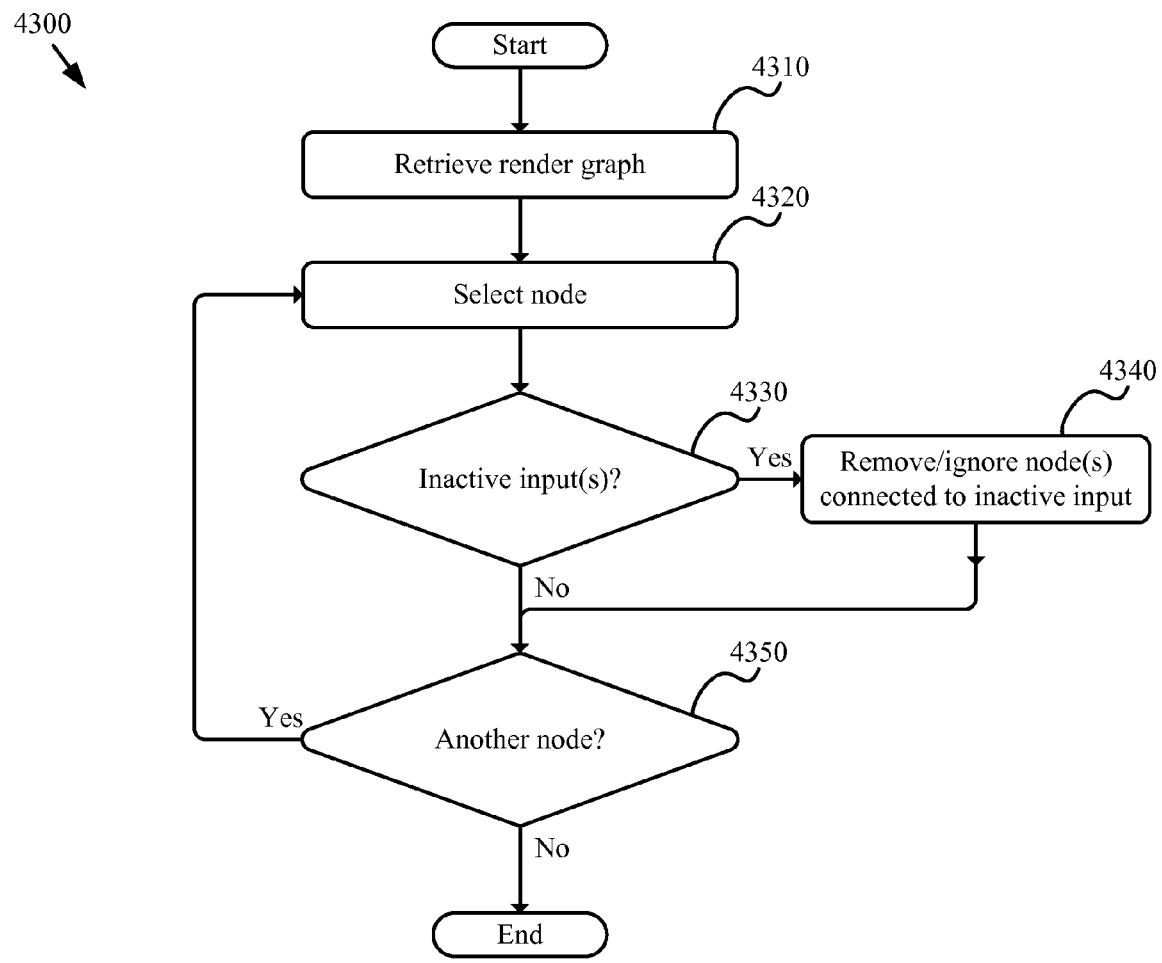
FIG. 43 illustrates a conceptual process used to optimize render graphs at execution-time in some embodiments.

FIG. 43 illustrates a conceptual process 4300 used to optimize render graphs at render-time in some embodiments. Process 4300 will be described with reference to FIG. 41. As shown, the process retrieves (at 4310) a render graph. Next, the process selects (at 4320) a node. The process then determines (at 4330) whether the node has inactive inputs. When the process determines that the node has one or more inactive inputs, the process ignores or removes (at 4340) the inactive node or nodes connected to the inactive inputs.

The render graph 4120 provides one example of such a node with an inactive input. When the blend parameter is set to zero, one half of the node tree is inactive, as it is not used by the root node. This condition results in the effective render graph 4130.

When the process determines (at 4330) that there are no inactive inputs to the selected node, or after removing or ignoring (at 4340) the node(s) connected to the inactive input(s), the process determines (at 4350) whether there is another node in the graph. When the process determines that there is another node, the process repeats operations 4310-4350 until the process determines (at 4350) that there are no other nodes in the graph, the process ends.

One of ordinary skill in the art will recognize that process 4300 is a conceptual representation of the operations used to optimize a render graph at execution time. Different embodiments may perform the operations in a different order, combine various operations, or divide operations into sub-operations. In addition, the process may not be implemented as one contiguous set of operations, but may be partially performed at different times. Furthermore, the process may be performed as part of a larger macro-process or as a combination of several sub-processes.

VII. Process for Defining an Image Processing Framework

Figure 44:
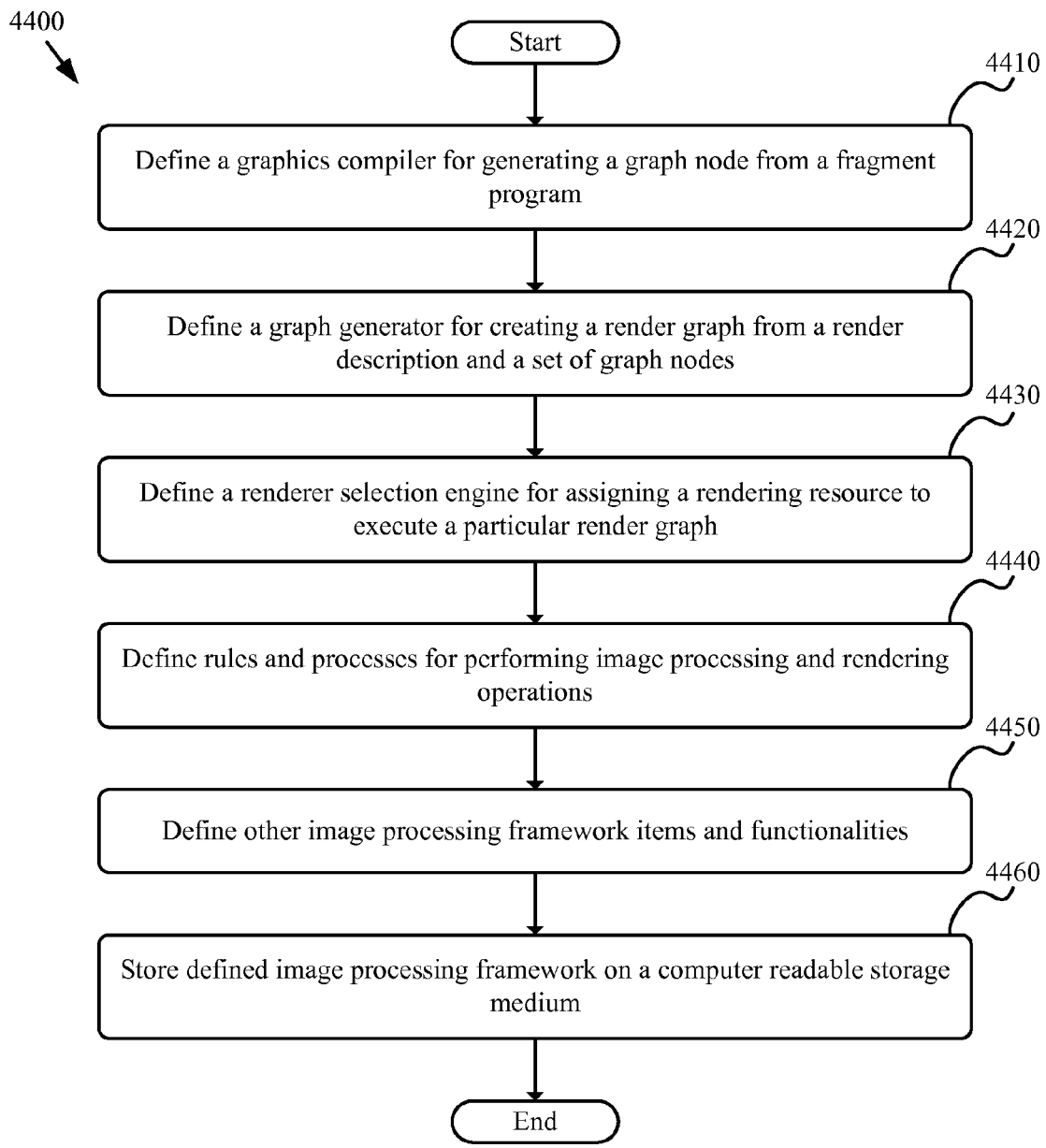
FIG. 44 conceptually illustrates a process used by some embodiments to define an image processing framework.

FIG. 44 conceptually illustrates a process 4400 of some embodiments for defining and storing an image processing framework of some embodiments, such as framework 700 or 900. Specifically, process 4400 illustrates the operations used to define several of the elements shown in framework architecture 700 or 900. As shown, process 4400 begins by defining (at 4410) a graphics compiler for generating a graph node from a fragment program. Graphics compiler 740 is one example of such a graphics compiler.

The process then defines (at 4420) a graph generator for creating a render graph from a render description and a set of graph nodes. For instance, graph generator 750 is such a graph generator. Next, the process defines (at 4430) a renderer selection engine for assigning a rendering resource to execute a particular render graph. The renderer selection engine 2710 is an example of such a renderer selection engine.

After defining (at 4430) the renderer selection engine, the process defines (at 4440) rules and processes for performing image processing and rendering operations. FIGS. 28-43 illustrate several examples of such image processing and rendering operations and the accompanying discussion describes the rules and processes used to implement those operations.

After defining (at 4440) rules and processes for performing image processing and rendering operations, process 4400 defines (at 4450) other image processing framework items and functionalities. Examples of such image processing operations may include compiling received code into various intermediate formats, providing communication pathways to various external resources (e.g., external compilers), etc. Such functionalities may include library functions, format conversion functions, etc. The process defines these additional tools in order to create a framework that has many additional features to the features described above.

Process 4400 then stores (at 4470) the defined image processing framework (i.e., the defined modules, interfaces, etc.) on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various elements defined by process 4400 are not exhaustive of the modules, rules, processes, and interface items that could be defined and stored on a computer readable storage medium for an image processing framework incorporating some embodiments of the invention. In addition, the process 4400 is a conceptual process, and the actual implementations may vary. For example, different embodiments may define the various elements in a different order, may define several elements in one operation, may decompose the definition of a single element into multiple operations, etc. In addition, the process 4400 may be implemented as several sub-processes or combined with other operations within a macro-process.

VIII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 45:
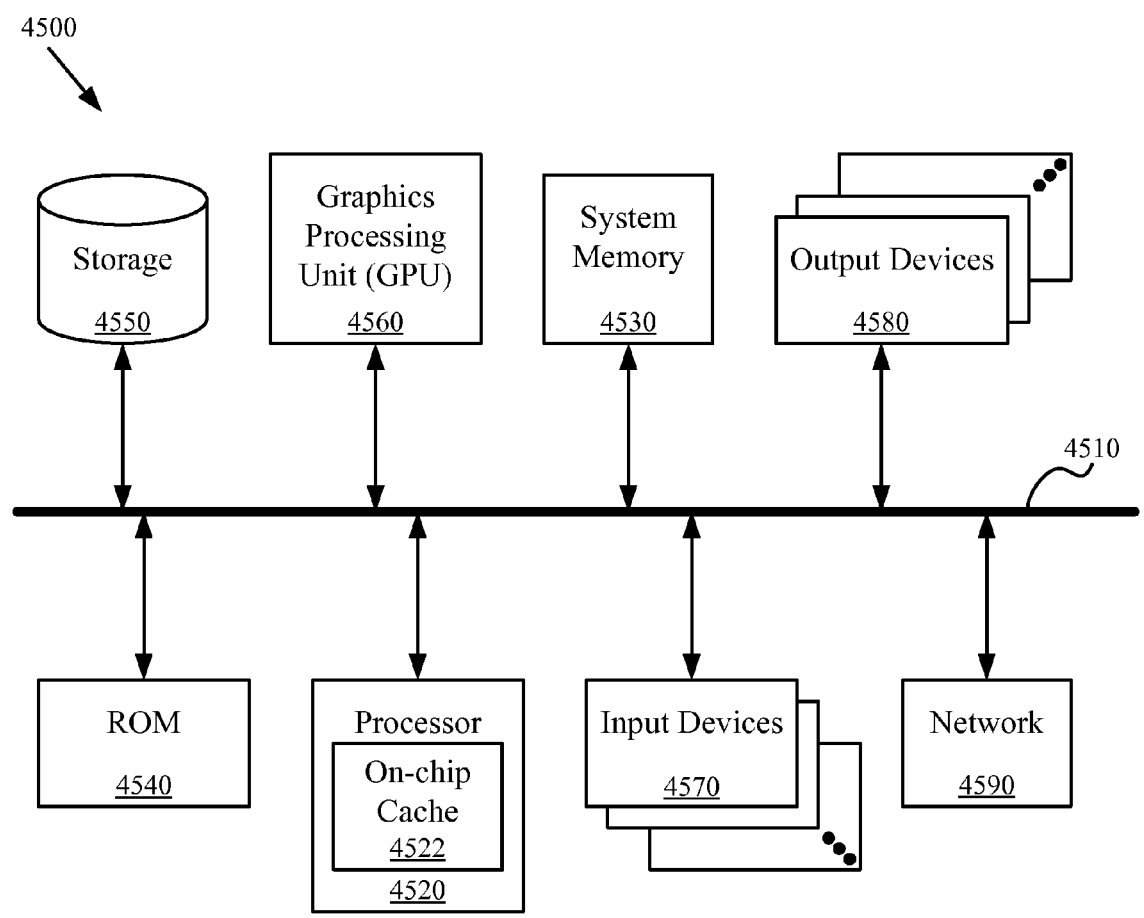
FIG. 45 illustrates a computer system with which some embodiments of the invention are implemented.

FIG. 45 conceptually illustrates a computer system 4500 with which some embodiments of the invention are implemented. For example, the systems (and/or sub-systems) described above in reference to FIGS. 7-11, 22-23, 27, and 29-30 may be at least partially implemented using sets of instructions that are run on the computer system 4500. As another example, the processes described in reference to FIGS. 6, 13, 14, 19-21, 24-26, 28, 32-33, 35, 39-40, and 43 may be at least partially implemented using sets of instructions that are run on the computer system 4500.

Such a computer system includes various types of computer readable mediums and interfaces for various other types of computer readable mediums. Computer system 4500 includes a bus 4510, a processor 4520, a system memory 4530, a read-only memory (ROM) 4540, a permanent storage device 4550, a graphics processing unit ("GPU") 4560, input devices 4570, output devices 4580, and a network connection 4590. The components of the computer system 4500 are electronic devices that automatically perform operations based on digital and/or analog input signals.

One of ordinary skill in the art will recognize that the computer system 4500 may be embodied in other specific forms without deviating from the spirit of the invention. For instance, the computer system may be implemented using various specific devices either alone or in combination. For example, a local PC may include the input devices 4570 and output devices 4580, while a remote PC may include the other devices 4510-4560, with the local PC connected to the remote PC through a network that the local PC accesses through its network connection 4590 (where the remote PC is also connected to the network through a network connection).

The bus 4510 collectively represents all system, peripheral, and chipset buses that communicatively connect the numerous internal devices of the computer system 4500. In some cases, the bus 4510 may include wireless and/or optical communication pathways in addition to or in place of wired connections. For example, the input devices 4570 and/or output devices 4580 may be coupled to the system 4500 using a wireless local area network (W-LAN) connection, Bluetooth®, or some other wireless connection protocol or system.

The bus 4510 communicatively connects, for example, the processor 4520 with the system memory 4530, the ROM 4540, and the permanent storage device 4550. From these various memory units, the processor 4520 retrieves instructions to execute and data to process in order to execute the processes of some embodiments. In some embodiments the processor includes an FPGA, an ASIC, or various other electronic components for executing instructions. In some embodiments, the processor 4520 uses an on-chip cache 4522 (e.g., an L1 cache) to hold data recently accessed or produced by the processor 4520.

The ROM 4540 stores static data and instructions that are needed by the processor 4520 and other modules of the computer system. The permanent storage device 4550, on the other hand, is a read-and-write memory device. This device is a non-volatile memory unit that stores instructions and data even when the computer system 4500 is off. Some embodiments of the invention use a mass-storage device (such as a magnetic or optical disk and its corresponding disk drive) as the permanent storage device 4550.

Other embodiments use a removable storage device (such as a floppy disk, flash drive, or CD-ROM) as the permanent storage device. Like the permanent storage device 4550, the system memory 4530 is a read-and-write memory device. However, unlike storage device 4550, the system memory 4530 is a volatile read-and-write memory, such as a random access memory (RAM). The system memory stores some of the instructions and data that the processor needs at runtime. In some embodiments, the sets of instructions and/or data used to implement the invention's processes are stored in the system memory 4530, the permanent storage device 4550, and/or the read-only memory 4540. For example, the various memory units include instructions for processing multimedia items in accordance with some embodiments.

In addition, the bus 4510 connects to the GPU 4560. The GPU of some embodiments performs various graphics processing functions. These functions may include display functions, rendering, compositing, and/or other functions related to the processing or display of graphical data. In some embodiments, the system 4500 may include multiple GPUs.

The bus 4510 also connects to the input devices 4570 and output devices 4580. The input devices 4570 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 4580 include printers, electronic display devices that display still or moving images, and electronic audio devices that play audio generated by the computer system. For instance, these display devices may display a graphical user interface ("GUI"). The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 45, bus 4510 also couples computer 4500 to a network 4590 through a network adapter (not shown). In this manner, the computer can be a part of a network of computers (such as a local area network ("LAN"), a wide area network ("WAN"), an Intranet, or a network of networks, such as the Internet. For example, the computer 4500 may be coupled to a web server (network 4590) so that a web browser executing on the computer 4500 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 4500 may be used in conjunction with the invention. Moreover, one of ordinary skill in the art will appreciate that any other system configuration may also be used in conjunction with the invention or components of the invention. For example, in some embodiments, the system 4500 may not include a GPU 4560.

In addition, while the examples shown illustrate many individual modules as separate blocks (e.g., the ROI/DOD function generator and fingerprinting engine 1135, the node wrapping engine 1140, etc.), one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. An automated method of rendering an image using a multithread central processing unit ("CPU"), the method comprising:
    retrieving a set of image processing instructions;
    determining an image section size to be processed by the CPU using the set of image processing instructions; and
    iteratively: (i) retrieving a section of the image that matches the image section size, and (ii) sending the section of the image to a particular thread of the multithread CPU for processing using said processing instructions.

2. The method of claim 1, wherein the image section size is selected to match a level one cache size associated with the particular thread of the multithread CPU.

3. The method of claim 2, wherein a particular set of image processing instructions comprises a plurality of processing instructions, each instruction receiving a set of inputs and generating a set of outputs when processed, the method further comprising storing an output of each instruction in said cache when said output is used as input by another instruction in said plurality of processing instructions.

4. The method of claim 2 further comprising processing all instructions required for rendering each image section in a single thread.

5. The method of claim 1, wherein said rendering is performed on a plurality of images, the method further comprising (i) iteratively retrieving a plurality of image sections that match the image section size, each image section from a different image, and (ii) sending said plurality of image sections to a particular thread of the multithread CPU for processing.

6. The method of claim 5, wherein said processing comprises a blending operation for said plurality of images.

7. The method of claim 5, wherein said plurality of sections are indexed to identify them as sections required to generate a particular section of a rendered image.

8. The method of claim 1 further comprising:
    determining a cache size associated with each CPU thread based on a set of CPU capabilities, and
    selecting said image section size based on the cache size of each CPU thread.

9. The method of claim 1, wherein said set of image processing instructions are retrieved from a storage queue.

10. An automated method of rendering an image using a multithread central processing unit ("CPU"), the method comprising:
    retrieving a rendering graph comprising a set of nodes, each node comprising a set of image processing instructions;
    determining a size of a section of the image to be processed by the CPU based on said nodes; and
    iteratively: (i) retrieving different sections of the image that match the image section size, (ii) passing each section individually through all the nodes, wherein passing a section of the image through a particular node comprises performing the image processing instructions of the node on the section of the image.

11. The method of claim 10, wherein said rendering is performed on a plurality of images, the method further comprising (i) iteratively retrieving a plurality of image sections that match the image section size, each image section from a different image, and (ii) sending said plurality of image sections to a particular thread of the multithread CPU for processing.

12. The method of claim 11, wherein said processing comprises a blending operation for said plurality of images.

13. The method of claim 11, wherein said plurality of sections are indexed to identify them as sections required to generate a particular section of a rendered image.

14. The method of claim 10 further comprising:
    determining a cache size associated with each CPU thread based on a set of CPU capabilities, and
    selecting said image section size based on the cache size of each CPU thread.

15. An computer readable medium storing a computer program for rendering an image using a multithread central processing unit ("CPU"), the computer program comprising sets of instructions for:
    retrieving a set of image processing instructions;
    determining an image section size to be processed by the CPU using the set of image processing instructions; and
    iteratively: (i) retrieving a section of the image that matches the image section size, and (ii) sending the section of the image to a particular thread of the multithread CPU for processing using said processing instructions.

16. The computer readable medium of claim 15, wherein the image section size is selected to match a level one cache size associated with the particular thread of the multithread CPU.

17. The computer readable medium of claim 16, wherein a particular set of image processing instructions comprises a plurality of processing instructions, each instruction receiving a set of inputs and generating a set of outputs when processed, the computer program further comprising a set of instructions for storing an output of each instruction in said cache when said output is used as input by another instruction in said plurality of processing instructions.

18. The computer readable medium of claim 16, wherein the computer program further comprises a set of instructions for processing all instructions required for rendering each image section in a single thread.

19. The computer readable medium of claim 15, wherein said rendering is performed on a plurality of images, the computer program further comprising a set of instructions for (i) iteratively retrieving a plurality of image sections that match the image section size, each image section from a different image, and (ii) sending said plurality of image sections to a particular thread of the multithread CPU for processing.

20. The computer readable medium of claim 19, wherein said processing comprises a blending operation for said plurality of images.

21. The computer readable medium of claim 19, wherein said plurality of sections are indexed to identify them as sections required to generate a particular section of a rendered image.

22. The computer readable medium of claim 15, wherein the computer program further comprises sets of instructions for:
  determining a cache size associated with each CPU thread based on a set of CPU capabilities, and
  selecting said image section size based on the cache size of each CPU thread.

23. The computer readable medium of claim 15, wherein said set of image processing instructions are retrieved from a storage queue.

24. The computer readable medium of claim 15, wherein said processing comprises a blending operation for said plurality of images.

25. The computer readable medium of claim 15, wherein said plurality of sections are indexed to identify them as sections required to generate a particular section of a rendered image.

26. An computer readable medium storing a computer program for rendering an image using a multithread central processing unit ("CPU"), the computer program comprising sets of instructions for:
  retrieving a rendering graph comprising a set of nodes, each node comprising a set of image processing instructions;
  determining a size of a section of the image to be processed by the CPU based on said nodes; and
  iteratively: (i) retrieving different sections of the image that match the image section size, (ii) passing each section individually through all the nodes, wherein passing a section of the image through a particular node comprises performing the image processing instructions of the node on the section of the image.

27. The computer readable medium of claim 26, wherein said rendering is performed on a plurality of images, the computer program further comprising a set of instructions for (i) iteratively retrieving a plurality of image sections that match the image section size, each image section from a different image, and (ii) sending said plurality of image sections to a particular thread of the multithread CPU for processing.

28. The computer readable medium of claim 26, wherein the computer program further comprises sets of instructions for:
  determining a cache size associated with each CPU thread based on a set of CPU capabilities, and
  selecting said image section size based on the cache size of each CPU thread.

29. An automated method of rendering a plurality of images, the method comprising:
  retrieving a rendering graph comprising a set of nodes, each node comprising a set of image processing instructions, each node comprising a set of inputs;
  receiving a set of parameters for a particular node, each parameter specifying a particular way of rendering said images; and
  disregarding at least one input to the particular node based on the set of parameters.

30. The method of claim 29, wherein said parameters comprise a blend parameter specifying a rate of blending for said plurality of images.

31. The method of claim 30, wherein said one input is for receiving data for a section of a particular image, said one input is ignored when the rate of blending for the particular image is set to zero.

32. An automated method of rendering a plurality of images, the method comprising:
  retrieving a rendering graph comprising a set of nodes, each node comprising a set of image processing instructions, each node comprising a set of inputs;
  receiving a set of parameters for a particular node, each parameter specifying a particular way of rendering said images; and
  bypassing processing of a particular node based on the set of parameters.

33. The method of claim 32, wherein said parameters comprises a blend parameter specifying a rate of blending for said plurality of images.

34. The method of claim 32, wherein said bypassed node is a pass-through node.

35. The method of claim 32, wherein said bypassed node does not transform its input values to a different output value.

36. An computer readable medium storing a computer program for rendering a plurality of images, the computer program comprising sets of instructions for:
  retrieving a rendering graph comprising a set of nodes, each node comprising a set of image processing instructions, each node comprising a set of inputs;
  receiving a set of parameters for a particular node, each parameter specifying a particular way of rendering said images; and
  disregarding at least one input to the particular node based on the set of parameters.

37. The computer readable medium of claim 36, wherein said parameters comprise a blend parameter specifying a rate of blending for said plurality of images.

38. The computer readable medium of claim 37, wherein said one input is for receiving data for a section of a particular image, wherein said one input is ignored when the rate of blending for the particular image is set to zero.

* * * * *